United States Patent [19]

Hata

[11] Patent Number: 4,993,814
[45] Date of Patent: Feb. 19, 1991

[54] ZOOM LENS SYSTEM

[75] Inventor: Kazuyoshi Hata, Osaka, Japan

[73] Assignee: Minolta Camera Kabushiki Kaisha, Osaka, Japan

[21] Appl. No.: 298,555

[22] Filed: Jan. 17, 1989

[30] Foreign Application Priority Data

| Jan. 18, 1988 | [JP] | Japan | 63-7784 |
| Jan. 18, 1988 | [JP] | Japan | 63-7785 |
| Jan. 18, 1988 | [JP] | Japan | 63-7786 |
| Jan. 18, 1988 | [JP] | Japan | 63-7787 |
| Jan. 18, 1988 | [JP] | Japan | 63-7788 |

[51] Int. Cl.$^5$ .............................................. G02B 15/00
[52] U.S. Cl. ...................................... 350/426; 350/427
[58] Field of Search ............. 350/423, 426, 427, 461, 350/462

[56] References Cited

U.S. PATENT DOCUMENTS

| 4,452,512 | 6/1984 | Takase | 350/426 |
| 4,815,830 | 3/1989 | Sato et al. | 350/426 |

FOREIGN PATENT DOCUMENTS

| 50-2558 | 1/1975 | Japan. |
| 53-60246 | 5/1978 | Japan. |
| 54-114236 | 9/1979 | Japan. |
| 55-28097 | 2/1980 | Japan. |
| 55-35334 | 3/1980 | Japan. |
| 55-62420 | 5/1980 | Japan. |
| 55-117118 | 9/1980 | Japan. |
| 56-43619 | 4/1981 | Japan. |
| 57-104108 | 6/1982 | Japan. |
| 59-142515 | 8/1984 | Japan. |
| 59-201013 | 11/1984 | Japan. |
| 61-46809 | 10/1986 | Japan. |

Primary Examiner—Paul M. Dzierzynski
Attorney, Agent, or Firm—Price, Gess & Ubell

[57] ABSTRACT

A zoom lens system comprises from object side to image side, a front lens unit of a negative refractive power and a rear lens unit of a positive refractive power with a variable air space, which changes in the zooming operation, formed between the front and rear lens units. The rear lens unit consists of a first biconvex lens element, a second biconcave lens element and a third biconvex lens element. Futher, an aperture diaphragm, which is arranged between the front and rear lens units or at the image side next to the rear lens unit, is stationary on the optical axis of the lens system in the zooming operation. In a 2-components zoom lens system having a negative lens unit and a positive lens unit from object side according to the present invention, a zoom ratio of about 2 and a sufficiently long back focal length can be obtained in spite of a small number of lens elements. Moreover, cost reduction, compactness and a high performance in the whole lens system including the aperture diaphragm and a lens barrel are obtainable.

29 Claims, 31 Drawing Sheets

F=3.81
— d
—·— g
---- SC
-0.5   0.5
SPHERICAL ABERRATION
&
SINE CONDITION

Y'=4.2
---- DM
—— DS
-0.5   0.5
ASTIGMATISM

Y'=4.2
-5.0   5.0
DISTORTION %

F=3.24
— d
—·— g
---- SC
-0.5   0.5
SPHERICAL ABERRATION
&
SINE CONDITION

Y'=4.2
---- DM
—— DS
-0.5   0.5
ASTIGMATISM

Y'=4.2
-5.0   5.0
DISTORTION %

F=2.86
— d
—·— g
---- SC
-0.5   0.5
SPHERICAL ABERRATION
&
SINE CONDITION

Y'=4.2
---- DM
—— DS
-0.5   0.5
ASTIGMATISM

Y'=4.2
-5.0   5.0
DISTORTION %

F=3.78

-0.5   0.5
SPHERICAL ABERRATION
&
SINE CONDITION

— d
—·— g
---- SC

Y'=5.6

-0.5   0.5
ASTIGMATISM

---- DM
—— DS

Y'=5.6

-5.0   5.0
DISTORTION %

F=3.13

-0.5   0.5
SPHERICAL ABERRATION
&
SINE CONDITION

— d
—·— g
---- SC

Y'=5.6

-0.5   0.5
ASTIGMATISM

---- DM
—— DS

Y'=5.6

-5.0   5.0
DISTORTION %

F=2.86

-0.5   0.5
SPHERICAL ABERRATION
&
SINE CONDITION

— d
—·— g
---- SC

Y'=5.6

-0.5   0.5
ASTIGMATISM

---- DM
—— DS

Y'=5.6

-5.0   5.0
DISTORTION %

F=3.83

SPHERICAL ABERRATION
&
SINE CONDITION

— d
—·— g
---- SC

Y'=5.6

ASTIGMATISM

---- DM
—— DS

Y'=5.6

DISTORTION %

F=3.16

SPHERICAL ABERRATION
&
SINE CONDITION

— d
—·— g
---- SC

Y'=5.6

ASTIGMATISM

---- DM
—— DS

Y'=5.6

DISTORTION %

F=2.86

SPHERICAL ABERRATION
&
SINE CONDITION

— d
—·— g
---- SC

Y'=5.6

ASTIGMATISM

---- DM
—— DS

Y'=5.6

DISTORTION %

Fig. 22a F=3.97
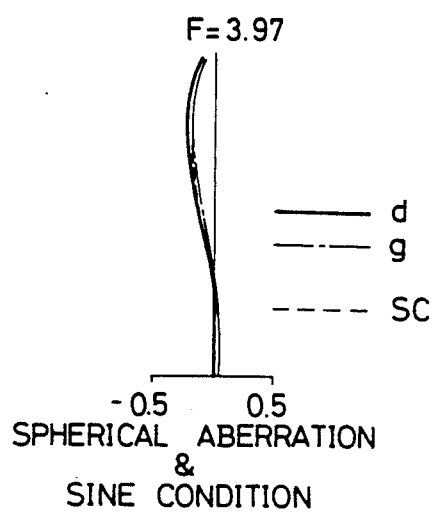
SPHERICAL ABERRATION
&
SINE CONDITION
Fig. 22b Y'=5.6
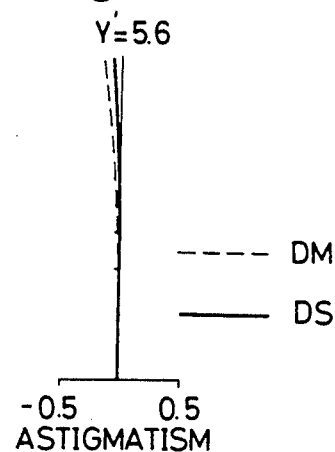
ASTIGMATISM
Fig. 22c Y'=5.6
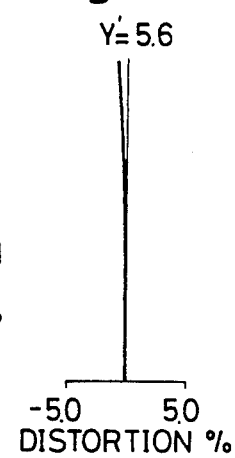
DISTORTION %
Fig. 22d F=3.15
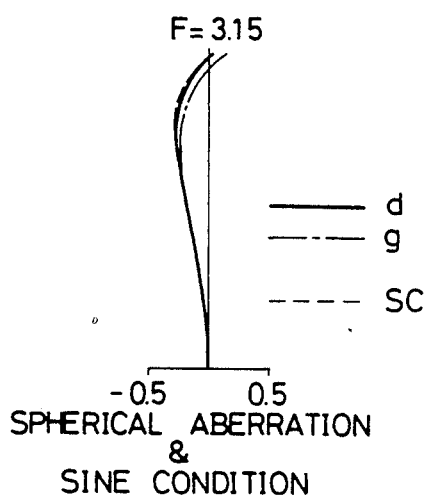
SPHERICAL ABERRATION
&
SINE CONDITION
Fig. 22e Y'=5.6
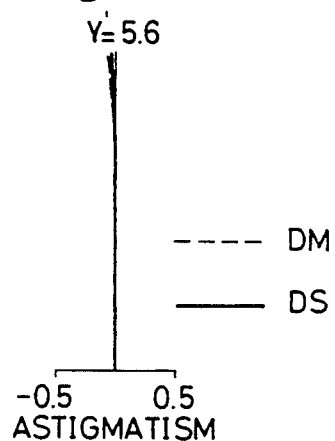
ASTIGMATISM
Fig. 22f Y'=5.6
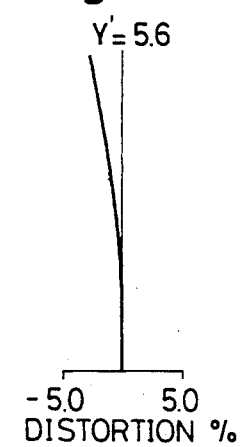
DISTORTION %
Fig. 22g F=2.86
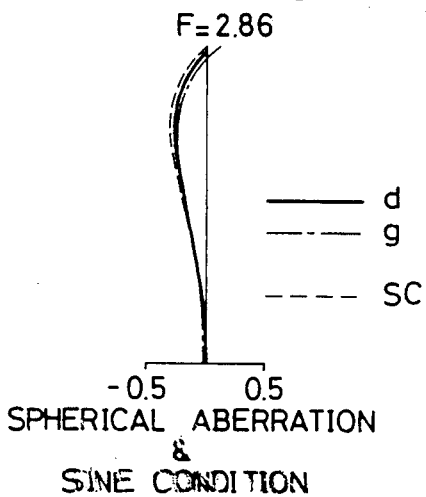
SPHERICAL ABERRATION
&
SINE CONDITION
Fig. 22h Y'=5.6
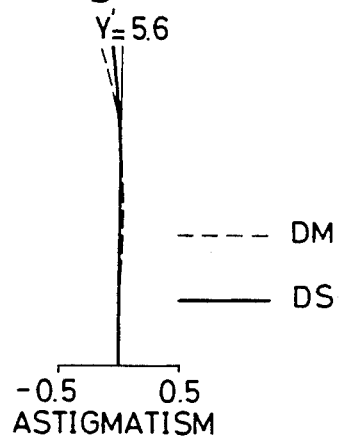
ASTIGMATISM
Fig. 22i Y'=5.6
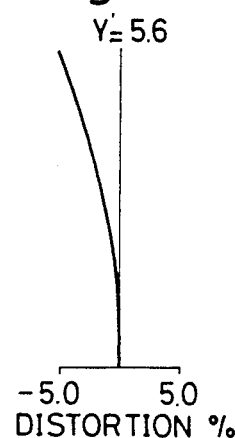
DISTORTION %

F=3.92

SPHERICAL ABERRATION
&
SINE CONDITION

Y'=5.6

ASTIGMATISM

Y'=5.6

DISTORTION %

F=3.18

SPHERICAL ABERRATION
&
SINE CONDITION

Y'=5.6

ASTIGMATISM

Y'=5.6

DISTORTION %

F=2.86

SPHERICAL ABERRATION
&
SINE CONDITION

Y'=5.6

ASTIGMATISM

Y'=5.6

DISTORTION %

F=3.98 d
g
SC

-0.5   0.5
SPHERICAL ABERRATION
&
SINE CONDITION

Y'=5.6

DM
DS

-0.5   0.5
ASTIGMATISM

Y'=5.6

-5.0   5.0
DISTORTION %

F=3.2 d
g
SC

-0.5   0.5
SPHERICAL ABERRATION
&
SINE CONDITION

Y'=5.6

DM
DS

-0.5   0.5
ASTIGMATISM

Y'=5.6

-5.0   5.0
DISTORTION %

F=2.86 d
g
SC

-0.5   0.5
SPHERICAL ABERRATION
&
SINE CONDITION

Y'=5.6

DM
DS

-0.5   0.5
ASTIGMATISM

Y'=5.6

-5.0   5.0
DISTORTION %

F=4.4

— d
—·— g
---- SC

-0.5  0.5
SPHERICAL ABERRATION
&
SINE CONDITION

Y'=4.2

---- DM
—— DS

-0.5  0.5
ASTIGMATISM

Y'=4.2

-5.0  5.0
DISTORTION %

F=3.4

— d
—·— g
---- SC

-0.5  0.5
SPHERICAL ABERRATION
&
SINE CONDITION

Y'=4.2

---- DM
—— DS

-0.5  0.5
ASTIGMATISM

Y'=4.2

-5.0  5.0
DISTORTION %

F=3.0

— d
—·— g
---- SC

-0.5  0.5
SPHERICAL ABERRATION
&
SINE CONDITION

Y'=4.2

---- DM
—— DS

-0.5  0.5
ASTIGMATISM

Y'=4.2

-5.0  5.0
DISTORTION %

F=4.5

−0.5   0.5
SPHERICAL ABERRATION
&
SINE CONDITION
— d
—·— g
---- SC

Y'=5.6

−0.5   0.5
ASTIGMATISM
---- DM
— DS

Y'=5.6

−5.0   5.0
DISTORTION %

F=3.4

−0.5   0.5
SPHERICAL ABERRATION
&
SINE CONDITION
— d
—·— g
---- SC

Y'=5.6

−0.5   0.5
ASTIGMATISM
---- DM
— DS

Y'=5.6

−5.0   5.0
DISTORTION %

F=3.0

−0.5   0.5
SPHERICAL ABERRATION
&
SINE CONDITION
— d
—·— g
---- SC

Y'=5.6

−0.5   0.5
ASTIGMATISM
---- DM
— DS

Y'=5.6

−5.0   5.0
DISTORTION %

F=4.4
— d
—·— g
---- SC
-0.5   0.5
SPHERICAL ABERRATION
&
SINE CONDITION

Y'=5.6
---- DM
— DS
-0.5   0.5
ASTIGMATISM

Y'=5.6
-5.0   5.0
DISTORTION %

F=3.4
— d
—·— g
---- SC
-0.5   0.5
SPHERICAL ABERRATION
&
SINE CONDITION

Y'=5.6
---- DM
— DS
-0.5   0.5
ASTIGMATISM

Y'=5.6
-5.0   5.0
DISTORTION %

F=3.0
— d
—·— g
---- SC
-0.5   0.5
SPHERICAL ABERRATION
&
SINE CONDITION

Y'=5.6
---- DM
— DS
-0.5   0.5
ASTIGMATISM

Y'=5.6
-5.0   5.0
DISTORTION %

F=4.4

SPHERICAL ABERRATION & SINE CONDITION
— d
—·— g
---- SC

Y'=5.6

ASTIGMATISM
---- DM
— DS

Y'=5.6

DISTORTION %

F=3.4

SPHERICAL ABERRATION & SINE CONDITION
— d
—·— g
---- SC

Y'=5.6

ASTIGMATISM
---- DM
— DS

Y'=5.6

DISTORTION %

F=3.0

SPHERICAL ABERRATION & SINE CONDITION
— d
—·— g
---- SC

Y'=5.6

ASTIGMATISM
---- DM
— DS

Y'=5.6

DISTORTION %

F=4.3

— d
—·— g
- - - SC
-0.5  0.5
SPHERICAL ABERRATION
&
SINE CONDITION

Y'=5.6

- - - DM
—— DS
-0.5  0.5
ASTIGMATISM

Y'=5.6

-5.0  5.0
DISTORTION %

F=3.3

— d
—·— g
- - - SC
-0.5  0.5
SPHERICAL ABERRATION
&
SINE CONDITION

Y'=5.6

- - - DM
—— DS
-0.5  0.5
ASTIGMATISM

Y'=5.6

-5.0  5.0
DISTORTION %

F=3.0

— d
—·— g
- - - SC
-0.5  0.5
SPHERICAL ABERRATION
&
SINE CONDITION

Y'=5.6

- - - DM
—— DS
-0.5  0.5
ASTIGMATISM

Y'=5.6

-5.0  5.0
DISTORTION %

F=4.5
— d
—·— g
---- SC
-0.5  0.5
SPHERICAL ABERRATION
&
SINE CONDITION

Y'=5.6
---- DM
—— DS
-0.5  0.5
ASTIGMATISM

Y'=5.6
-5.0  5.0
DISTORTION %

F=3.3
— d
—·— g
---- SC
-0.5  0.5
SPHERICAL ABERRATION
&
SINE CONDITION

Y'=5.6
---- DM
—— DS
-0.5  0.5
ASTIGMATISM

Y'=5.6
-5.0  5.0
DISTORTION %

F=2.8
— d
—·— g
---- SC
-0.5  0.5
SPHERICAL ABERRATION
&
SINE CONDITION

Y'=5.6
---- DM
—— DS
-0.5  0.5
ASTIGMATISM

Y'=5.6
-5.0  5.0
DISTORTION %

F=4.1

SPHERICAL ABERRATION
&
SINE CONDITION

Y'=4.2

ASTIGMATISM

Y'=4.2

DISTORTION %

F=3.2

SPHERICAL ABERRATION
&
SINE CONDITION

Y'=4.2

ASTIGMATISM

Y'=4.2

DISTORTION %

F=2.8

SPHERICAL ABERRATION
&
SINE CONDITION

Y'=4.2

ASTIGMATISM

Y'=4.2

DISTORTION %

F = 4.5

—— d
—·— g
---- SC

-0.5   0.5
SPHERICAL ABERRATION
&
SINE CONDITION

Y' = 5.6

---- DM
—— DS

-0.5   0.5
ASTIGMATISM

Y' = 5.6

-5.0   5.0
DISTORTION %

F = 3.8

—— d
—·— g
---- SC

-0.5   0.5
SPHERICAL ABERRATION
&
SINE CONDITION

Y' = 5.6

---- DM
—— DS

-0.5   0.5
ASTIGMATISM

Y' = 5.6

-5.0   5.0
DISTORTION %

F = 3.5

—— d
—·— g
---- SC

-0.5   0.5
SPHERICAL ABERRATION
&
SINE CONDITION

Y' = 5.6

---- DM
—— DS

-0.5   0.5
ASTIGMATISM

Y' = 5.6

-5.0   5.0
DISTORTION %

F=4.4
SPHERICAL ABERRATION
& SINE CONDITION

Y'=5.6
ASTIGMATISM

Y'=5.6
DISTORTION %

F=3.8
SPHERICAL ABERRATION
& SINE CONDITION

Y'=5.6
ASTIGMATISM

Y'=5.6
DISTORTION %

F=3.5
SPHERICAL ABERRATION
& SINE CONDITION

Y'=5.6
ASTIGMATISM

Y'=5.6
DISTORTION %

F=4.3

-0.5  0.5
SPHERICAL ABERRATION
&
SINE CONDITION

Y'=5.6

-0.5  0.5
ASTIGMATISM

Y'=5.6

-5.0  5.0
DISTORTION %

F=3.8

-0.5  0.5
SPHERICAL ABERRATION
&
SINE CONDITION

Y'=5.6

-0.5  0.5
ASTIGMATISM

Y'=5.6

-5.0  5.0
DISTORTION %

F=3.5

-0.5  0.5
SPHERICAL ABERRATION
&
SINE CONDITION

Y'=5.6

-0.5  0.5
ASTIGMATISM

Y'=5.6

-5.0  5.0
DISTORTION %

F=4.5

-0.5  0.5
SPHERICAL ABERRATION
&
SINE CONDITION

— d
—·— g
---- SC

Y'=5.6

-0.5  0.5
ASTIGMATISM

---- DM
—— DS

Y'=5.6

-5.0  5.0
DISTORTION %

F=3.7

-0.5  0.5
SPHERICAL ABERRATION
&
SINE CONDITION

— d
—·— g
---- SC

Y'=5.6

-0.5  0.5
ASTIGMATISM

---- DM
—— DS

Y'=5.6

-5.0  5.0
DISTORTION %

F=3.5

-0.5  0.5
SPHERICAL ABERRATION
&
SINE CONDITION

— d
—·— g
---- SC

Y'=5.6

-0.5  0.5
ASTIGMATISM

---- DM
—— DS

Y'=5.6

-5.0  5.0
DISTORTION %

F=2.86

SPHERICAL ABERRATION
&
SINE CONDITION

Y'=5.6

ASTIGMATISM

Y'=5.6

DISTORTION %

F=3.16

SPHERICAL ABERRATION
&
SINE CONDITION

Y'=5.6

ASTIGMATISM

Y'=5.6

DISTORTION %

F=4.49

SPHERICAL ABERRATION
&
SINE CONDITION

Y'=5.6

ASTIGMATISM

Y'=5.6

DISTORTION %

F=4.4
— d
—·— g
---- SC

SPHERICAL ABERRATION
& SINE CONDITION

Y'=5.6
---- DM
— DS

ASTIGMATISM

Y'=5.6

DISTORTION %

F=3.8
— d
—·— g
---- SC

SPHERICAL ABERRATION
& SINE CONDITION

Y'=5.6
---- DM
— DS

ASTIGMATISM

Y'=5.6

DISTORTION %

F=3.5
— d
—·— g
---- SC

SPHERICAL ABERRATION
& SINE CONDITION

Y'=5.6
---- DM
— DS

ASTIGMATISM

Y'=5.6

DISTORTION %

F=3.8
— d
—·— g
----- SC
SPHERICAL ABERRATION & SINE CONDITION

Y'=5.6
----- DM
——— DS
ASTIGMATISM

Y'=5.6
DISTORTION %

F=3.1
— d
—·— g
----- SC
SPHERICAL ABERRATION & SINE CONDITION

Y'=5.6
----- DM
——— DS
ASTIGMATISM

Y'=5.6
DISTORTION %

F=2.8
— d
—·— g
----- SC
SPHERICAL ABERRATION & SINE CONDITION

Y'=5.6
----- DM
——— DS
ASTIGMATISM

Y'=5.6
DISTORTION %

4,993,814

ZOOM LENS SYSTEM

BACKGROUND OF THE INVENTION

1. Field of the Invention

The present invention relates to a zoom lens system, particularly, it relates to a zoom lens system applicable in small-sized cameras such as electronic still cameras, video cameras and so on.

2. Description of the Prior Art

In recent years, an image pick-up device, electric circuit etc. have become compact considerably and less expensive, since packaging and integration rate thereof have improved. As a result, a volume, weight and cost of a lens system occupying in an electronic still camera, video camera and the like are increasing relatively, thus it has been a strong demand to make the lens compact and to reduce the cost.

Further, a glass plate such as a low-pass filter, half prism or the like is provided at an image side next to lens elements in the electronic still camera or video camera, so that a very long back focal length is required compared with that of the lens system used in single reflex cameras.

In addition, recently, as the resolution of an image pick-up device such as CCD is improved, a high performance must be satisfied throughout a whole image plane.

In a zoom lens system, though there are various conventional types such as a 2-components, 3-components, 4-components or more zoom lens system, it is practically inevitable that the configuration becomes complicated, cost increases and the size becomes larger due to the increase of the number of lens elements as the component increases. Therefore, in order to attain the reduction of the number of lens elements, simplification of the configuration, cost reduction and smaller size, the 2-components zoom lens system is the most effective. However, a zoom lens system used frequently in a lens shutter camera and the like, and having, from object side, a positive lens unit and a negative lens unit is not applicable because of a very short back focal length. On the contrary, as 2-components zoom lens system having, from object side, negative lens unit and a positive lens unit, the ones disclosed in Japanese Patent Laid-Open No. 60246/1978, Japanese Patent LaidOpen No. 114236/1979 and Japanese Patent Publication No. 46809/1986 are known. Though these zoom lens systems are configured with comparatively small numbers of lens elements, that is, six or seven lens elements, they are hard to be said that the zone ratios and brightness are satisfactory and that the back focal lengths are sufficiently long.

Next, considering the whole lens system including an aperture diaphragm, in a zoom lens system having from object side, a negative lens unit and a positive lens unit, the aperture diaphragm is generally arranged in or before or behind the rear lens unit and shiftable along the optical axis of the lens system in a zooming operation. In the electronic still camera, video camera and the like, since the aperture diaphragm is controlled electrically, the space required for the arrangement of the aperture diaphragm becomes larger and further the weight becomes heavier due to a driving system such as a motor and so on. Therefore, in order to make such aperture diaphragm shiftable along the optical axis of the lens system in the zooming operation, a large space must be reserved in a lens barrel for shifting of the aperture diaphragm, thereby compactness of the whole system including the lens barrel becomes difficult to be attained. Furthermore, since a large weight component must be shifted in the zooming operation, a powerful motor is required, which undesirably results in a high cost and electric power consumption.

On the contrary, for example, a 2-components zoom lens system having a stationary aperture diaphragm behind a rear lens unit is disclosed in Japanese Patent Laid-Open No. 35334/1980. In this type, though an entrance pupil is brought nearest to object side to prevent the diameter of a front lens unit from becoming large, since the refractive power balance between the front and rear lens units is not proper, reduction of peripheral illuminance at the shortest focal length condition is large, therefore, in order to prevent this, the diameter of the front lens unit becomes large compared with its zoom ratio. In addition, this system is hard to be said that compactness has been satisfactorily attained because of its configuration with such a comparatively large number as 8 of lens elements.

SUMMARY OF THE INVENTION

An object of the present invention is to provide a zoom lens system applicable to small-sized cameras such as video cameras and electronic still cameras.

Another object of the present invention is to provide a zoom lens system wherein a reduction of the number of lens elements, simplification of the configuration, cost reduction and smaller size are satisfactorily attained.

A further object of the present invention is to provide a zoom lens system having a zoom ratio of about two and a sufficiently long back focal length at a low cost comparable to a fixed focal length lens system.

A further object of the present invention is to provide a zoom lens system wherein the aberrations are corrected well on the whole image plane and also the peripheral illuminance ratio is satisfactorily high.

A further object of the present invention is to provide a zoom lens system wherein a satisfactory compactness and high performance can be achieved in not only lens elements but also the whole zoom lens system including a lens barrel and an aperture diaphragm.

A still further object of the present invention is to provide a zoom lens system having a good performance even when an aperture diaphragm is fixed on the optical axis of the lens system in the zooming operation.

According to the present invention, a zoom lens system comprises from object side to image side, a front lens unit of a negative refractive power and a rear lens unit of a positive refractive power with a variable air space formed between the front and rear lens units, said rear lens unit consisting of a first biconvex lens element, a second biconcave lens element and a third biconvex lens element, wherein the variable air space changes in the zooming operation.

Furthermore, the aperture diaphragm is arranged between the front and rear lens unit, or at the image side to the rear lens unit, said aperture diaphragm is stationary on the optical axis of the lens system in the zooming operation.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

BRIEF DESCRIPTION OF THE DRAWINGS

FIGS. 20g to 20represent the aberration curves of the second embodiment for the shortest focal length;

FIGS. 22a to 22c represent the aberration curves of the fourth embodiment for the longest focal length;

FIGS. 22d to 22f represent the aberration curves of the fourth embodiment for a medium focal length;

FIGS. 22g to 22i represent the aberration curves of the fourth embodiment for the shortest focal length;

FIGS. 30a to 39c represent the aberration curves of the twelfth embodiment for the longest focal length;

FIGS. 39a to 39c represent the aberration curves of the twenty-first embodiment for the longest focal length;

DETAILED DESCRIPTION OF THE PREFERRED EMBODIMENTS

Figure 1:
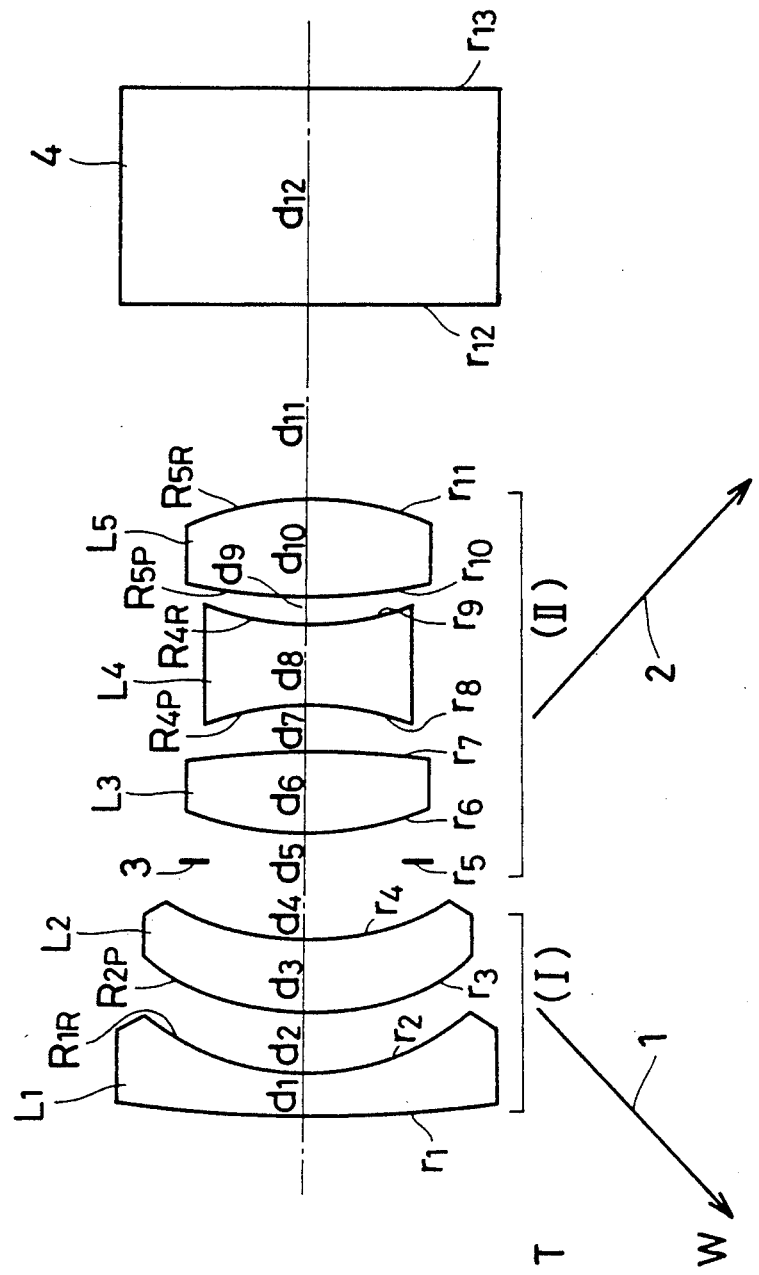
FIG. 1 represents a cross sectional view of the lens system according to first through fourth embodiments of the present invention for the longest focal length.

The following description is provided to enable any person skilled in the optical and camera field to make and use the invention and sets forth the best modes contemplated by the inventor for carrying out his invention. Various modifications, however, will remain readily apparent to those skilled in the art, since the generic principles of the present invention have been defined herein specifically to provide a relatively economical and easily manufactured compact zone lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with an electronic still camera, video camera and the like.

In the drawings, schematic cross sectional views disclose the position of the lens groups and lens elements for the longest focal length with arrows below the lens groups representing the directions of their movements for zooming toward the shortest focal length.

Due to the number of lens elements involved, it was not deemed appropriate to include individual designation of the radii of curvature and axial distances for each lens element and air space. These values, however, are provided in the accompanying tables set forth herein, and the schematic cross sectional views of the respective embodiments follow the normal conventions of an object at the left-hand side of the drawing and the image plane at the right-hand side.

As shown in FIGS. 1 to 12, the present invention provides a zoom lens system comprising from object side to image side, a front lens unit of a negative refractive power and a rear lens unit of a positive refractive power with a variable air space formed between the front and rear lens units, said rear lens unit consisting of a first biconvex lens element, a second biconcave lens element and a third biconvex lens element, wherein the variable air space changes in the zooming operation.

The zoom lens system thus constructed simplifies the configuration required for zooming, and as a result, it is very advantageous from a viewpoint of cost and size.

Moreover, because of the negative lens unit preceding type, not only a sufficiently long back focal length and a small diameter of the front lens unit can be obtained but also the weight of the front negative lens unit itself can be reduced. Since, in a 2-components zoom lens system having a negative lens unit and a positive lens unit from the object side, a rear lens unit is important for zooming and focusing functions, it has been conventionally configurated with 4 to 6 lens elements. In the present invention, the rear lens unit comprises only three lens elements. By adopting a triplet-type into the rear lens unit as the present invention, corrections of various aberrations such as spherical aberration, coma aberration and field curvature and further chromatic aberration become easy to be corrected in spite of the simple configuration.

As a further advantage of the rear lens unit configuration according to the present invention, even when an aperture diaphragm is arranged at the object side, or at the image side of the rear lens unit, further or inside the rear lens unit, aberrations can be corrected well by a slight bending.

Figure 2:
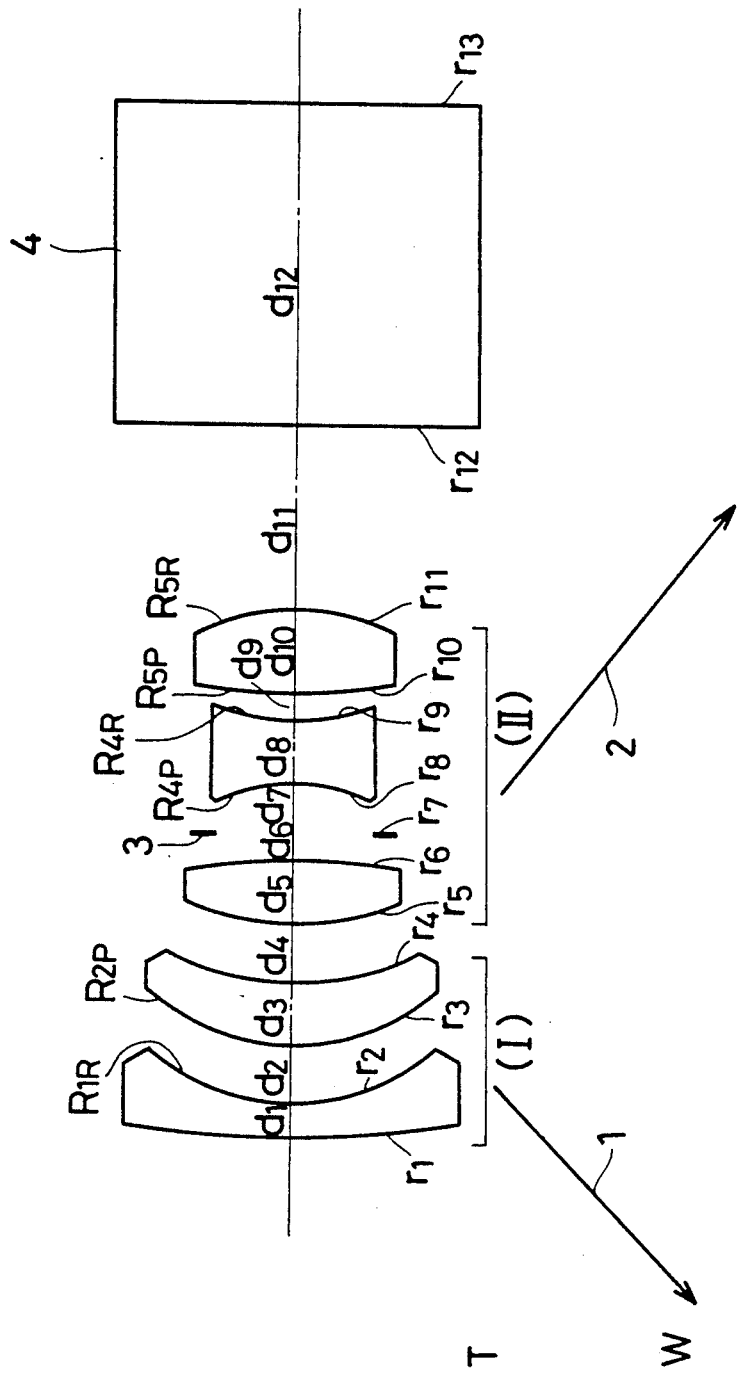
FIG. 2 represents a cross sectional view of the lens system according to a fifth embodiment of the present invention for the longest focal length.
Figure 3:
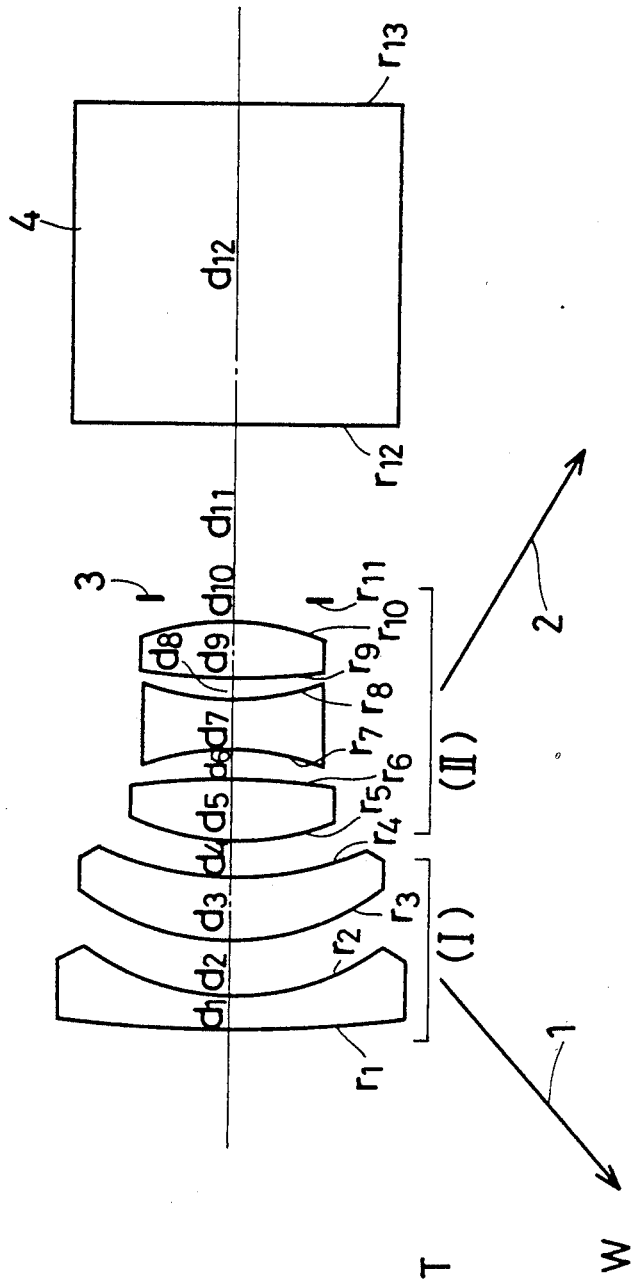
FIG. 3 represents a cross sectional view of the lens system according to a sixth embodiment of the present invention for the longest focal length.

In addition to such a triplet-type rear lens unit, in a first lens type of the present invention, as shown in FIGS. 1 to 3, the front lens unit comprises from the object side to the image side a negative lens element ($L_1$) whose image side surface has a stronger refractive power than its object side surface and a positive meniscus lens element ($L_2$) having an object side surface convex to the object side. A zoom lens system of the first type has a zoom ratio of about 2 in spite of a configuration with only 5 lens elements as a whole. In the front lens unit, the variations in chromatic aberration in the zooming operation can be properly corrected by combination of the negative and positive lens elements, and by arranging the lens elements ($L_1$) and ($L_2$) such that both strong refractive surfaces face each other, variations in various aberrations in the zooming operation can be sufficiently reduced. If such a front lens unit is combined with the triplet-type rear lens unit, the aberrations can be well corrected, and even by a configuration with only five lens elements in the whole lens system which is comparable to a fixed focal length lens system, a zoom lens system having a zoom ratio of about 2 and a maximum aperture ratio of about F NO 2.8 can be realized.

Furthermore, in order to achieve a high performance, compactness and a sufficiently long back focal length, it is desirable to fulfill the following conditions:

$$0.55 < |\phi_I| \cdot f_M < 0.9 \qquad 1$$

$$(f_M = \sqrt{f_W \cdot f_T}, \phi_I < 0)$$

$$0.44 < |\phi_I|/\phi_{II} < 1.0 \qquad 2$$

wherein, $\phi_1$ and $\phi_2$ respectively represent the refractive powers of the front and rear lens units, $f_w$ and $f_r$ respectively represent the shortest and longest focal lengths of the whole lens system.

Condition 1 is related to the refractive power of the front lens unit. If the refractive power of the front lens unit is reduced below the lower limit of Condition 1, the front lens unit must shift largely in the zooming operation and the total length of the whole lens system becomes longer, besides, for ensuring a peripheral illuminance, an effective diameter of the front lens unit must be considerably enlarged in opposition to the objects of compactness and light weight. In addition, it is difficult to obtain a sufficiently long back focal length. Conversely, if the refractive power of the front lens unit is raised above the upper limit of Condition 1, the refractive power of lens elements in the front lens unit is strengthened inevitably, therefore generation of higher-order various aberrations for example, the distortion regarding off-axial light increase, thus high performance is difficult to be achieved by the front lens unit configurated with 2 lens elements.

Condition 2 shows a proper range of refractive power distribution of the front and rear lens units. If the power limit of Condition 2 is violated, not only sufficiently long back focal length is difficult to be ensured, but also compactness of the whole lens system is hard to be attained. Conversely, if the upper limit of Condition 2 is exceeded, though compactness of the whole lens system may be attained, a Petzval sum shifts largely in a negative direction, results in deterioration of field curvature and the performances at periphery of the image plane.

Though a desired zoom lens system can be obtained by fulfilling the conditions 1 and 2 aforementioned, for correcting the aberrations more satisfactorily the following conditions are preferably fulfilled:

$$0.75 < R_{1R}/R_{2P} < 1.1 \qquad (3)$$

$$0.3 < |R_{5R}|/R_{5P} < 0.75 \ |(R_{5R} < 0) \qquad (4)$$

$$0.75 < R_{4R}/|R_{4P}| < 1.35 \ |(R_{4P} < 0) \qquad (5)$$

$$\Delta\nu_1 > 22 \qquad (6)$$

$$nI > 1.70 \qquad (7)$$

$$nII > 1.71 \qquad (8)$$

wherein, R represents the radius of curvature, wherein the first subscript thereof represents the lens number counted from the object side, and the second subscript thereof, that is, P represents the object side surface and R represents the image side surface. $\Delta\nu_1$ represents the difference between the Abbe numbers of two lens elements of the front lens unit, nI and nII respectively represent the averages of the refractive indexes of lens elements composing the front and rear lens units.

Condition 3 stipulates the relationship of the radii of curvature between the opposing surfaces of the front lens unit as doublet type. If the balance declines to the inner limit of Condition 3, a spherical aberration at the longest focal length condition shifts largely in a positive direction, while the field curvature at the shortest focal length condition shifts to a negative direction, and furthermore, the negative distortion is increased. Conversely, if the balance declines to the upper limit of this condition, the negative spherical aberration at the longest focal length condition, in particular, becomes problematic and the contrast is reduced.

Condition 4 shows that the image side surface of the fifth lens element ($L_5$) has a strong refractive power than the object side surface thereof has. However, if the refractive power on the image side surface is intensified below the lower limit of Condition 4, the negative spherical aberration generated on the image side surface becomes too large and correction thereof is not possible any more. Conversely, if the upper limit of Condition 4 is exceeded, though the spherical aberration becomes small, the negative field curvature generates largely and the performance at periphery of the image plane is deteriorated.

Condition 5 shows the refractive power balance of surfaces of the fourth lens element ($L_4$). If the balance declines below the lower limit of Condition 5, the spherical aberration can not be corrected sufficiently. conversely, if it exceeds the upper limit of Condition 5, not only the negative field curvature becomes large, but also the negative distortion becomes excessively large.

Though lower-order Seidel aberrations may be corrected approximately by fulfilling the conditions aforementioned, in order to correct further the chromatic aberration and higher-order aberrations, Conditions 6 to 8 must be fulfilled.

Condition 5 is for minimizing variations in chromatic aberration in the zooming operation by the sufficient correction of chromatic aberration in the front lens unit, and shows that difference between the dispersions of the lens elements ($L_1$) and ($L_2$) must be made suffi ciently. If Condition 6 is violated, correction of the chromatic aberration becomes insufficient.

Conditions 7 and 8 indicate that, in order to maintain a high performance with the configuration of 2 lens units with 5 lens elements in a whole lens system, a glass material having a high refractive index fulfilling Conditions 7 and 8 must be used. If the lower limits of Conditions 7 and 8 are violated, generation of higher-order aberrations are increased and a high image quality is impossible to be obtained in the whole image plane.

Furthermore, the fifth lens element ($L_5$) fulfills the following condition:

$$n_5 > 1.73 \tag{9}$$

Condition 9 indicates that the lens element ($L_5$) must be constituted by a glass material having a sufficiently high refractive index because it has a strong refractive power and is involved largely in various aberrations. If Condition 9 is violated, generation of higher-order aberrations are increased considerably.

If respective conditions 1 to 9 described above are fulfilled, a zoom lens system having a zoom ratio of about 2 and a maximum aperture ratio of about F NO 2.8 can be realized in spite of a configuration with only five less elements in the whole system which is comparable to a fixed focal length lens system, and still the zoom lens system which is very compact and having a long back focal length and a good performance is obtainable.

Figure 4:
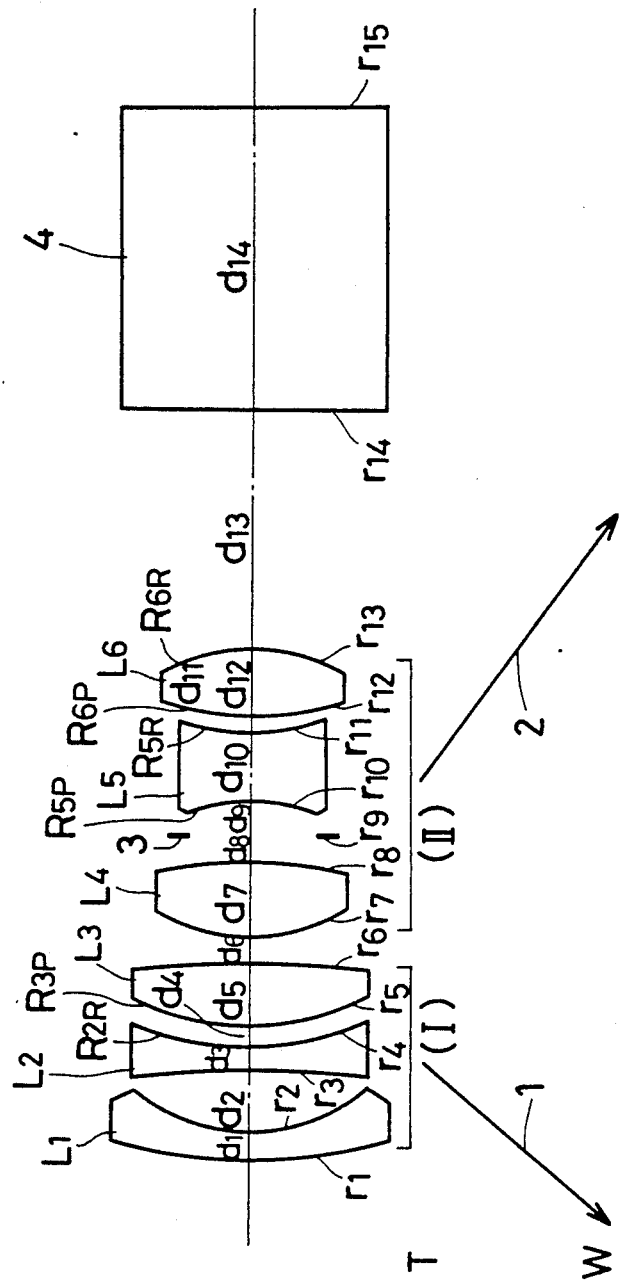
FIG. 4 represents a cross sectional view of the lens system according to seventh through ninth embodiments and a fourteenth embodiment of the present invention for the longest focal length.
Figure 5:
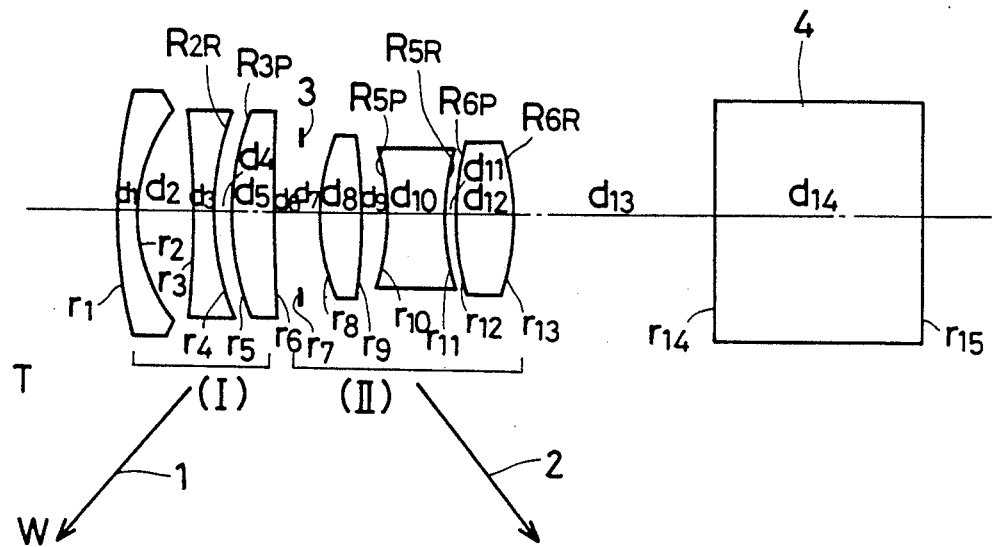
FIG. 5 represents a cross sectional view of the lens system according to tenth through twelfth embodiments of the present invention for the longest focal length.
Figure 6:
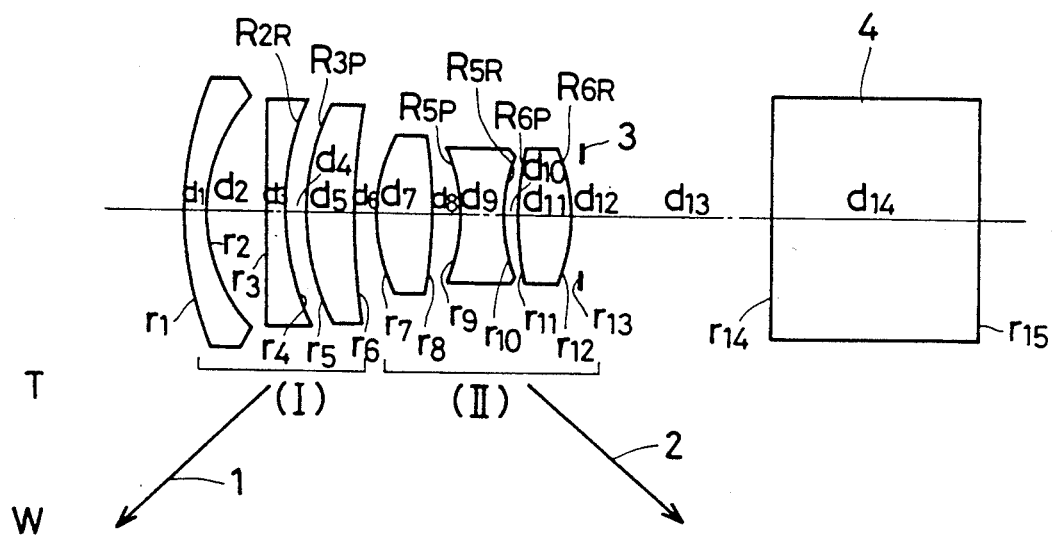
FIG. 6 represents a cross sectional view of the lens system according to a thirteenth embodiment of the present invention for the longest focal length.

As a second lens type of the present invention, as shown in FIGS. 4 to 6, in addition to the triplet-type rear lens unit, it is possible to configurate the front lens unit with from the object side to the image side a negative meniscus lens element ($L_1$) having an object side surface convex to the object side, a negative lens element ($L_2$) whose image side surface has a stronger refractive power than its object side surface and a positive lens element ($L_3$) whose object side surface has a stronger refractive power than its image side surface. By adopting the front lens unit thus configurated as the second type, variations in chromatic aberrations which are, in particular, problematic when a zoom ratio becomes larger can be reduced and various aberrations such as a coma aberration, field curvature, distortion and so on regarding off-axial light can be corrected properly.

Furthermore, in order to achieve a high performance, compactness of the whole lens system and a sufficiently long back focal length, it is desirable to fulfill the following conditions:

$$0.38 < |\phi_I| \cdot f_W < 0.58 \ (\phi_I < 0) \tag{10}$$

$$0.28 < \frac{|\phi_I|}{\phi_{II} Z} < 0.48 \tag{11}$$

wherein, Z represents the zoom ratio of the lens system.

Condition 10 is related to the refractive power of the front lens unit. If the refractive power of the front lens unit is reduced below the lower limit of Condition 10, the front lens unit must shift largely in the zooming operation and the total length of the whole lens system becomes longer, besides, for ensuring a peripheral illuminance, an effective diameter of the front lens unit must be considerably enlarged in opposition to the objects of compactness and light weight. Conversely, if the refractive power of the front lens unit is raised above the upper limit of Condition 10, the refractive powers of the three lens elements in the front lens unit is strengthened inevitably, therefore generation of higher-order various aberrations for example, the distortion regarding offaxial light increase, thus high performance is difficult to be achieved.

Condition 11 shows a proper range of refractive power distribution of the front and rear lens units. If the lower limit of Condition 11 is violated, not only sufficiently long back focal length is difficult to be ensured, but also compactness of the whole lens system is hard to be attained. Conversely, if the upper limit of Condition 11 is exceeded, though compactness of the whole lens system may be attained, a Petzval sum shifts largely to a negative direction, results in deterioration of field curvature and the performances at periphery of the image plane.

Though a desired zoom lens system can be obtained by fulfilling the conditions 10 and 11 aforementioned, for correcting the aberrations more satisfactorily the following conditions are preferably fulfilled:

$$0.4 < |R_{6R}|/R_{6P} < 0.8 | (R_{6R} < 0) \tag{12}$$

$$0.7 < R_{5R}/|R_{5P}| < 1.4 | (R_{5P} < 0) \tag{13}$$

$$0.7 < R_{3P}/R_{2R} < 1.0 \tag{14}$$

$$n_6 > 1.73 \tag{15}$$

$$\nu_5 < 32 \tag{17}$$

wherein, n represents the refractive index, $\nu$ represents the Abbe number, wherein the subscript thereof represents the lens number counted from the object side.

Condition 12 shows that the image side surface of the sixth lens element ($L_6$) has a strong refractive power than the object side surface thereof has. However, if the refractive power on the image side surface is intensified below the lower limit of Condition 12, the negative spherical aberration generated on the image side surface becomes too large and correction thereof is not possible any more. Conversely, if the upper limit of Condition 12 is exceeded, though the spherical aberration becomes small, the negative field curvature generates largely and the performance at periphery of the image plane is deteriorated.

Condition 13 shows the refractive power balance of surfaces of the fifth lens element ($L_5$). If the balance declines below the lower limit of Condition 13, the spherical aberration can not be corrected sufficiently, conversely, if it exceeds the upper limit of Condition 13, not only the negative field curvature becomes largely, but also the negative distortion becomes excessively large.

If the lower limit of Condition 14 is surpassed, the spherical aberration at the longest focal length condition is shifted largely in a negative direction and a large negative field curvature generates at the shortest focal length condition. Conversely, if the upper limit of Condition 14 is surpassed, besides the positive spherical aberration becomes excessively large at the longest focal length condition, and the positive field curvature and negative distortion become excessively large at the shortest focal length condition.

Condition 15 indicates that the sixth lens element ($L_6$) must be constituted by a glass material having a sufficiently high refractive index because it has a strong refractive power and is involved largely in various aberrations. If Condition 15 is violated, generation of higher-order aberrations are increased considerably.

Condition 16 defines the Abbe number of the fifth lens element ($L_5$) having a main role of correcting chromatic aberration in the whole lens system. Correction of chromatic aberration is insufficient unless a high dispersion material as high as fulfilling this condition is used.

If respective conditions 10 to 16 described heretofore are fulfilled, a vary compact zoom lens system having a sufficiently long back focal length and a high performance can be realized in spite of a small number of lens elements of six in a whole lens system.

Figure 7:
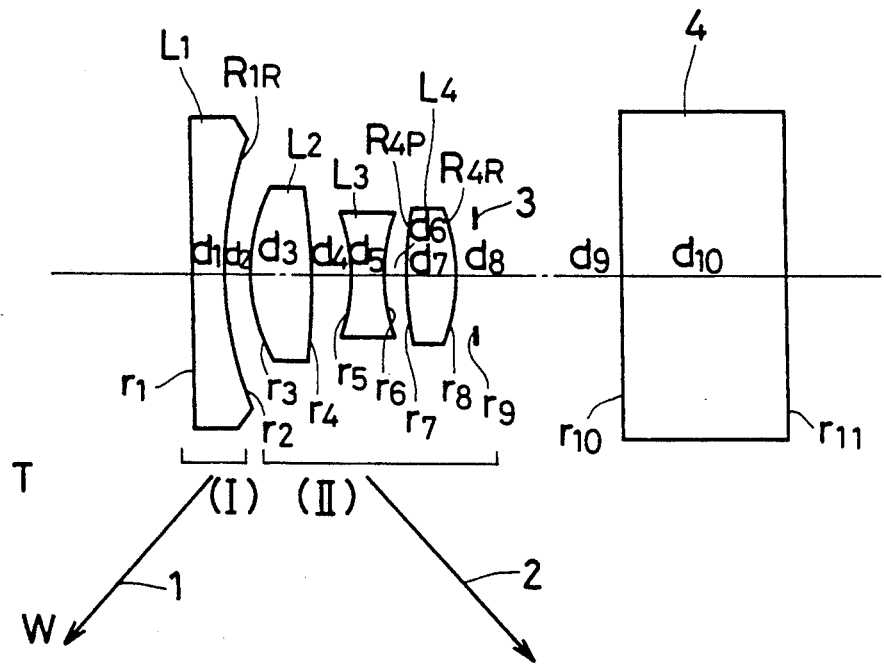
FIG. 7 represents a cross sectional view of the lens system according to a fifteenth embodiment of the present invention for the longest focal length.
Figure 8:
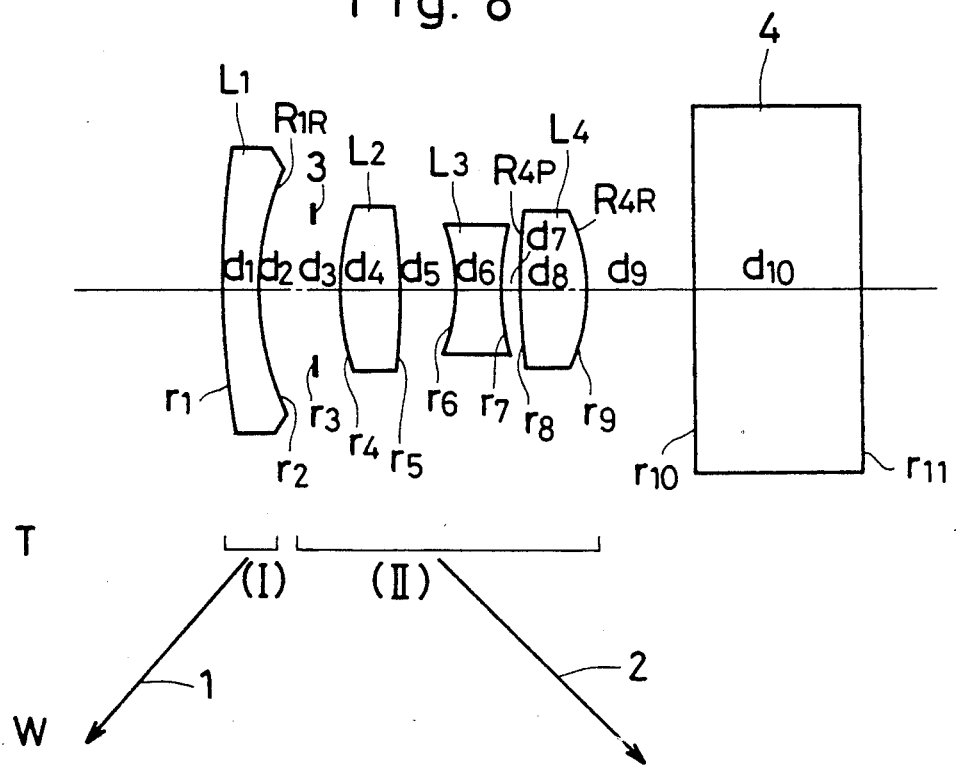
FIG. 8 represents a cross sectional view of the lens system according to sixteenth and seventeenth embodiments of the present invention for the longest focal length.

As a third lens type of the present invention, as shown in FIGS. 7 and 8, in addition to the triplet-type rear lens unit, it is also possible to configurate the front lens unit with from the object side to the image side only one negative lens element ($L_1$) whose image side surface has a stronger refractive power than its object side surface.

Chromatic aberration is usually corrected at the front lens unit having a positive and negative lens elements as above-mentioned first and second lens type. However, it can be kept amply within the permissible range by means of using one less element with low dispersion and making the chromatic aberration distribute to the longest focal length condition and the shortest focal length condition.

Furthermore, for ensuring the sufficiently long back focal length and obtaining the stable performance at the whole image plane in spite of the light and compact construction, the following conditions are preferably fulfilled:

$$0.43 < |\phi_1| \cdot f_w < 0.60 \quad |0 \; (\phi_1 < 0) \quad (17)$$

$$0.46 < |\phi_1|/\phi_{II} < 0.70 \quad (18)$$

Condition 17 is related to the refractive power of the front lens unit. If the refractive power of the front lens unit is reduced below the lower limit of Condition 17, the front lens unit must shift largely in the zooming operation and the total length of the whole lens system becomes longer, besides, for ensuring a perpheral illuminance, an effective diameter of the front lens unit must be considerably enlarged in opposition to the objects of compactness and light weight. In addition, it is difficult to obtain a sufficiently long back focal length. Conversely, if the refractive power of the front lens unit is raised above the upper limit of Condition 17, a field curvature and coma aberration regarding off-axial light can not be completely corrected by only one lens element of the front lens unit.

Condition 18 shows a proper range of refractive power distribution of the front and rear lens units. If the lower limit of Condition 18 is violated, not only sufficiently long back focal length is difficult to be ensured, but also compactness of the whole lens system is hard to be attained. Conversely, if the upper limit of Condition 18 is exceeded, though compactness of the whole lens system may be attained, a Petzval sum shifts largely in a negative direction, results in deterioration of field curvature and the performances at periphery of the large plane.

Though a desired zoom lens system can be obtained by fulfilling the conditions 17 and 18 aforementioned, for correcting the aberrations more satisfactorily the following conditions are preferably fulfilled:

$$0.8 < \phi_{IR}/\phi_I < 1.7 \left( \phi_{IR} = \frac{1 - n_1}{R_{1R}} < 0 \right) \quad 19$$

$$0 < |R_{4R}|/R_{4P} < 0.7 \; (R_{4R} < 0) \quad 20$$

Condition 19 stipulates the shape of only one lens element ($L_1$) composing the front lens unit, and shows that the negative refractive power must be concentrated on the image side surface thereof. Aberrations which depend largely upon the shape of the lens element ($L_1$) are spherical aberration at the longest focal length condition, distortion at the shortest focal length condition, and condition, distortion at the shortest focal length condition, and furthermore, coma aberration and field curvature regarding off-axial light. If the refractive power of the image side surface is reduced below the lower limit of Condition 19, the negative distortion becomes large and the contrast is deteriorated considerably by the coma aberration generated on the object side surface thereof. Conversely, if the refractive power of the image side surface is strengthened above the upper limit of this condition, the positive spherical aberration at the longest focal length condition is enlarged and the variations in aberrations due to the zooming operation increase, thus objects of the present invention are difficult to be obtained.

Condition 20 indicates the refractive power distribution of the object side surface and image side surface of the lens element ($L_4$) nearest to the image plane. As shown in this condition, the lens element ($L_4$) is preferably a biconvex lens element with a strong refractive power on the image side surface than that on the object side surface for correcting the field corvature well. If the refractive power of the image side surface is weakened above the upper limit of Condition 20, the negative field curvature can not be completely corrected, results in a poor image plane characteristic. Conversely, if the refractive power of the image side surface is strengthened below the lower limit, the negative spherical aberration generated as this surface is enlarged, the axial performance is deteriorated and the error sensitivity at manufacturing increases, thus not preferable.

If respective conditions 17 to 20 aforementioned are fulfilled, by only four lens elements in the whole lens system which is comparable to a fixed focal length lens system or less, a very compact zoom lens system having a sufficiently long back focal length and a good performance throughout the whole image plane can be realized.

In the first to third lens types, each aperture diaphragm is shiftable with the rear lens unit along the optical axis of the lens system in the zooming operation.

Next, a zoom lens system having a stationary aperture diaphragm on the optical axis of the lens system in the zooming operation is described.

Figure 13:
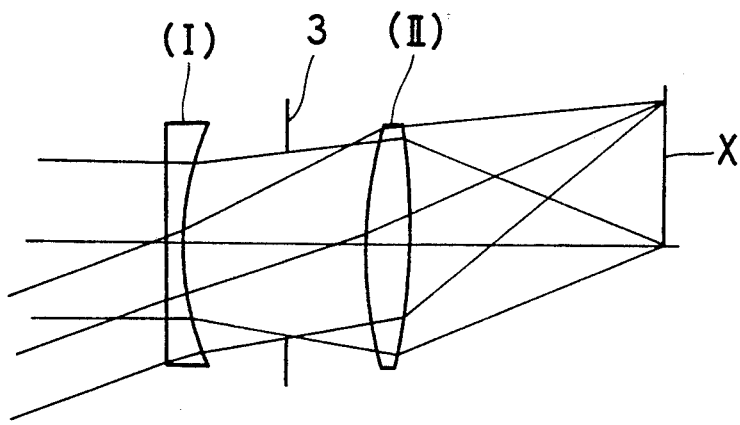
FIG. 13 represents a schematic view showing passing states of axial and off-axial rays in the case where an aperture diaphragm is arranged between front and rear lens units.
Figure 14:
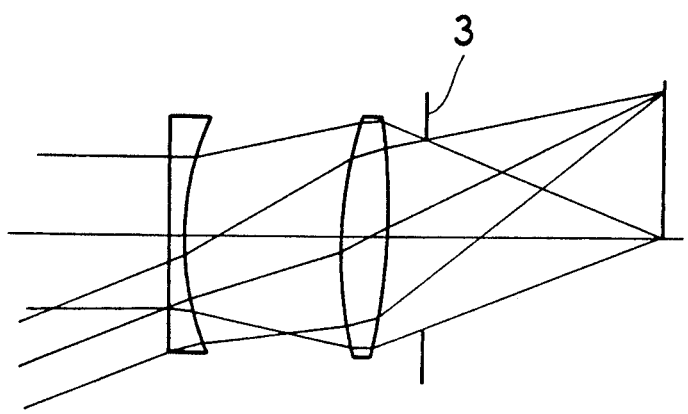
FIG. 14 represents a schematic view showing passing states of axial and off-axial rays in the case where the aperture diaphragm is arranged at an image side of the rear les unit.
Figure 15:
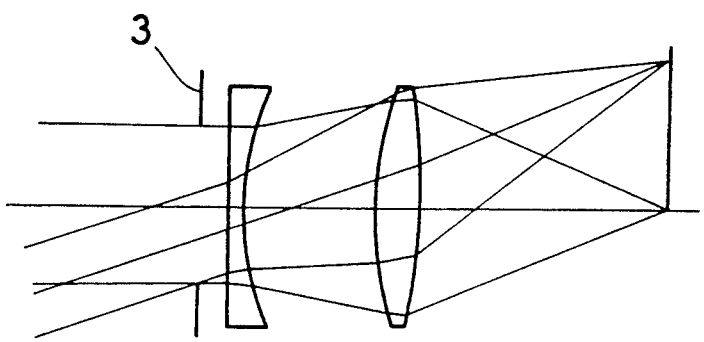
FIG. 15 represents a schematic view showing passing states of axial and off-axial rays in the case where the aperture diaphragm is arranged at an object side of the rear lans unit.

Now, there are three types for the 2-components zoom lens system with a stationary aperture diaphragm, a first type is to dispose between the front and rear lens units, a second is to arrange at the object side of the front lens unit and a third type is to install at the image side of the rear lens unit. Though these types are suitably selected taking into account of mechanical restrictions at the camera system in usual, here, assuming that there is no restriction and any of three types can be selected freely. In this case, the first type has the smallest lens diameter and weight as well as easy aberration correction. Above mentioned three types lens system are shown in FIGS. 13 to 15. In the FIGS., (I) denotes a front lens unit, (II) indicates a rear lens unit, (3) is an aperture diaphragm and (X) represents an image plane. FIG. 13 shows axial and off-axial light flux in the first type. FIG. 14 shows that in the third type and FIG. 15 shows that of the second type, wherein respective lens diameters are same. Since the off-axial flux of light in general is restricted not only by the diaphragm but also by the effective diameter of the lens element as such, peripheral illuminance is reduced. At this time, if the lens diameter is same, as will be apparent from the figures, the first type has the largest quantity of off-axial light flux. In order to obtain about the same quantity of off-axial light flux as the first type, the diameter of the front lens unit must be enlarged considerably for the third type, and the diameter of the rear lens unit for the second type. Thereby, since off-axial light flux passes at the edge of the lens, generation of various aberrations increase sharply, thus the number of lens elements must be increased to correct that. Therefore, the first type has advantages in compactness and low cost.

In general, in a zooming operation from the longest focal length condition to the shortest focal length condition, the rear lens unit in a 2-components zoom lens system having a negative lens unit and a positive lens unit is moved toward the image side. Though it is possible that the front lens unit is moved toward the image side as same as the rear lens unit, in point of facilitating correction of aberration and reduction of lens elements, it is desirable that the front lens unit is moved toward the object side in the opposite direction of the rear lens unit for having a large zoom ratio.

That is, the front and rear lens units contact closely to the fixed diaphragm at the longest focal length condition, and in the zooming operation to the shortest focal length condition, the front lens unit is shifted toward the object side and the rear lens unit toward the image side. THough this type is advantageous with respect to correction of the aberrations, if the compactness of the whole lens system is further pursued, shifting manner of the front and rear lens units must be selected properly. Namely, the front lens unit diameter becomes large if it shifts largely, and if the rear lens unit shifts largely, its diameter becomes large for abtaining a sufficient illuminance. In order to obtain the proper shifting manner of the front and rear lens unit, the following conditions regarding the refractive power balance between the front and rear lens units must be fulfilled:

$$0.4 < |\phi_I|/\phi_{II} < 0.65 | 0(\phi_1 < 0) \quad (21)$$

If the refractive power balance exceeds the lower limit of Condition 21 and the refractive power of the front lens unit becomes weaker, since the front lens unit must shift largely toward the object side in the zooming operation, the front lens unit diameter must be enlarged and the back focal length is apt to become insufficient. Conversely, if the upper limit of Condition 21 is exceeded, though the front lens unit diameter becomes smaller, the rear lens unit diameter increases a little and a Petzval sum tends to shift largely negatively to deteriorate the field curvature. In addition, generation of higher-order aberrations increases to cause deterioration of the performance or increase the number of lens elements.

Figure 9:
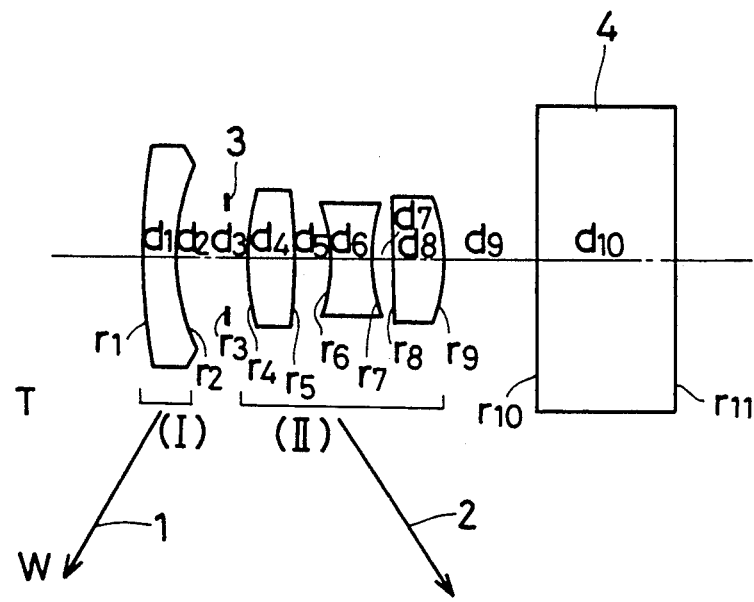
FIG. 9 represents a cross sectional view of the lens system according to an eighteenth embodiment of the present invention for the longest focal length.
Figure 10:
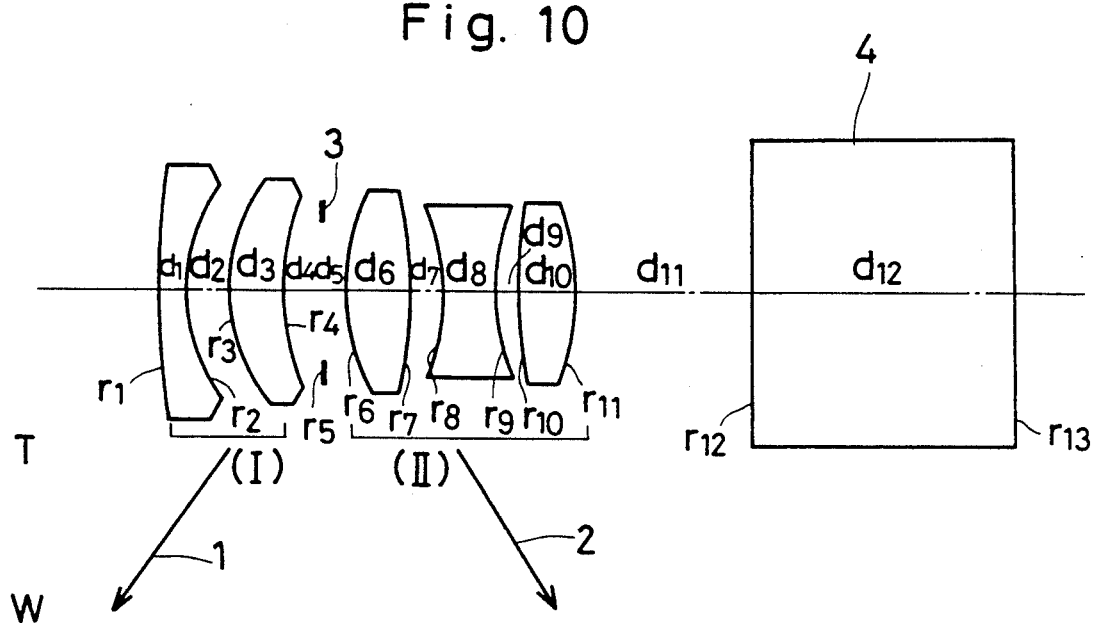
FIG. 10 represents a cross sectional view of the lens system according to a nineteenth embodiment of the present invention for the longest focal length.

A zoom lens system described above, having an aperture diaphragm between a front and rear lens units corresponds to FIGS. 9 and 10.

Figure 16:
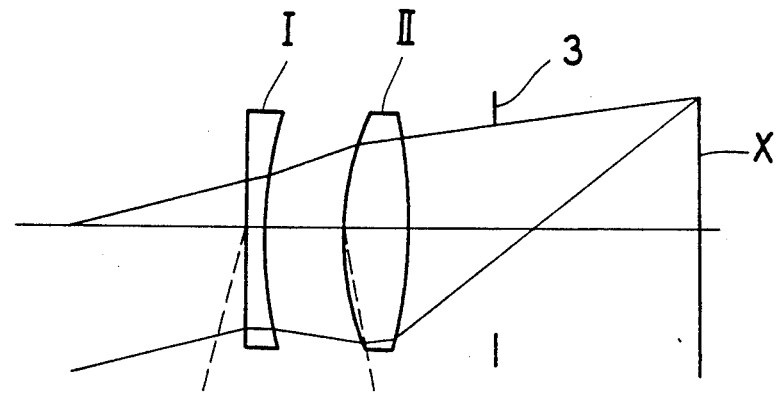
FIG. 16 represents a schematic view showing a passing state of peripheral light flux at the longest focal length in a zoom lens system having a stationary aperture diaphragm at an image side of a rear lens unit.
Figure 17:
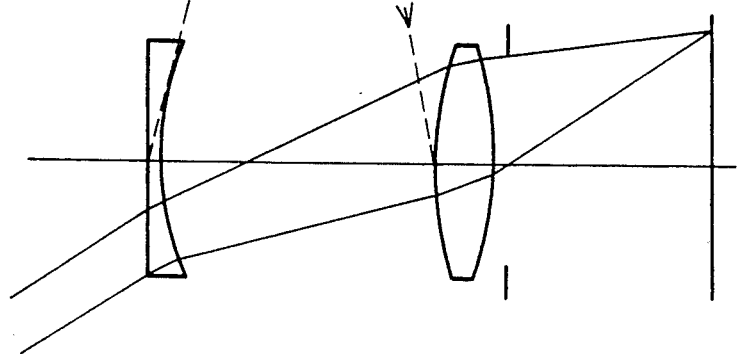
FIG. 17 represents a schematic view showing a passing state of peripheral light flux at the shortest focal length in the zoom lens system having the stationary aperture diaphragm at the image side of the rear lens unit.
Figure 18:
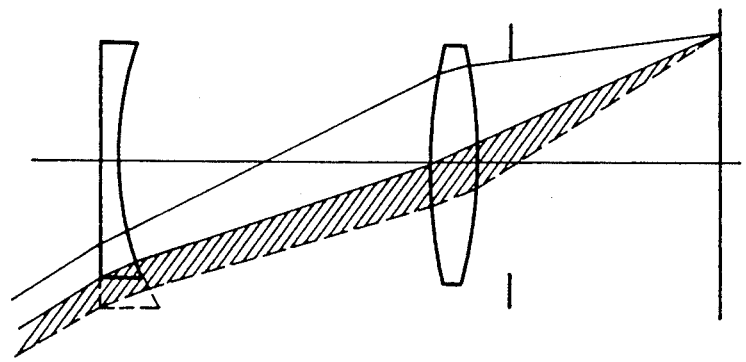
FIG. 18 represents a schematic view showing a passing state of peripheral light flux different from FIG. 17 at the shortest focal length in the zoom lens system having the stationary aperture diaphragm at the image side of the rear lens unit.
Figure 19A:
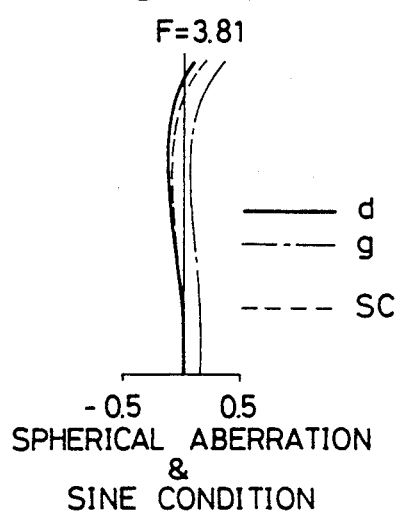
FIGS. 19a and 19c represent the aberration curves of the first embodiment for the longest focal length.
Figure 19B:
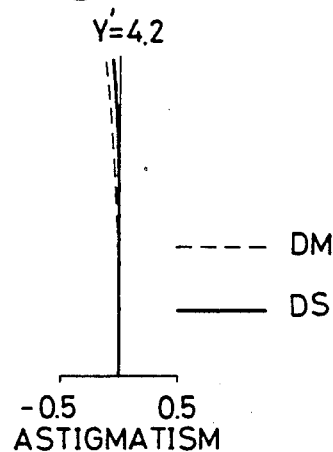
FIGS. 19d to 19f represent the aberration curves of the first embodiment for a medium focal length.
FIGS. 19g to 19i represent the aberration curves of the first embodiment for the shortest focal length.
Figure 19C:
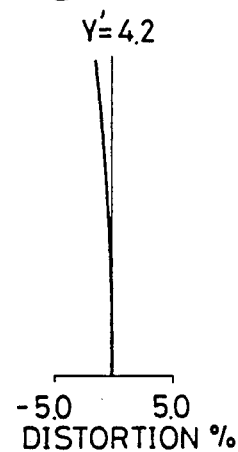
Figure 19D:
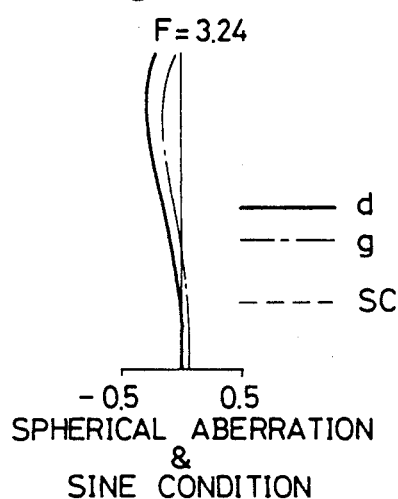
Figure 19E:
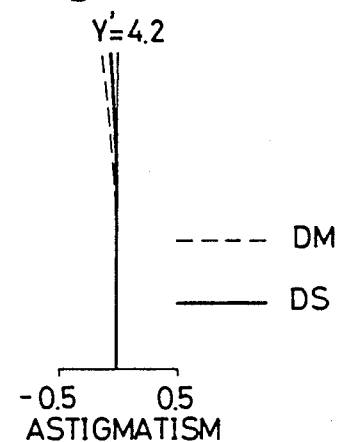
Figure 19F:
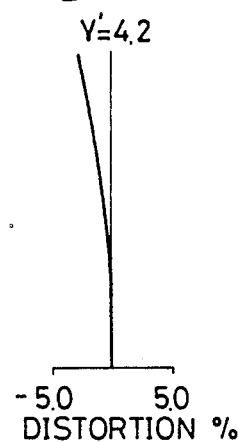
Figure 19G:
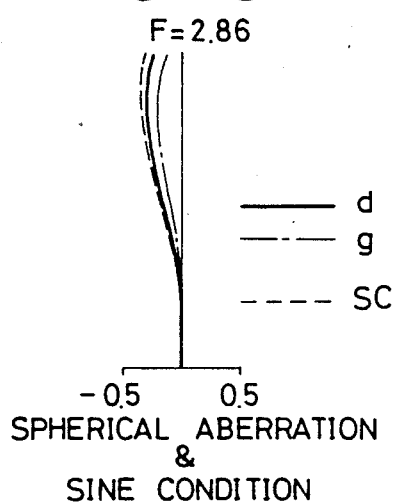
Figure 19H:
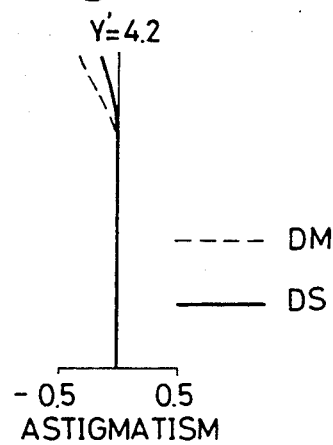
Figure 19I:
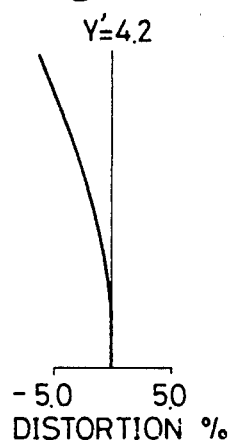
Figure 20A:
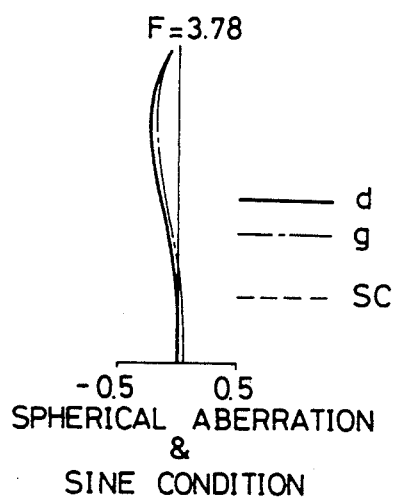
FIGS. 20a to 20c represent the aberration curves of the second embodiment for the longest focal length.
Figure 20B:
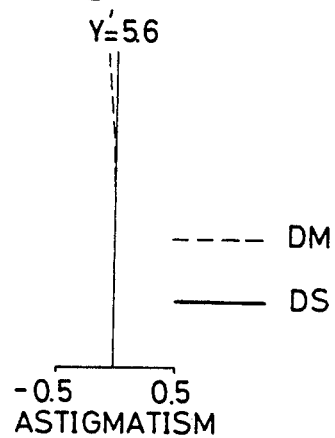
Figure 20C:
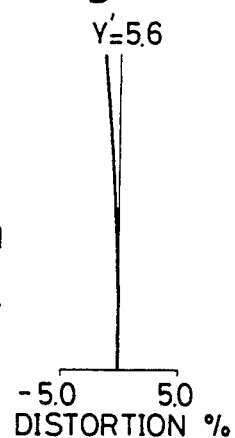
Figure 20D:
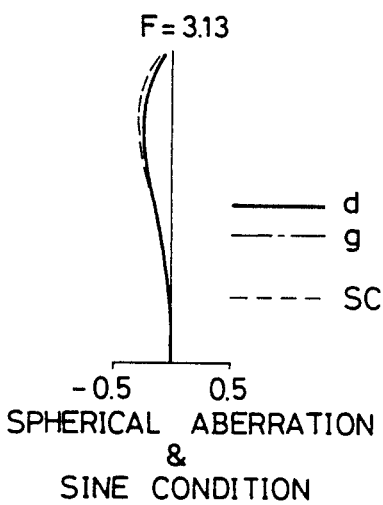
FIGS. 20d to 20f represent the aberration curves of the second embodiment for a medium focal length.
Figure 20E:
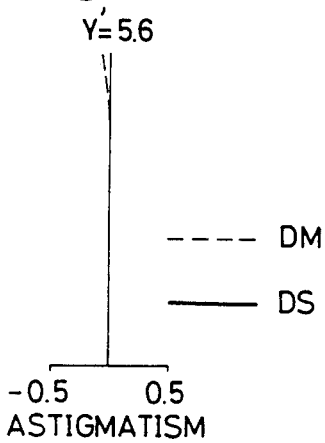
Figure 20F:
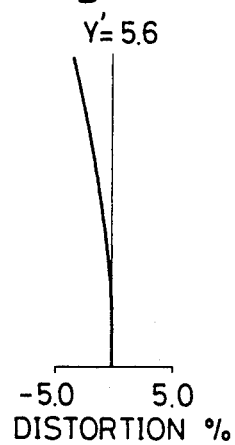
Figure 20G:
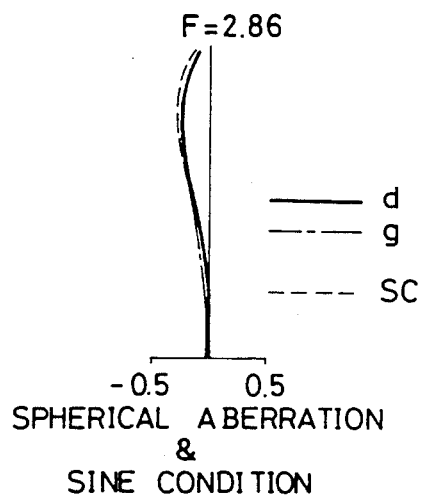
Figure 20H:
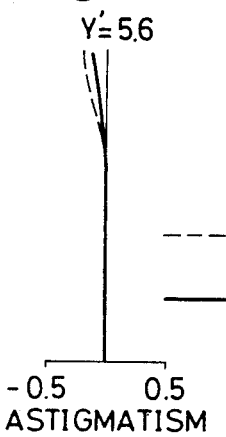
Figure 20I:
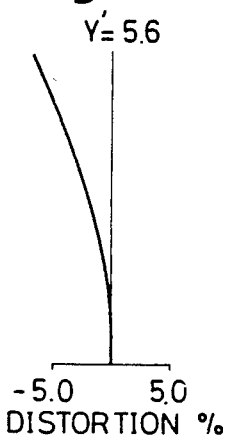
Figure 21A:
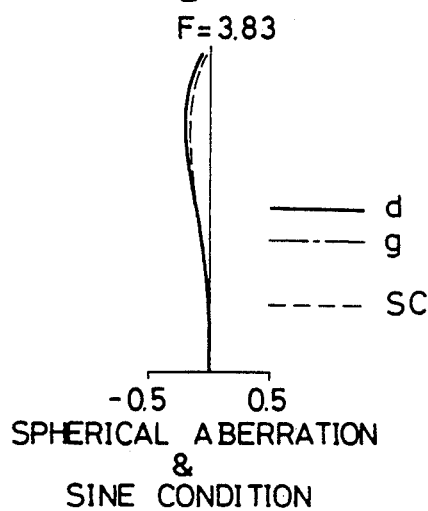
FIGS. 21a to 21c represent the aberration curves of the third embodiment for the longest focal length.
Figure 21B:
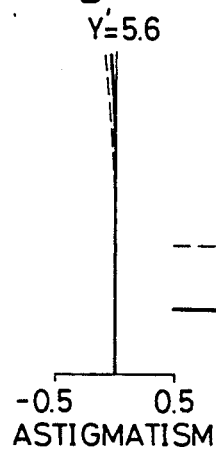
Figure 21C:
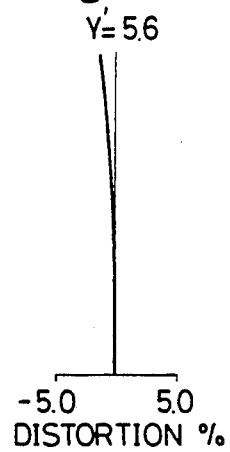
Figure 21D:
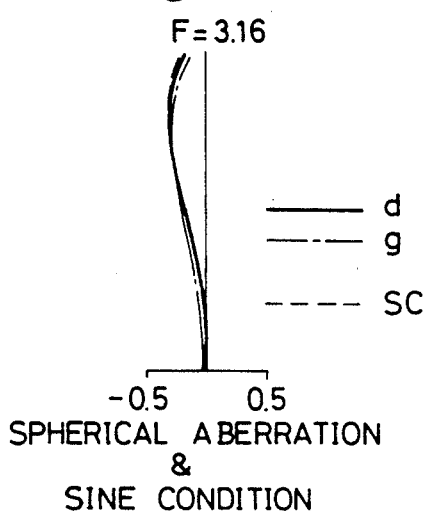
FIGS. 21d to 21f represent the aberration curves of the third embodiment for a medium focal length.
Figure 21E:
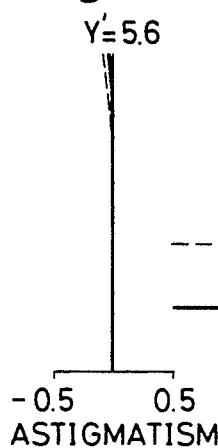
Figure 21F:
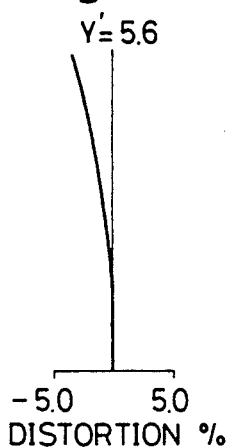
Figure 21G:
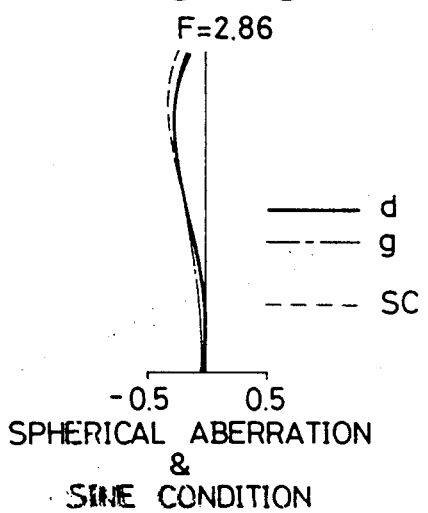
FIGS. 21g to 21i represent the aberration curves of the third embodiment for the shortest focal length
Figure 21H:
Figure 21I:
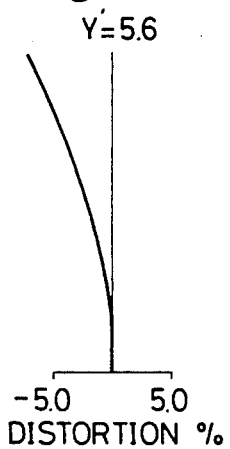
Figure 23A:
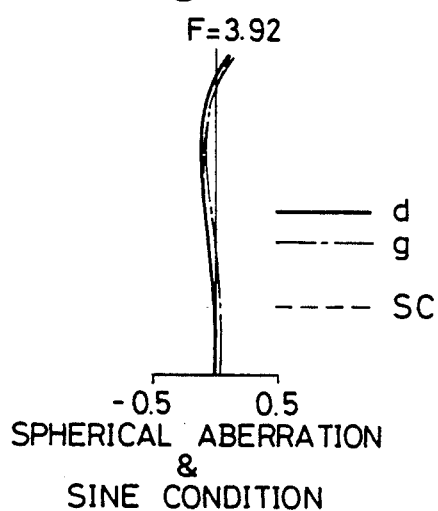
FIGS. 23a to 23c represent the aberration curves of the fifth embodiment for the longest focal length.
Figure 23B:
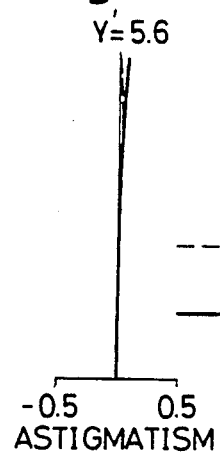
Figure 23C:
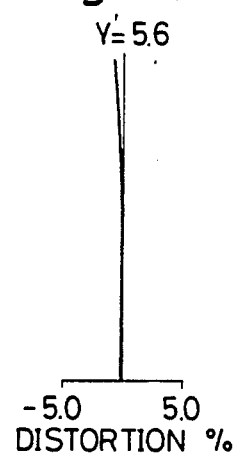
Figure 23D:
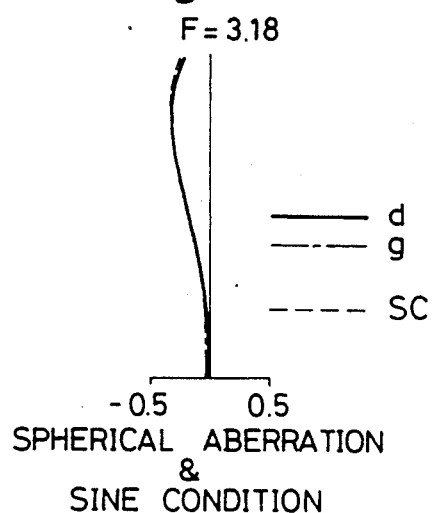
FIGS. 23d to 23f represent the aberration curves of the fifth embodiment for a medium focal length.
Figure 23E:
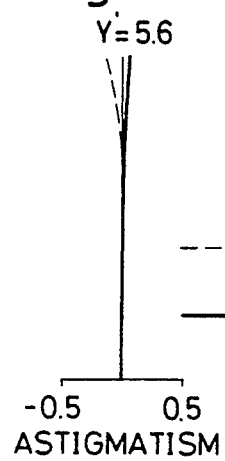
Figure 23F:
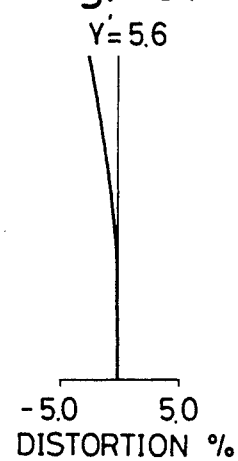
Figure 23G:
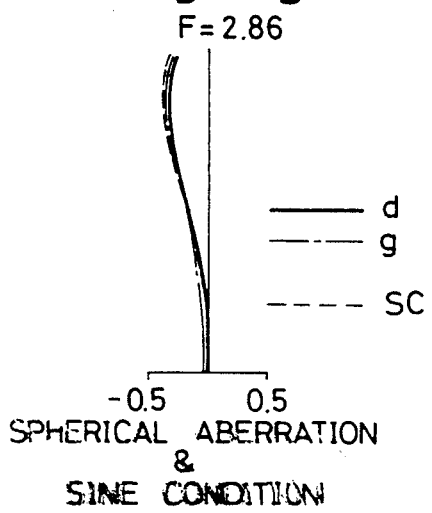
FIGS. 23g to 23i represent the aberration curves of the fifth embodiment for the shortest focal length.
Figure 23H:
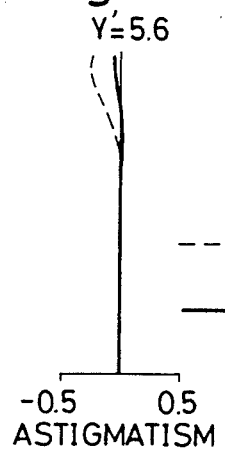
Figure 23I:
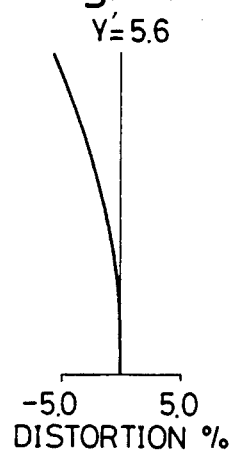
Figure 24A:
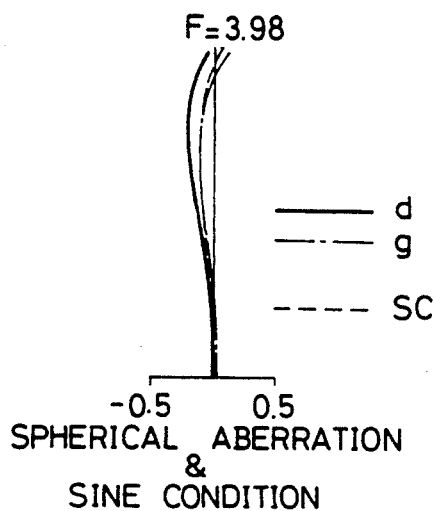
FIGS. 24a to 24c represent the aberration curves of the sixth embodiment for the longest focal length.
Figure 24B:
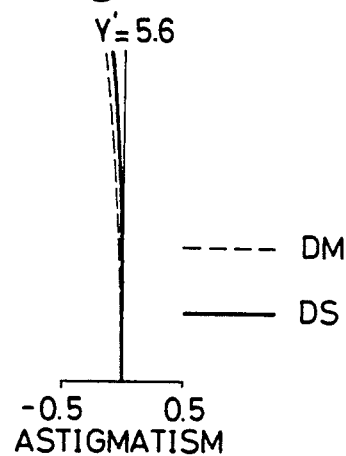
Figure 24C:
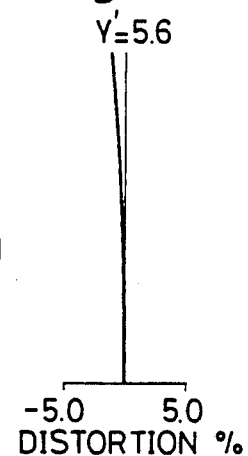
Figure 24D:
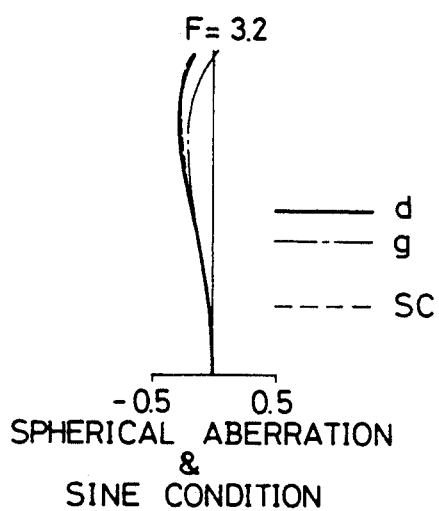
FIGS. 24d to 24f represent the aberration curves of the sixth embodiment for a medium focal length.
Figure 24E:
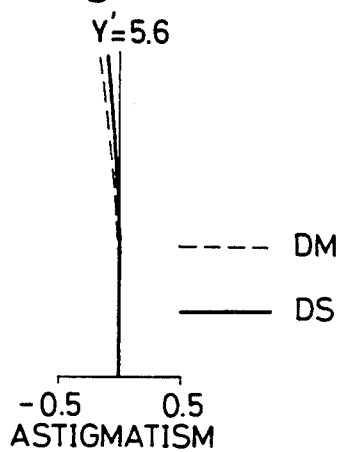
Figure 24F:
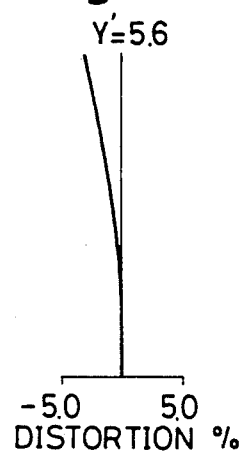
Figure 24G:
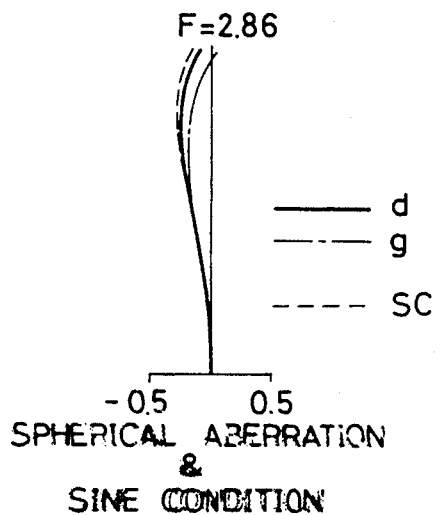
FIGS. 24g to 24i represent the aberration curves of the sixth embodiment for the shortest focal length.
Figure 24H:
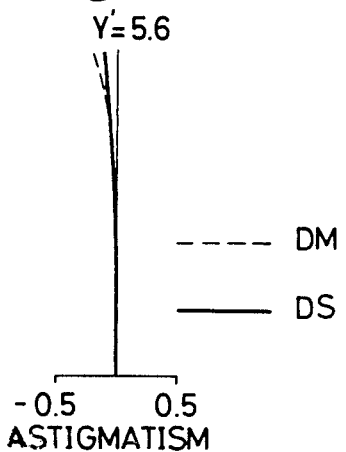
Figure 24I:
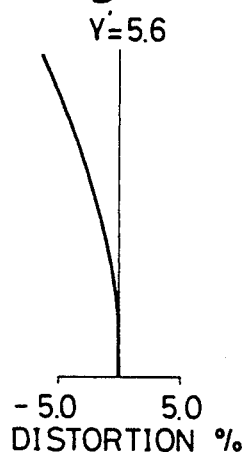
Figure 25A:
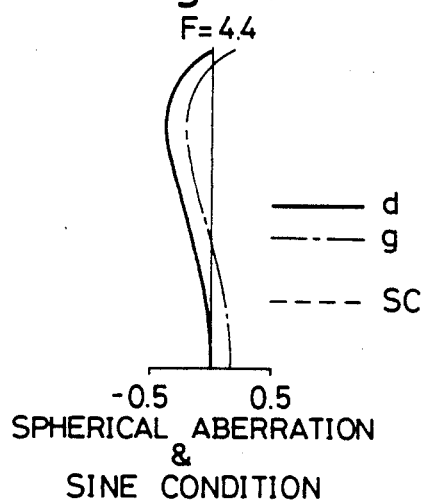
FIGS. 25a to 25c represent the aberration curves of the seventh embodiment for the longest focal length.
Figure 25B:
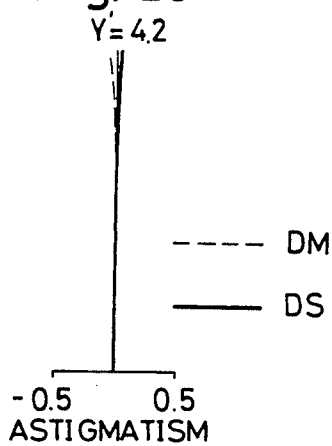
Figure 25C:
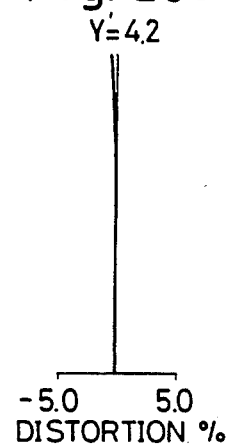
Figure 25D:
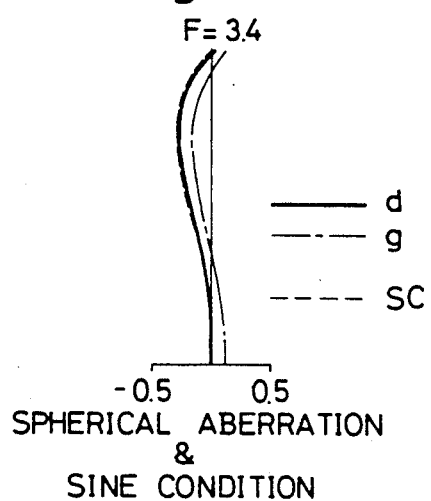
FIGS. 25d to 25f represent the aberration curves of the seventh embodiment for a medium focal length.
Figure 25E:
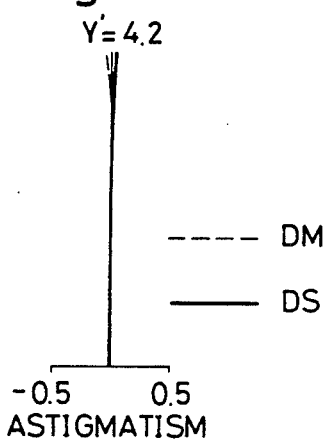
Figure 25F:
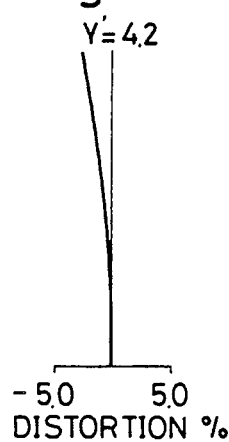
Figure 25G:
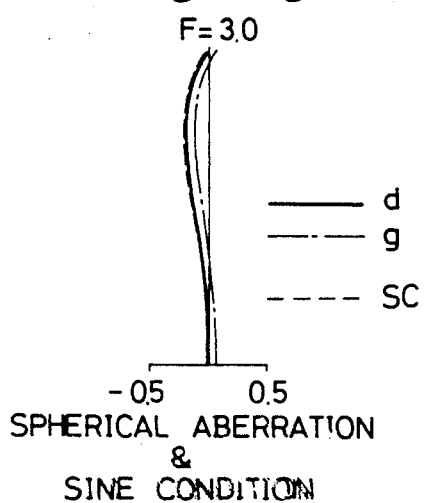
FIGS. 25g to 25i represent the aberration curves of the seventh embodiment for the shortest focal length.
Figure 25H:
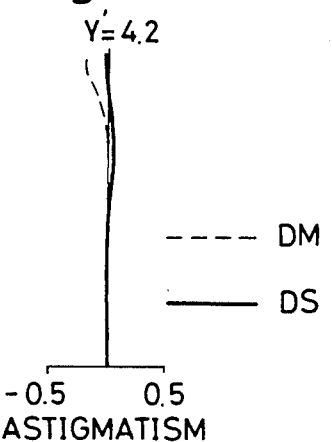
Figure 25I:
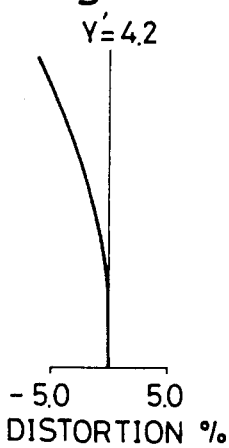
Figure 26A:
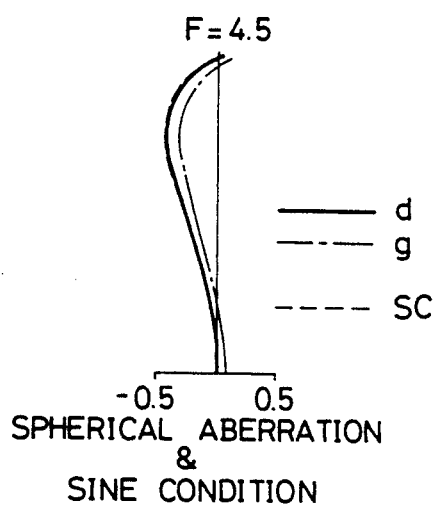
FIGS. 26a to 26c represent the aberration curves of the eighth embodiment for the longest focal length.
Figure 26B:
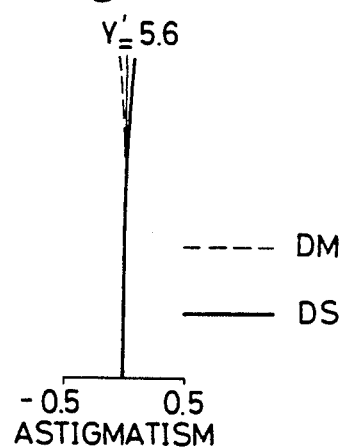
Figure 26C:
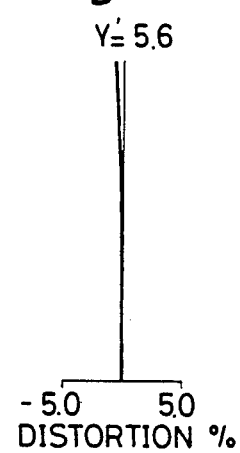
Figure 26D:
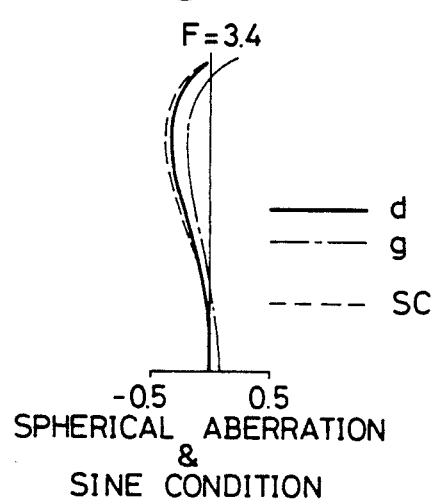
FIGS. 26d to 26f represent the aberration curves of the eighth embodiment for a medium focal length.
Figure 26E:
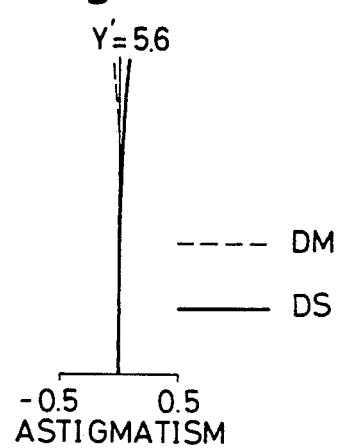
Figure 26F:
Figure 26G:
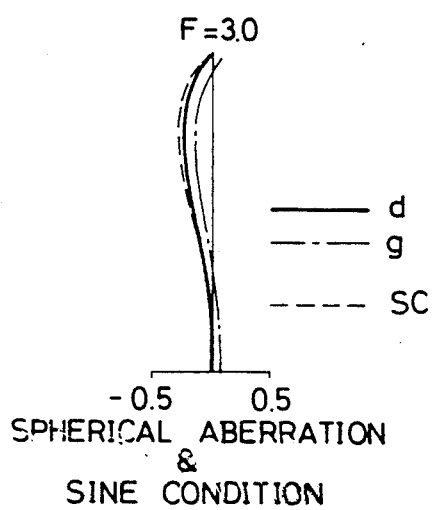
FIGS. 26g to 26i represent the aberration curves of the eighth embodiment for the shortest focal length.
Figure 26H:
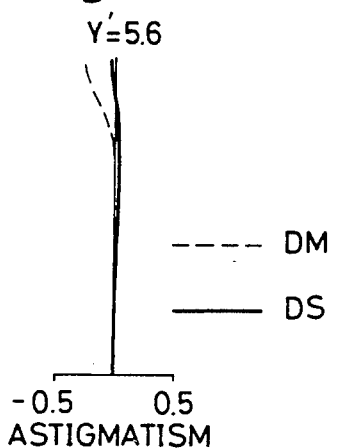
Figure 26I:
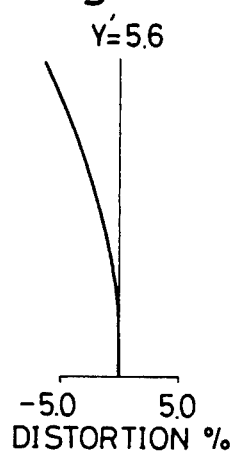
Figure 27A:
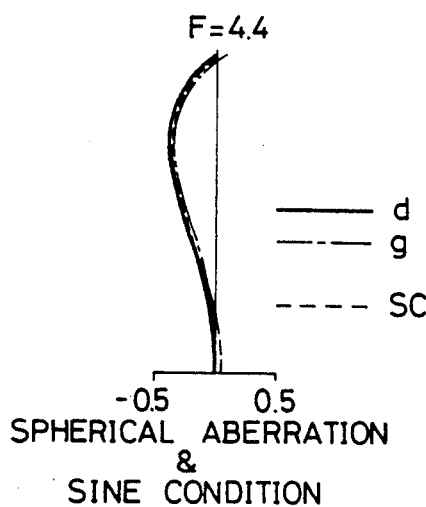
FIGS. 27a to 27c represent the aberration curves of the ninth embodiment for the longest focal length.
Figure 27B:
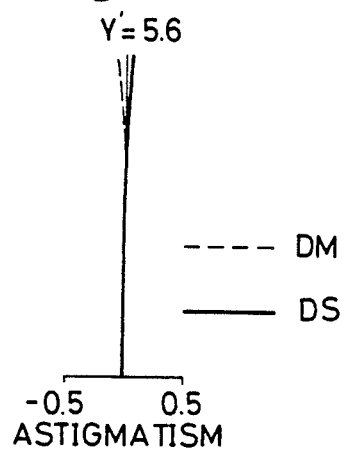
Figure 27C:
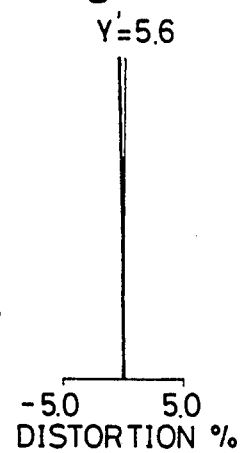
Figure 27D:
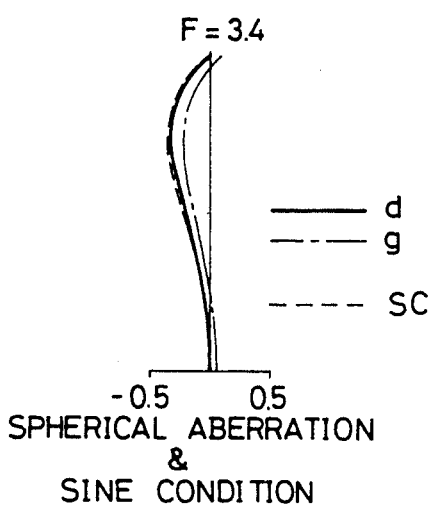
FIGS. 27d to 27f represent the aberration curves of the ninth embodiment for a medium focal length.
Figure 27E:
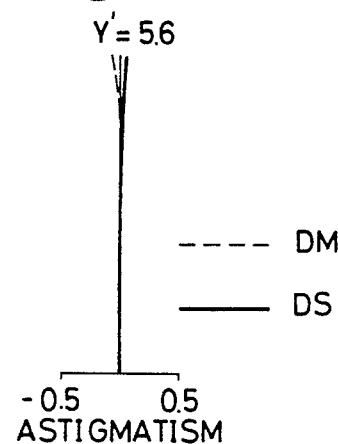
Figure 27F:
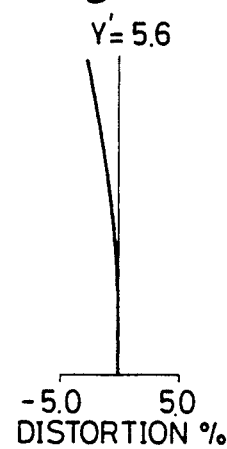
Figure 27G:
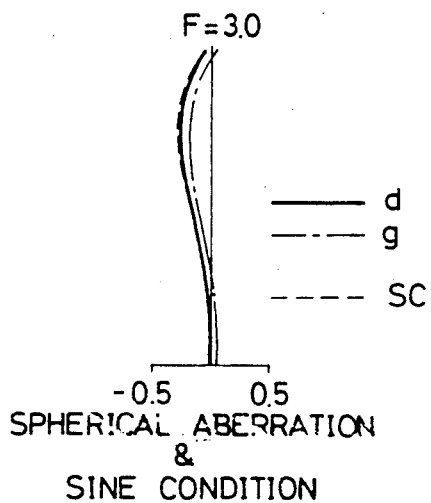
FIGS. 27g to 27i represent the aberration curves of the ninth embodiment for the shortest focal length.
Figure 27H:
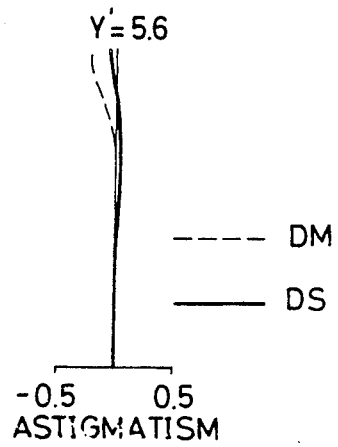
Figure 27I:
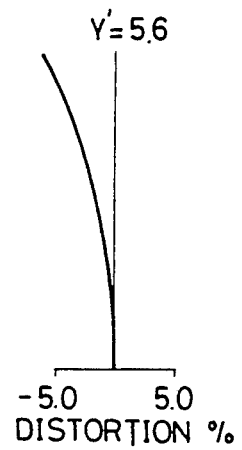
Figure 28A:
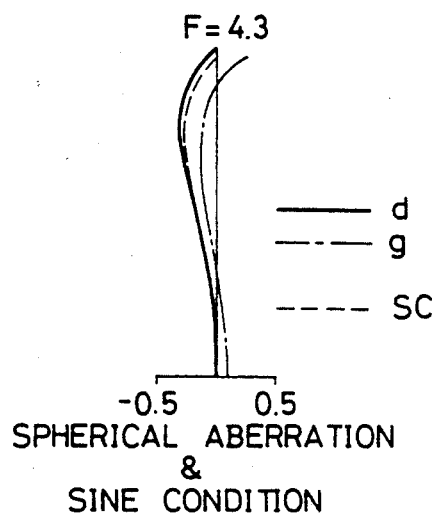
FIGS. 28a to 28c represent the aberration curves of the tenth embodiment for the longest focal length.
Figure 28B:
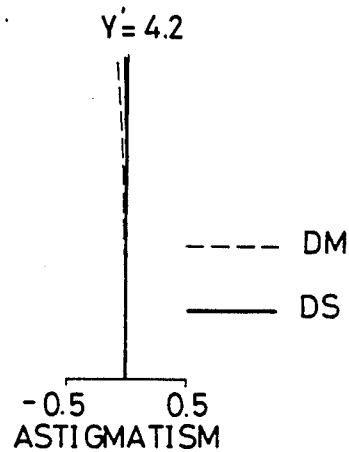
Figure 28C:
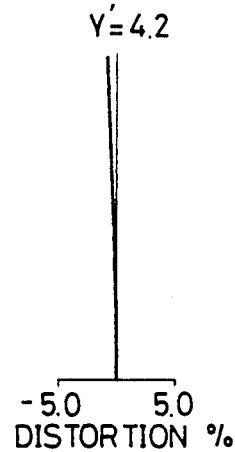
Figure 28D:
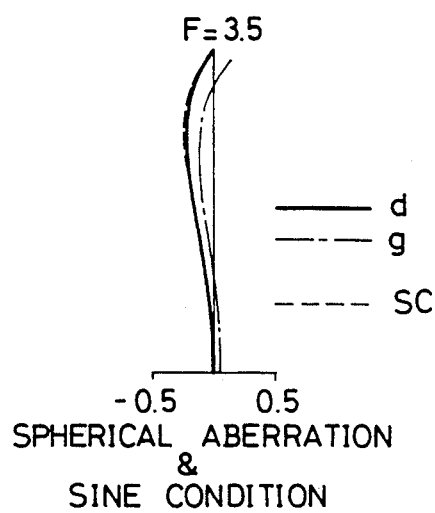
FIGS. 28d to 28f represent the aberration curves of the tenth embodiment for a medium focal length.
Figure 28E:
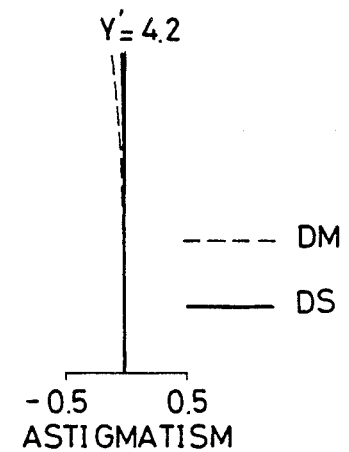
Figure 28F:
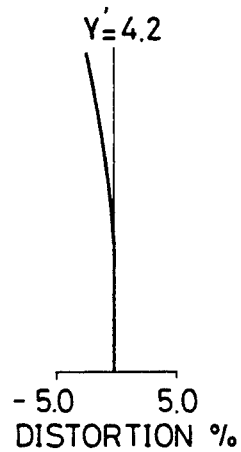
Figure 28G:
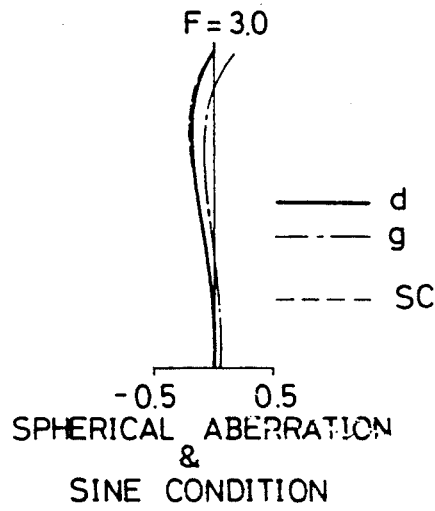
FIGS. 28g to 28i represent the aberration curves of the tenth embodiment for the shortest focal length.
Figure 28H:
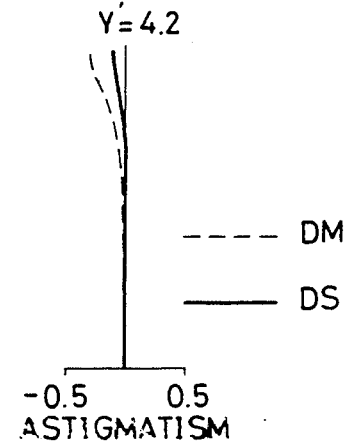
Figure 28I:
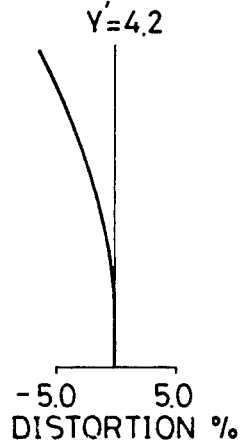
Figure 29A:
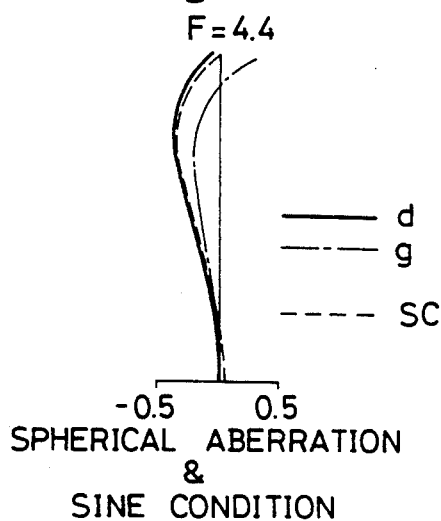
FIGS. 29a to 29c represent the aberration curves of the eleventh embodiment for the longest focal length.
Figure 29B:
Figure 29C:
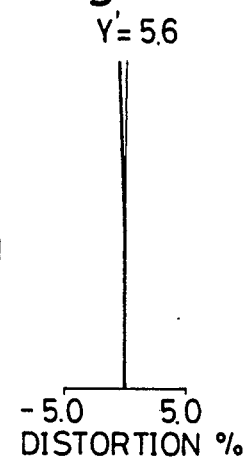
Figure 29D:
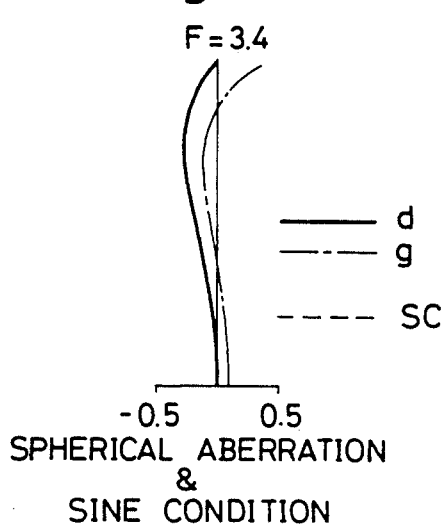
FIGS. 29d to 29f represent the aberration curves of the eleventh embodiment for a medium focal length.
Figure 29E:
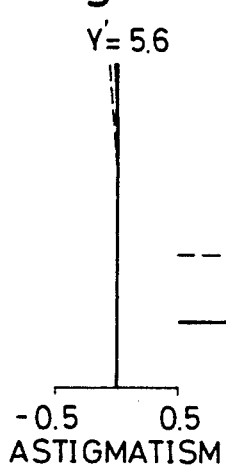
Figure 29F:
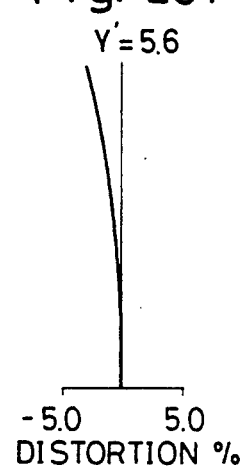
Figure 29G:
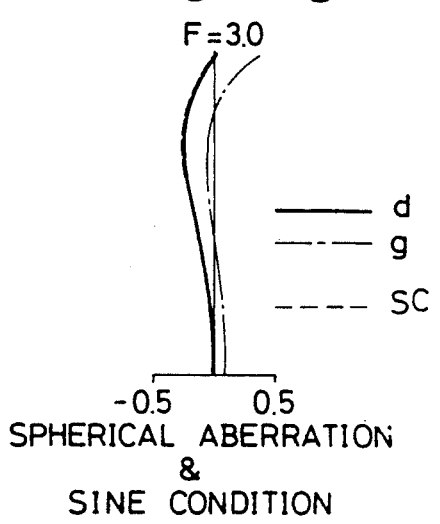
FIGS. 29g to 29i represent the aberration curves of the eleventh embodiment for the shortest focal length.
Figure 29H:
Figure 29I:
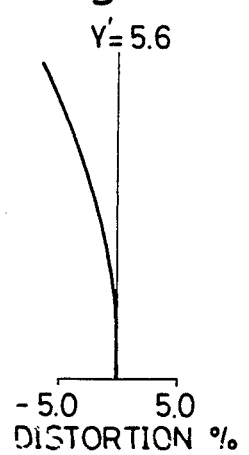
Figure 30A:
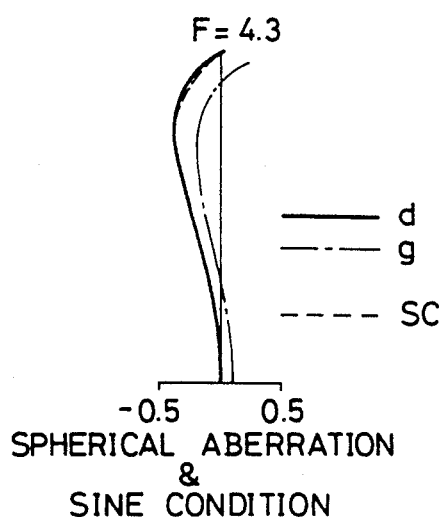
Figure 30B:
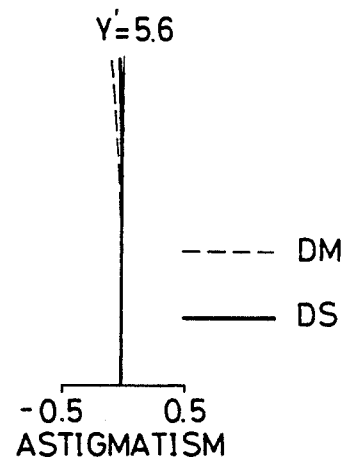
Figure 30C:
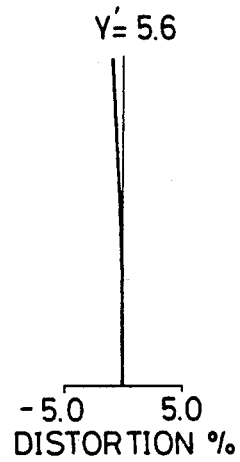
Figure 30D:
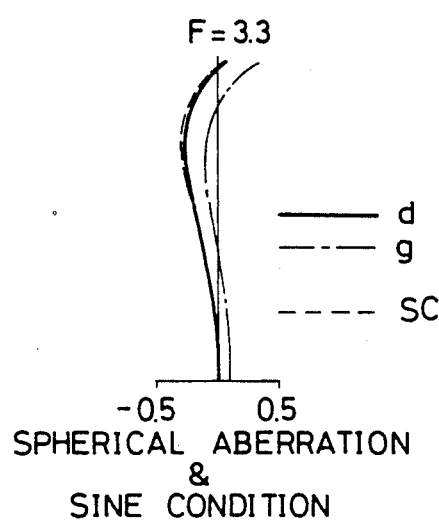
FIGS. 30d to 30f represent the aberration curves of the twelfth embodiment for a medium focal length.
Figure 30E:
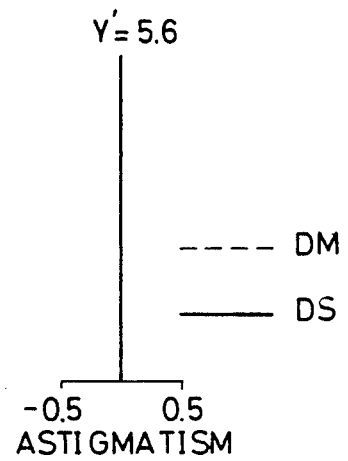
Figure 30F:
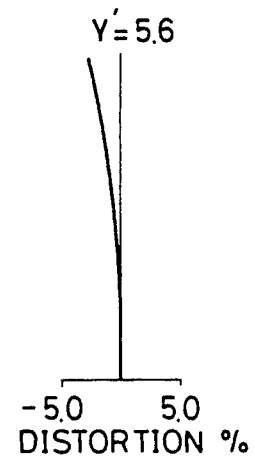
Figure 30G:
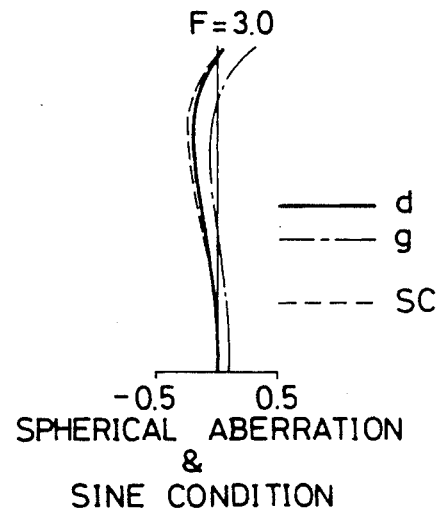
FIGS. 30g to 30i represent the aberration curves of the twelfth embodiment for the shortest focal length.
Figure 30H:
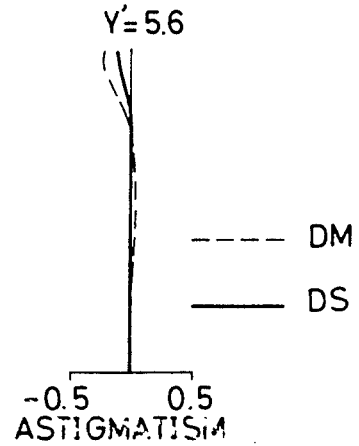
Figure 30I:
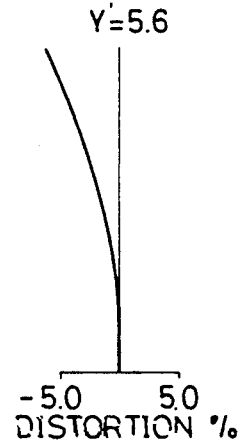
Figure 31A:
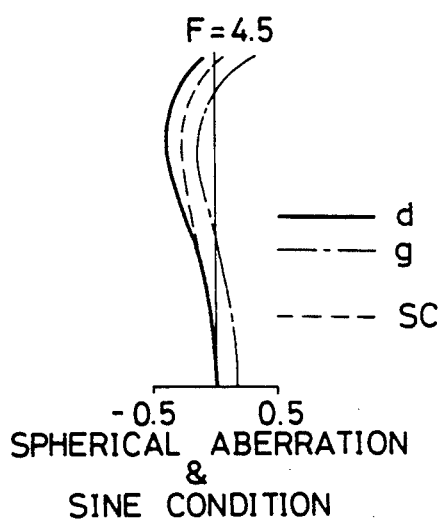
FIGS. 31a to 31c represent the aberration curves of the thirteenth embodiment for the longest focal length.
Figure 31B:
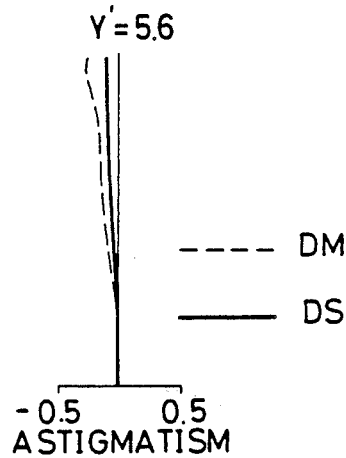
Figure 31C:
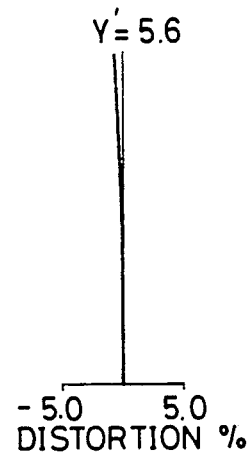
Figure 31D:
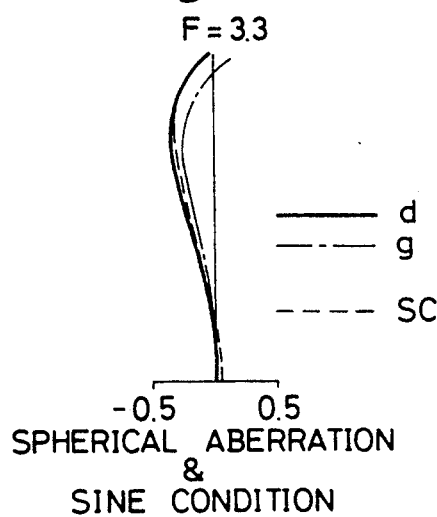
FIGS. 31d to 31f represent the aberration curves of the thirteenth embodiment for a medium focal length.
Figure 31E:
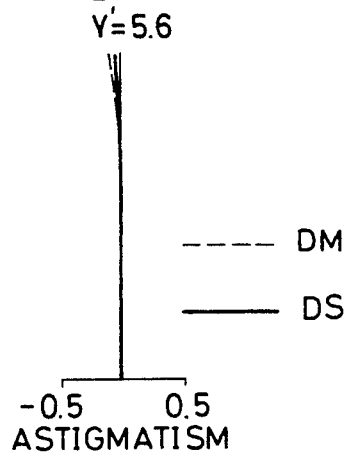
Figure 31F:
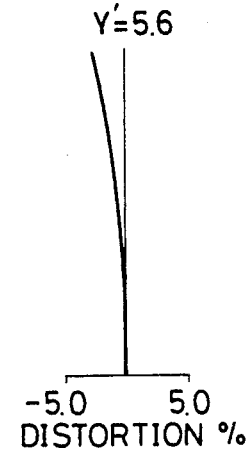
Figure 31G:
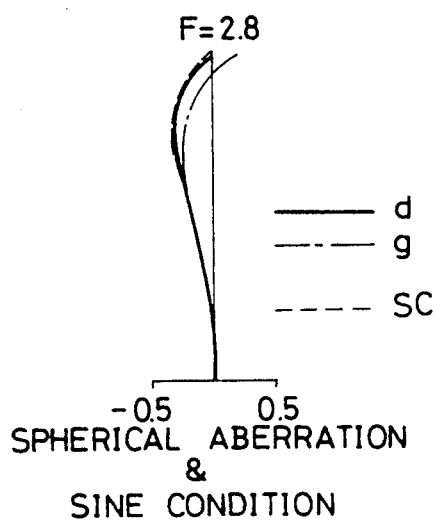
FIGS. 31g to 31i represent the aberration curves of the thirteenth embodiment for the shortest focal length.
Figure 31H:
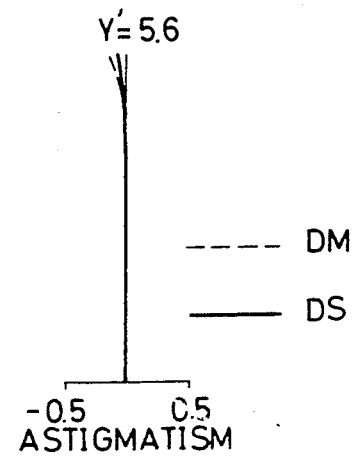
Figure 31I:
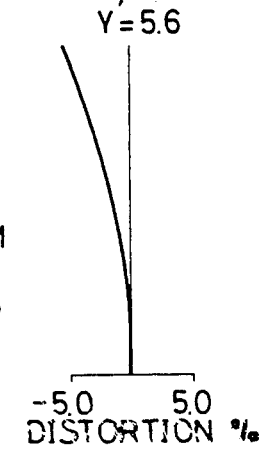
Figure 32A:
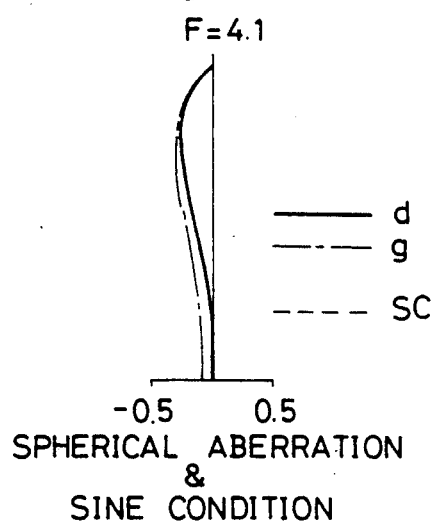
FIGS. 32a to 32c represent the aberration curves of the fourteenth embodiment for the longest focal length.
Figure 32B:
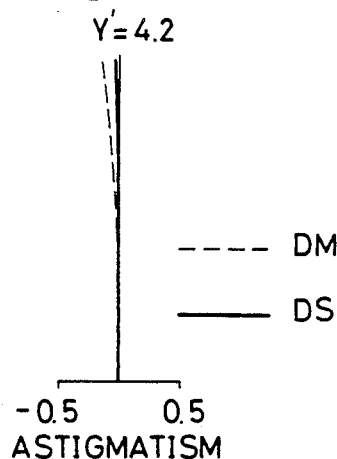
Figure 32C:
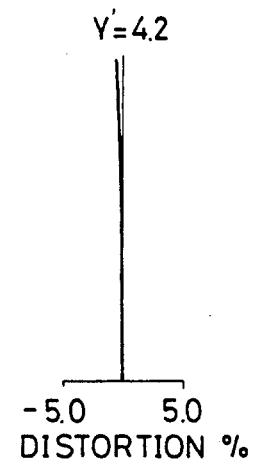
Figure 32D:
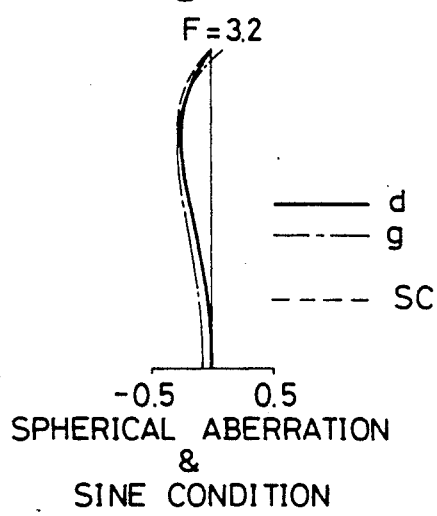
FIGS. 32d to 32f represent the aberration curves of the fourteenth embodiment for a medium focal length.
Figure 32E:
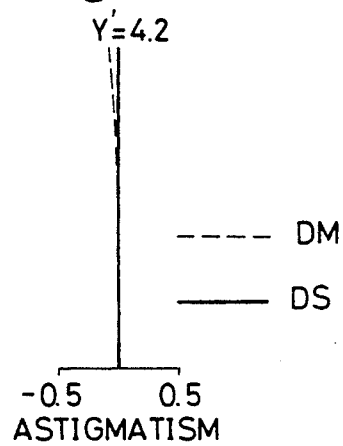
Figure 32F:
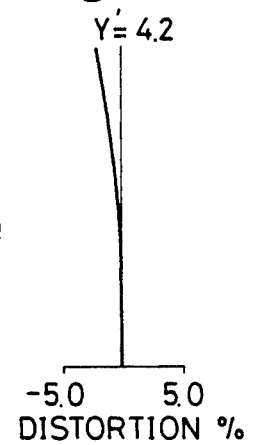
Figure 32G:
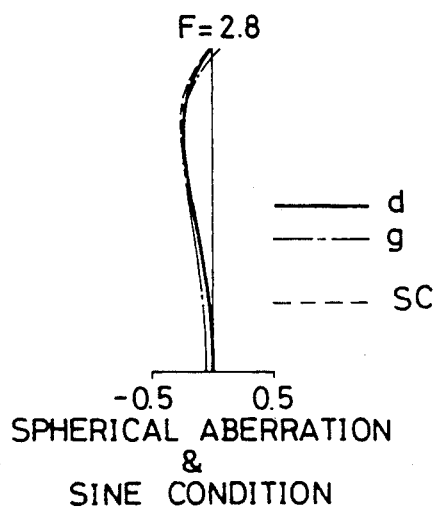
FIGS. 32g to 32i represent the aberration curves of the fourteenth embodiment for the shortest focal length.
Figure 32H:
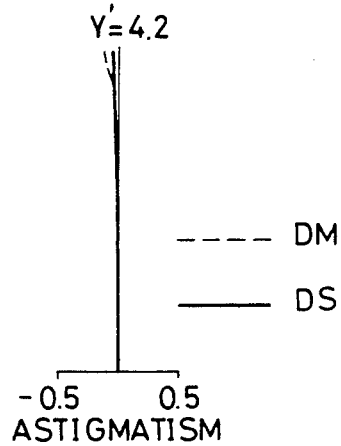
Figure 32I:
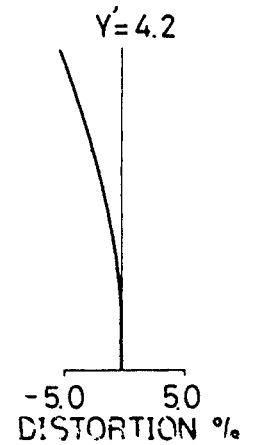
Figure 33A:
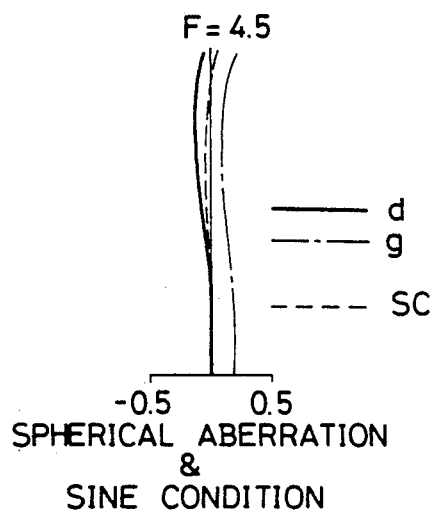
FIGS. 33a to 33c represent the aberration curves of the fifteenth embodiment for the longest focal length.
Figure 33B:
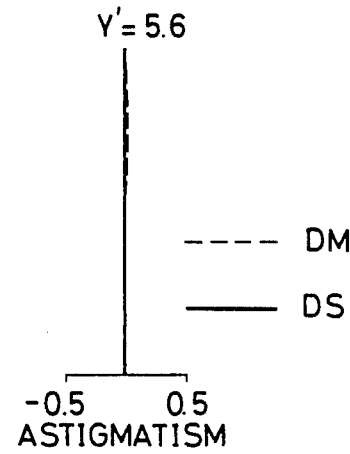
Figure 33C:
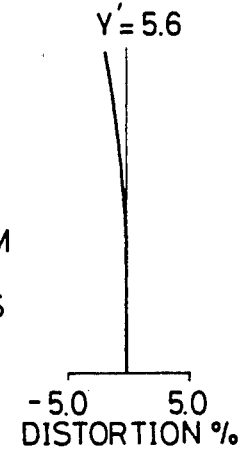
Figure 33D:
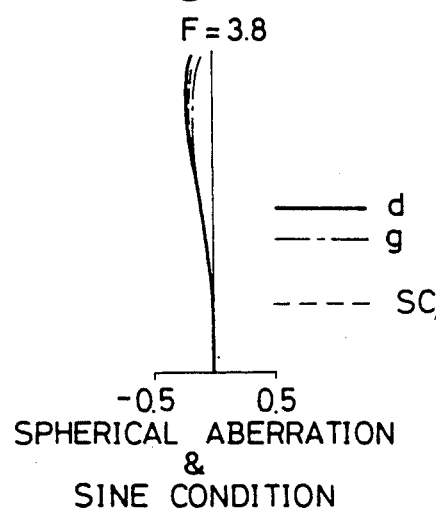
FIGS. 33d to 33f represent the aberration curves of the fifteenth embodiment for a medium focal length.
Figure 33E:
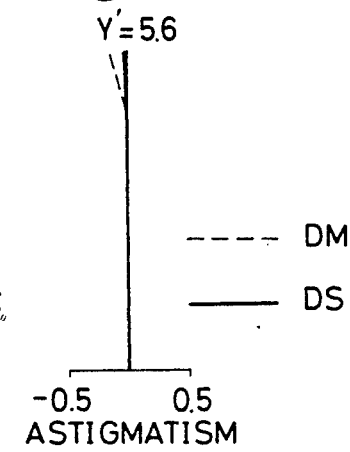
Figure 33F:
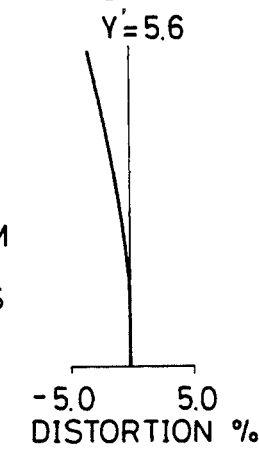
Figure 33G:
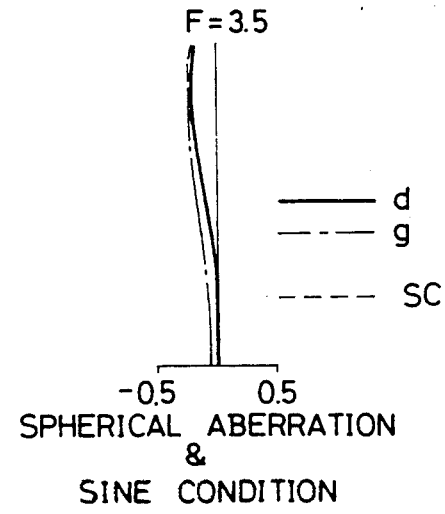
FIGS. 33g to 33i represent the aberration curves of the fifteenth embodiment for the shortest focal length.
Figure 33H:
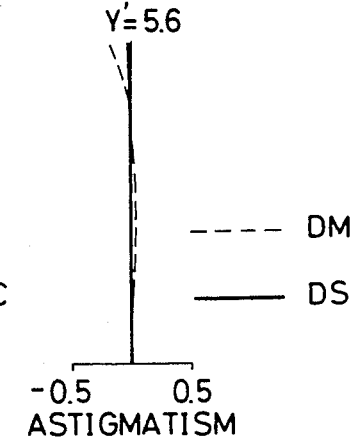
Figure 33I:
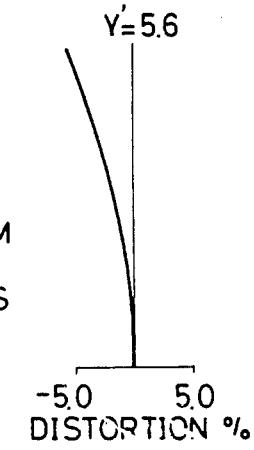
Figure 34A:
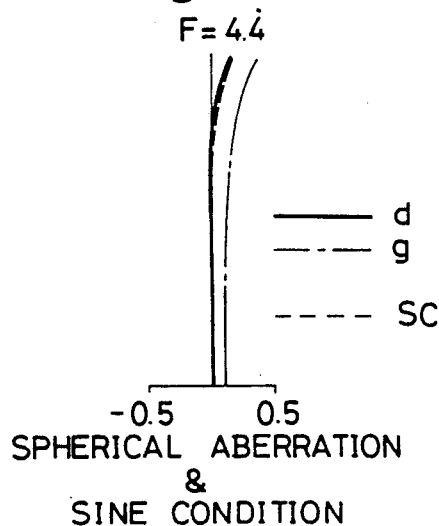
FIGS. 34a to 34c represent the aberration curves of the sixteenth embodiment for the longest focal length.
Figure 34B:
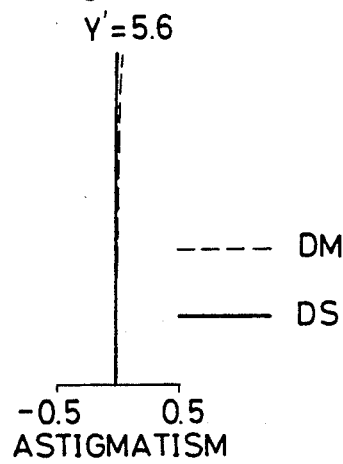
Figure 34C:
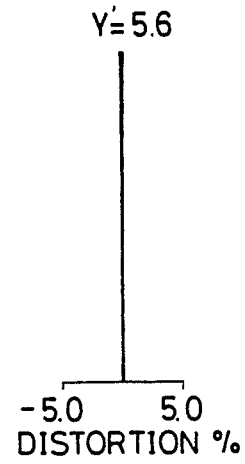
Figure 34D:
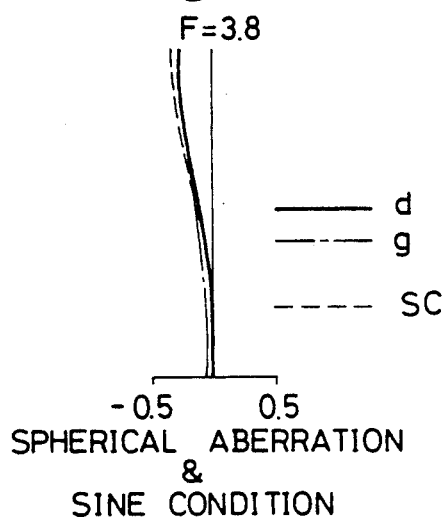
FIGS. 34d to 34f represent the aberration curves of the sixteenth embodiment for a medium focal length.
Figure 34E:
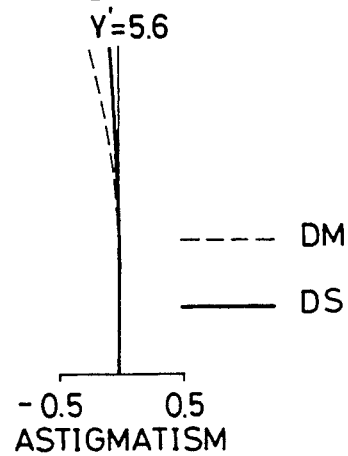
Figure 34F:
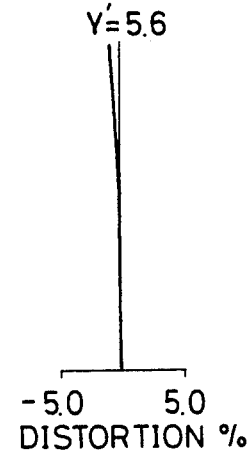
Figure 34G:
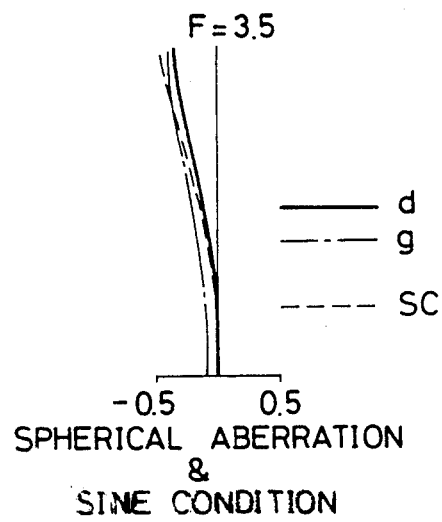
FIGS. 34g to 34i represent the aberration curves of the sixteenth embodiment for the shortest focal length.
Figure 34H:
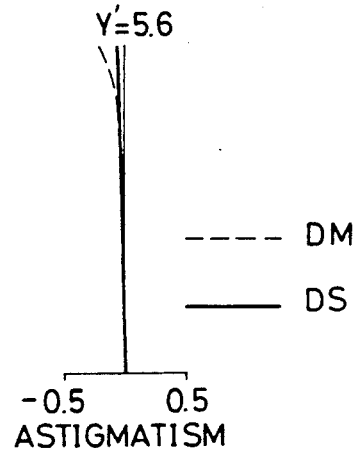
Figure 34I:
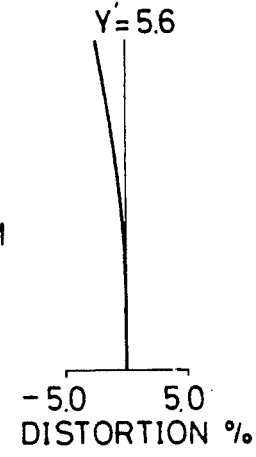
Figure 35A:
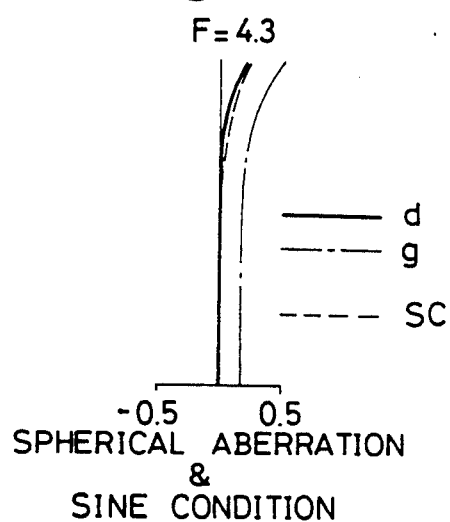
FIGS. 35a to 35c represent the aberration curves of the seventeenth embodiment for the longest focal length.
Figure 35B:
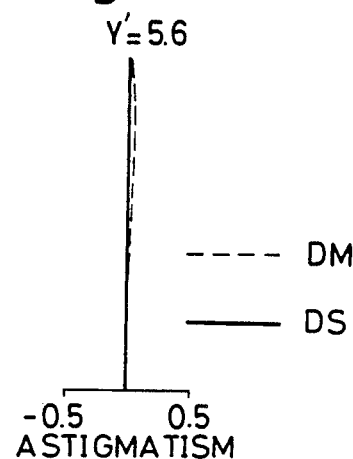
Figure 35C:
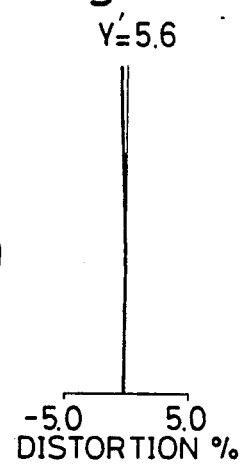
Figure 35D:
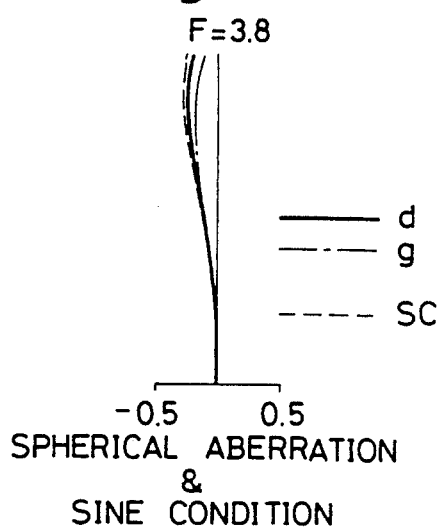
FIGS. 35d to 35f represent the aberration curves of the seventeenth embodiment for a medium focal length.
Figure 35E:
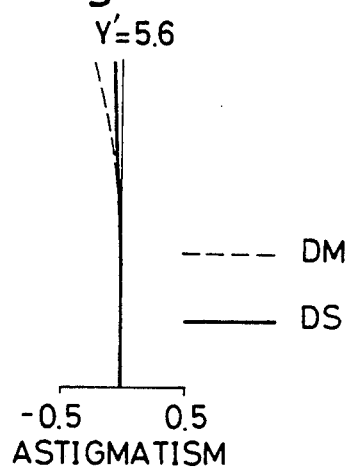
Figure 35F:
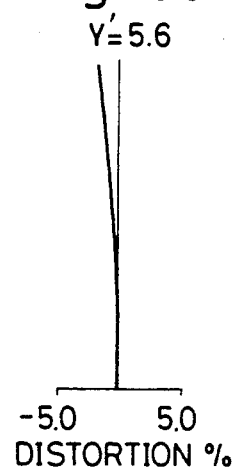
Figure 35G:
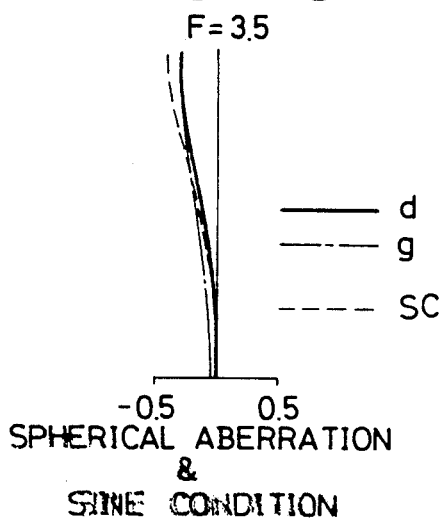
FIGS. 35g to 35i represent the aberration curves of the seventeenth embodiment for the shortest focal length.
Figure 35H:
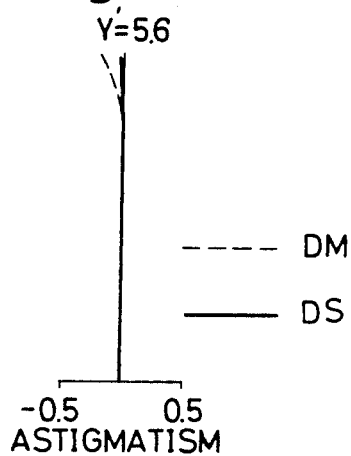
Figure 35I:
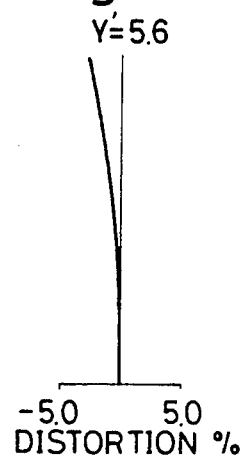
Figure 36A:
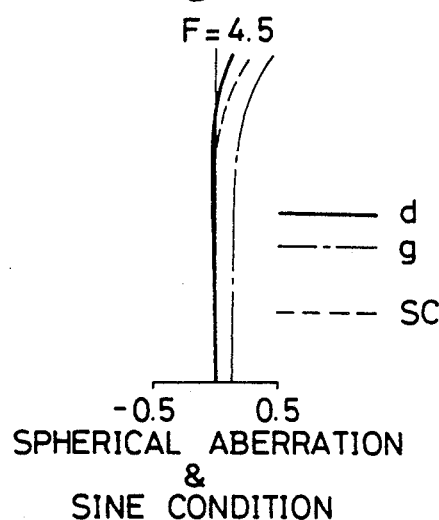
FIGS. 36a to 36c represent the aberration curves of the eighteenth embodiment for the longest focal length.
Figure 36B:
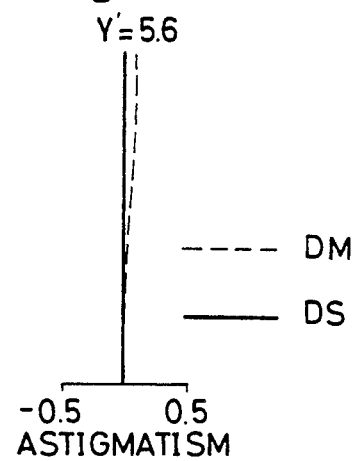
Figure 36C:
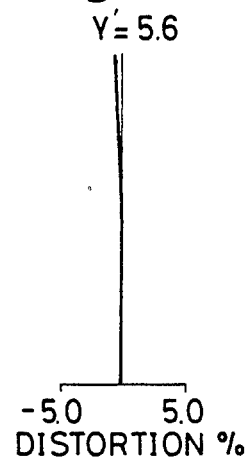
Figure 36D:
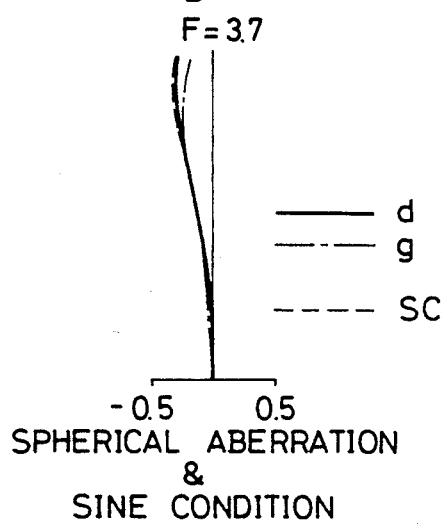
FIGS. 36d to 36f represent the aberration curves of the eighteenth embodiment for a medium focal length.
Figure 36E:
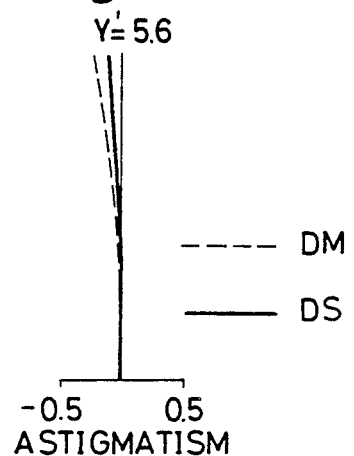
Figure 36F:
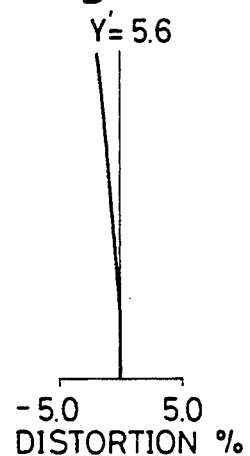
Figure 36G:
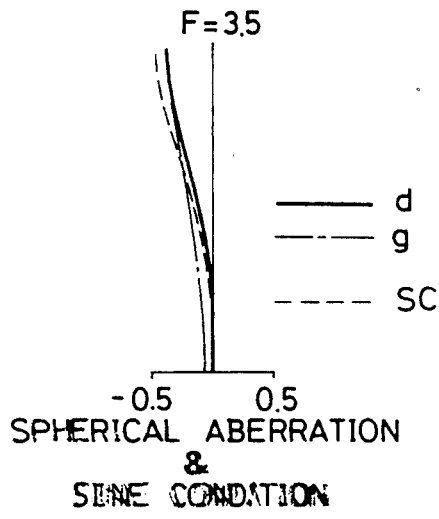
FIGS. 36g to 36i represent the aberration curves of the eighteenth embodiment for the shortest focal length.
Figure 36H:
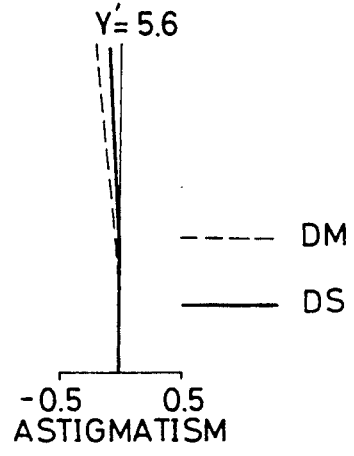
Figure 36I:
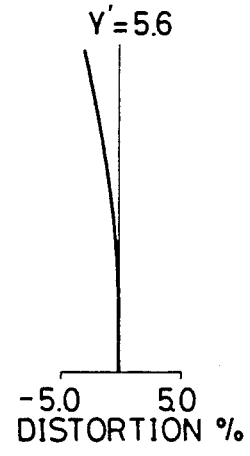
Figure 37A:
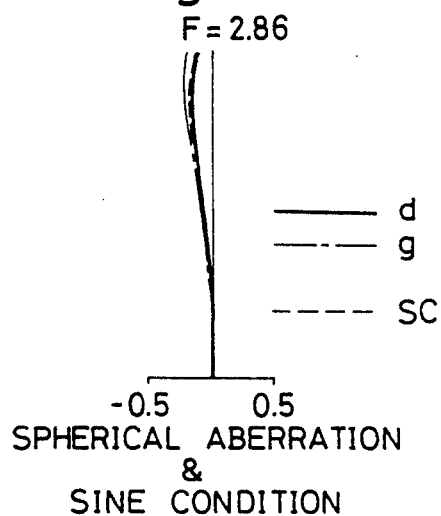
FIGS. 37a to 37c represent the aberration curves of the nineteenth embodiment for the longest focal length.
Figure 37B:
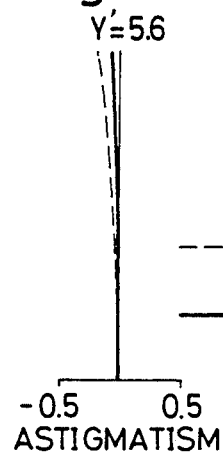
Figure 37C:
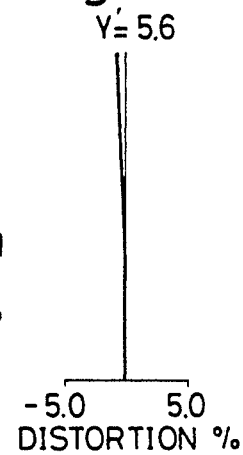
Figure 37D:
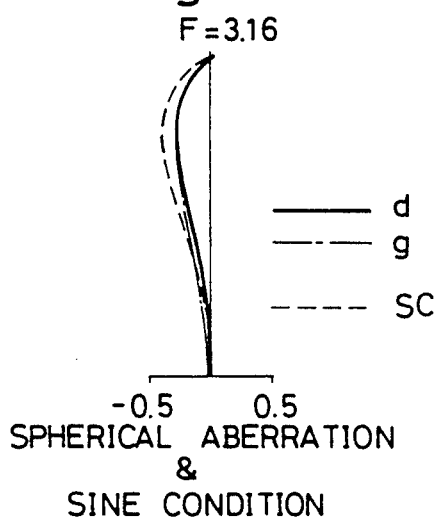
FIGS. 37d to 37f represent the aberration curves of the nineteenth embodiment for a medium focal length.
Figure 37E:
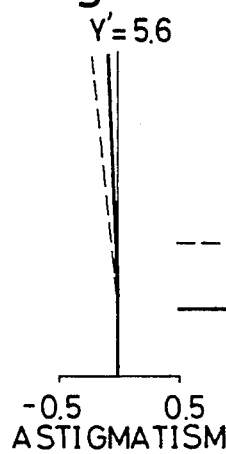
Figure 37F:
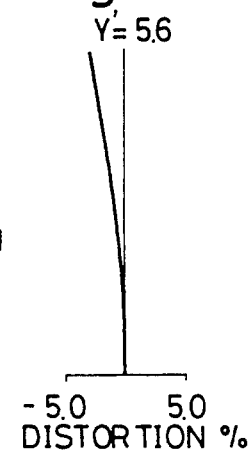
Figure 37G:
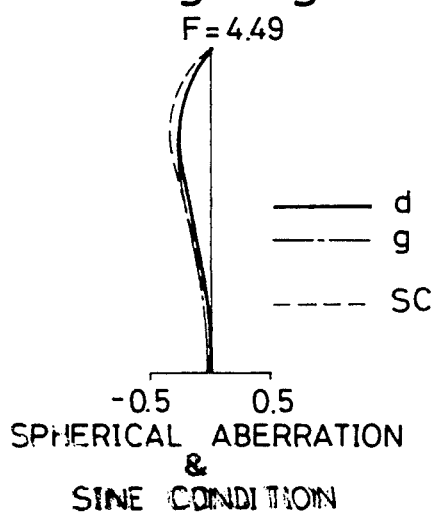
FIGS. 37g to 37i represent the aberration curves of the nineteenth embodiment for the shortest focal length.
Figure 37H:
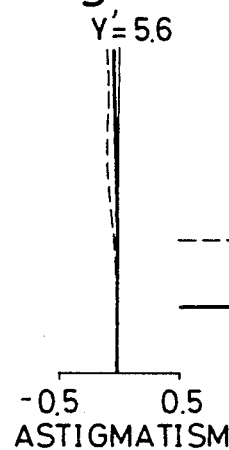
Figure 37I:
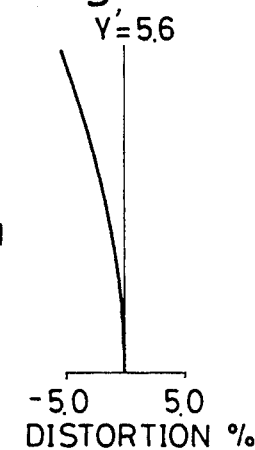
Figure 38A:
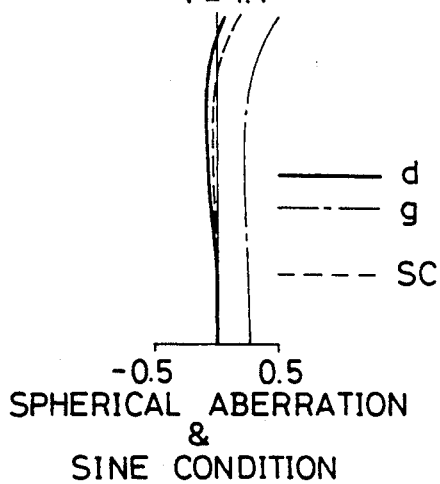
FIGS. 38a to 38c represent the aberration curves of the twentieth embodiment for the longest focal length.
Figure 38B:
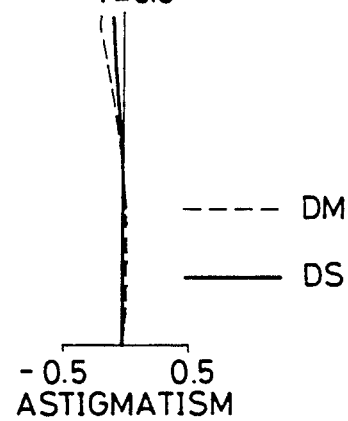
Figure 38C:
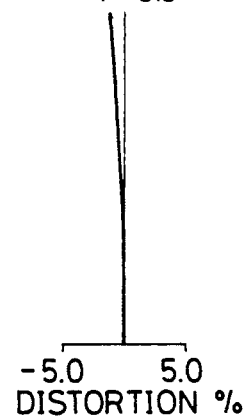
Figure 38D:
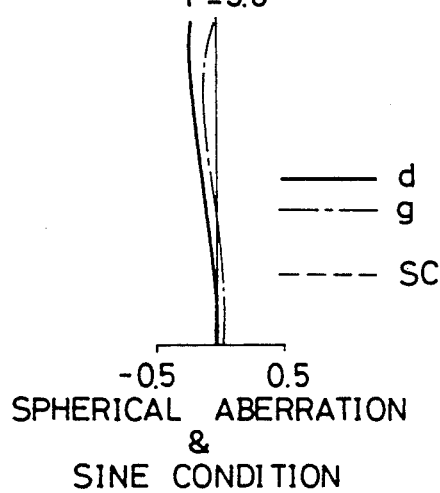
FIGS. 38d to 38f represent the aberration curves of the twentieth embodiment for a medium focal length.
Figure 38E:
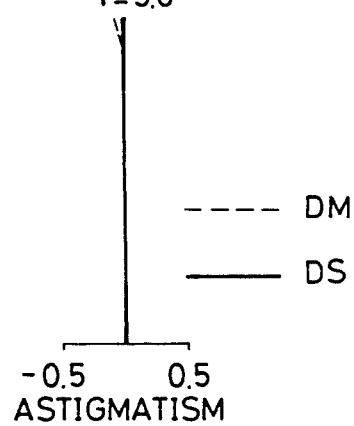
Figure 38F:
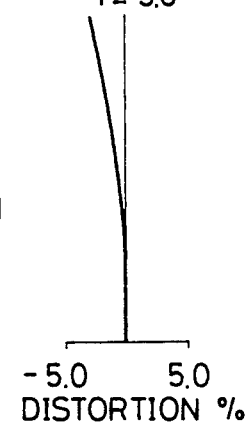
Figure 38G:
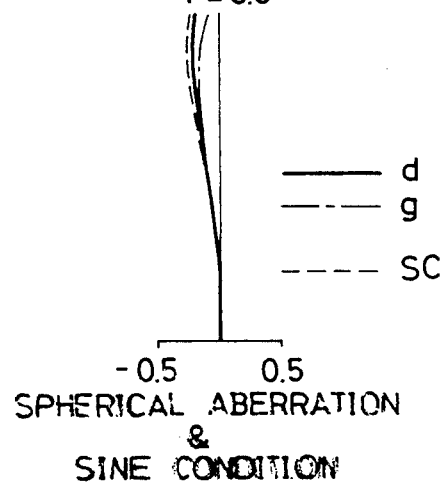
FIGS. 38g to 38i represent the aberration curves of the twentieth embodiment for the shortest focal length.
Figure 38H:
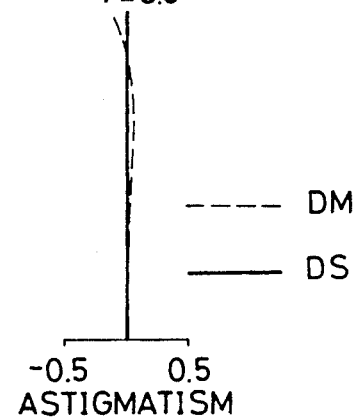
Figure 38I:
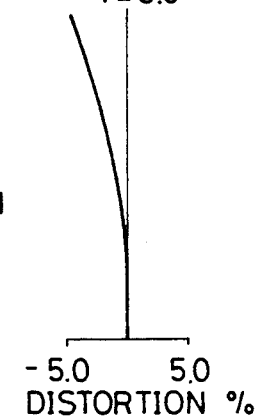
Figure 39A:
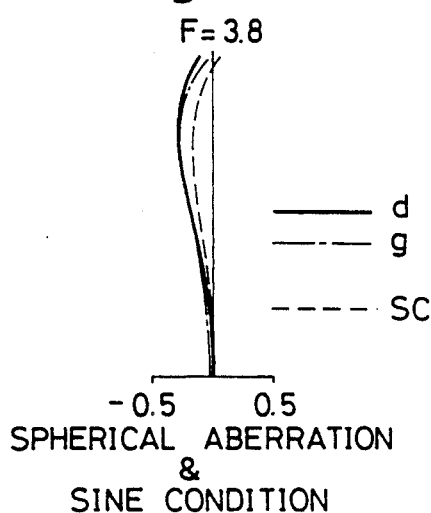
Figure 39B:
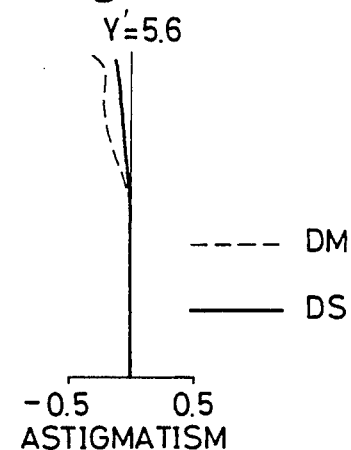
Figure 39C:
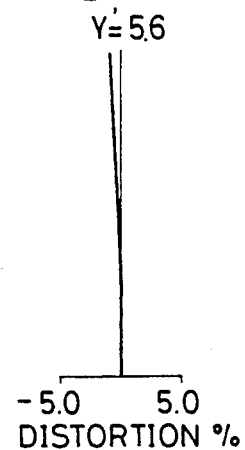
Figure 39D:
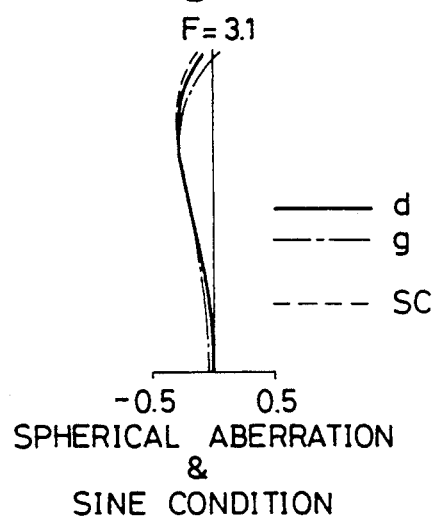
FIGS. 39d to 39f represent the aberration curves of the twenty-first embodiment for a medium focal length.
Figure 39E:
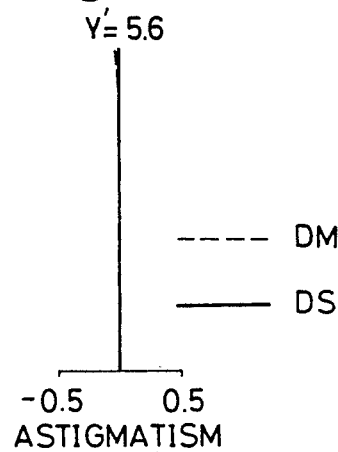
Figure 39F:
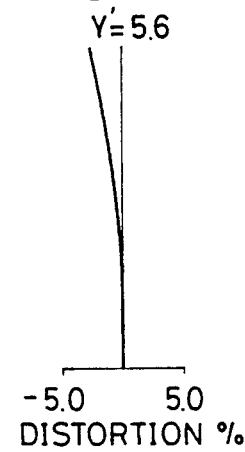
Figure 39G:
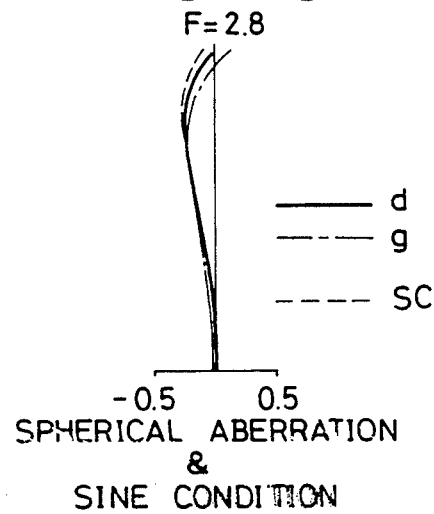
FIGS. 39g to 39i represent the aberration curves of the twenty-first embodiment for the shortest focal length.
Figure 39H:
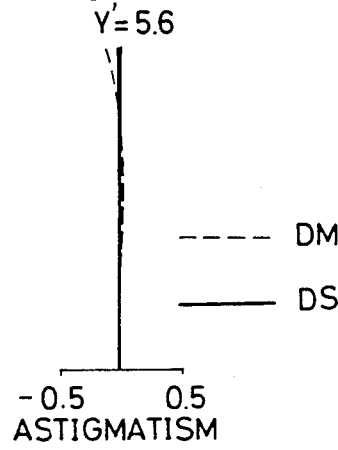
Figure 39I:
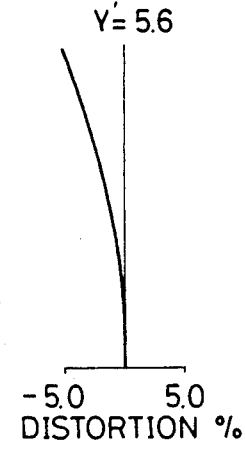

Hereinafter, description is made on a zoom lens system different from the abovementioned lens type, and wherein an aperture diaphragm is arranged at the image side of the rear lens unit and fixed on the optical axis in the zooming operation. FIGS. 16 to 18 are schematic views of this lens type.

FIG. 16 indicates an arrangement of the lens system at the longest focal length condition and FIG. 17 indicates that at the shortest focal length condition. (I) is a front lens (II) is a rear lens unit, (3) is an aperture diaphragm and (X) is an image plane. As will be apparent from the figures, reduction of peripheral illuminance which causes trouble in this lens type having the diaphragm behind the rear lens unit is, in particular, liable to occur at the shortest focal length condition. That is, for obtaining the sufficient illuminance, a front lens unit diameter must be enlarged. In FIG. 18, differently from FIG. 17, the front lens unit has shifted largely toward the object side at the shortest focal length condition. As will be clear from this figure, if the front lens unit diameter is same as that in FIG. 17, light flux shown by oblique lines is cut and the illuminance is reduced, thus in order to make the illuminance substantially equal to that shown in FIG. 17, the front lens unit diameter must be enlarged.

Though it is disirable that the front lens unit is shifted toward the object side from the longest focal length condition to the shortest focal length condition by controlling the refractive power distribution between the two lens units properly, the lens system must be selected in which the front lens unit is not shifted excessively toward the object side in the zooming operation.

It is desirable to fulfill the following conditions to control the refractive powers of the two lens units properly.

$$0 < \Delta dI/\Delta dII < 2.0 \quad (22)$$

$$0.47 < |\phi_I|/\phi_{II} < 0.7 | 0 \ (\phi_I < 0) \quad (23)$$

wherein, $\Delta d_I$ and $\Delta d_{II}$ respectively represent the shifting amounts of the front and rear lens units from the longest focal length to the shortest focal length. (if the front lens unit moves toward the object side, $\Delta d_I$ is positive and if the rear lens unit moves toward the image side, $\Delta d_{II}$ is positive).

Condition 22 stipulates the shifting amount of the front lens unit compared with the shifting amount of the rear lens unit, since absolute value of the shifting amount of the front lens unit differs by the zoom ratio and focal length of the lens system. If the lower limit of Condition 22 is violated, the front lens unit shifts toward the image side from the longest focal length condition to the shortest focal length condition, therefore it is difficult to correct aberrations well and to reduce number of lens elements of the lens system, further the sufficiently large zoom ratio can not be obtained. Conversely, if the front lens unit is shifted toward the object side such that the shifting amount of the front lens unit exceeds the upper limit of Condition 22, at the example aforementioned, the diameter of the front lens unit has to be enlarged and the performance of the lens system is deteriorated.

Condition 23 indicates a refractive power balance between the front and rear lens units, wherein it is shown that the negative refractive power of the front lens unit is preferably increased relative to the conventional one. If the refractive power balance is lower than the lower limit of Condition 23, the zoom lens system is liable to become a type wherein the front lens unit shifts largely toward the object side, and enlargement of the diameter of the front lens unit becomes problematic. However, if the refractive power balance exceeds the upper limit of Condition 23 inversely, though it is advantageous to reduce the diameter of the front lens unit, since the refractive power of the front lens unit becomes too strong, offaxial aberrations including the coma aberration generated in the front lens unit increase largely, thus the number of lens elements has to be increased in order to suppress this, resulting in a high cost.

Other advantages of this zoom lens system having the diaphragm arranged behind the rear lens unit are that, assembling the lens system is very simple and the mechanism thereof can be simplified even when the mechanism in which the aperture diaphragm serves concurrently as a shutter is employed.

In addition, as compared with the conventional zoom lens system in which an aperture diaphragm is disposed behind the rear lens unit and shiftable in the zooming operation, in present zoom lens system, not only compactness of the lens system and low cost are attained, but excessive flare light around the longest focal length side can also be cut by the aperture diaphragm for improvement of the performance at the longest focal length condition.

Figure 11:
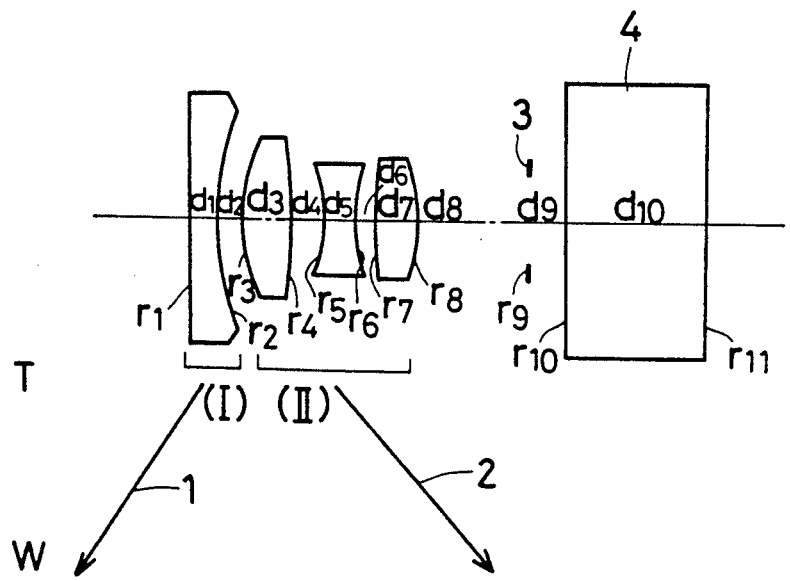
FIG. 11 represents a cross sectional view of the lens system according to a twentieth embodiment of the present invention for the longest focal length.
Figure 12:
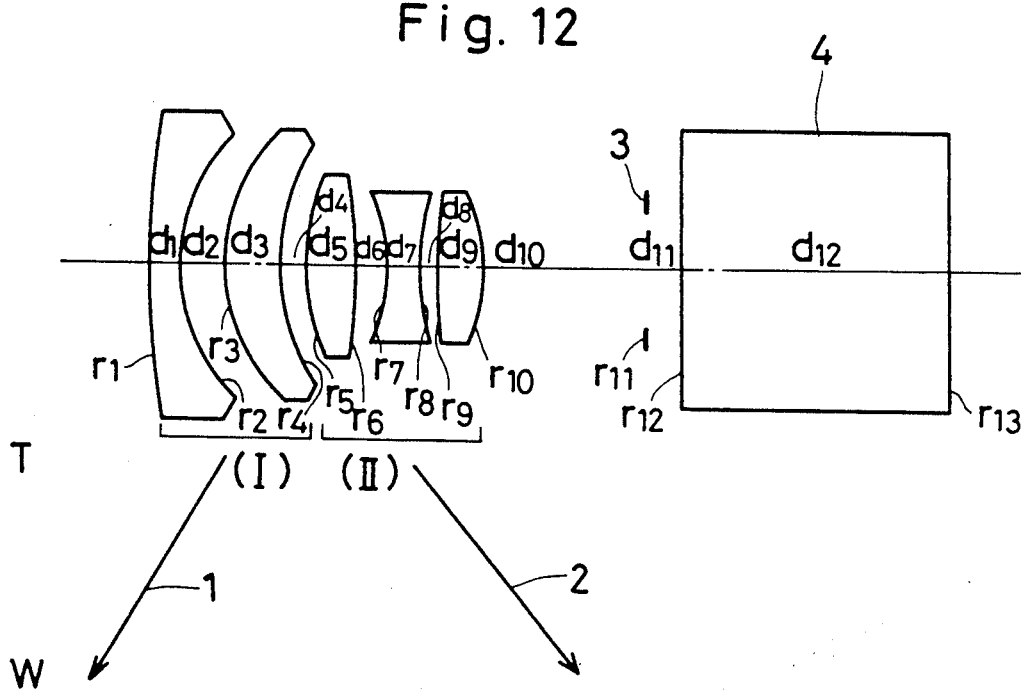
FIG. 12 represents a cross sectional view of the lens system according to a twenty-first embodiment of the present invention for the longest focal length.

Such zoom lens system having the aperture diaphragm behind the rear lens unit correspond to FIGS. 11 and 12.

Even in a zoom lens system described above wherein the aperture diaphragm is fixed on the optical axis in the zooming operation, the rear lens unit thereof is configurated with totally three lens elements consisting of from the object side to the image side, a biconvex positive lens element, a biconcave lens element and a positive lens element, and at the other hand, the front lens unit is configurated with one negative lens element whose image side surface has a stronger refractive power than its object side surface, or configurated with said negative lens element and at the image side thereof, further a positive meniscus lens element having an object side surface convex to the object side. From the viewpoint of an optical performance, such a zoom lens system has advantages similar to the first to third lens types of the present invention described heretofore.

Hereinafter, embodiments in accordance with the present invention are shown.

The following Tables 1 to 21 disclose, respectively, the first through twenty-first embodiments of the present invention. In the Tables, f equals a focal length of the present invention, F represents an F number, $r_1$, $r_2$, ... are radii of curvature with respective sub numbers indicating the surface from the object to image side along the optical axis, $d_1$, $d_2$, ... represent the axial distances and include both air spaces and actual thicknesses of the lens along the optical axis, $N_1$, $N_2$, ... equal the refractive indexes of respective lenses and again, the sub numbers refer to the particular optical elements from the object to image side, and $\nu_1$, $\nu_2$, ... equal Abbe numbers of respective lenses sequentially counted from the object side.

FIGS. 1 to 12 show schematic configurations of the lens systems according to first through twenty-first embodiments of the present invention at the longest focal length condition, wherein the shiftings of the front lens unit (I) and the rear lens unit (II) from the longest focal length condition (T) to the shortest focal length condition (W) are represented by the arrow lines 1, 2 respectively. Numeral 3 designates an aperture diaphragm and Numeral 4 identifies a plate equivalent to a low-pass filter or a face plate or the like disposed at the image side of the rear lens unit (II).

FIGS. 19a to 19i through FIGS. 39a to 39i represent aberration curves for the first through twenty-first embodiments, respectively, in which the solid line d shows an spherical aberration with respect to d-line, the one-dotted chain line g shows same with respect to g-line and the broken line SC shows a sine condition. The broken line DM and the solid line DS show astigmatisms in a meridional image plane and a sagittal image plane, respectively.

TABLE 1

[Embodiment 1]
$f = 10.25 \sim 14.0 \sim 19.6$   $F = 2.86 \sim 3.24 \sim 3.81$
$\phi_I = -0.0474$   $\phi_{II} = 0.06481$

| Radius of Curvature | | Distance | | Refractive Index | | Abbe Number | |
|---|---|---|---|---|---|---|---|
| $r_1$ | 52.347 | $d_1$ | 1.400 | $N_1$ | 1.71300 | $\nu_1$ | 53.93 |
| $r_2$ | 9.495 | $d_2$ | 2.100 | $N_2$ | 1.00000 | | |
| $r_3$ | 9.670 | $d_3$ | 2.600 | $N_3$ | 1.80518 | $\nu_3$ | 25.43 |
| $r_4$ | 10.806 | $d_4$ | 2.700 | $N_4$ | 1.00000 | | |
| $r_5$ | ∞ | $d_5$ | 1.000 | $N_5$ | 1.0000 | | |
| $r_6$ | 11.244 | $d_6$ | 2.900 | $N_6$ | 1.78100 | $\nu_6$ | 44.55 |
| $r_7$ | −28.420 | $d_7$ | 1.600 | $N_7$ | 1.00000 | | |
| $r_8$ | −10.653 | $d_8$ | 2.700 | $N_8$ | 1.75520 | $\nu_8$ | 27.51 |
| $r_9$ | 9.541 | $d_9$ | 1.000 | $N_9$ | 1.00000 | | |
| $r_{10}$ | 18.038 | $d_{10}$ | 3.600 | $N_{10}$ | 1.77250 | $\nu_{10}$ | 49.77 |
| $r_{11}$ | −10.627 | $d_{11}$ | 6.849 | $N_{11}$ | 1.00000 | | |
| $r_{12}$ | ∞ | $d_{12}$ | 7.600 | $N_{12}$ | 1.51680 | $\nu_{12}$ | 64.12 |
| $r_{13}$ | ∞ | | | | | | |

Variable Distance

| | $d_4$ | $d_{11}$ |
|---|---|---|
| TELE | 2.700 | 6.849 |
| MIDDLE | 9.344 | 2.753 |
| WIDE | 17.851 | 0.010 |

TABLE 2

[Embodiment 2]
$f = 13.3 \sim 17.0 \sim 25.5$   $F = 2.86 \sim 3.13 \sim 3.78$
$\phi_I = -0.037$   $\phi_{II} = 0.05271$

| Radius of Curvature | | Distance | | Refractive Index | | Abbe Number | |
|---|---|---|---|---|---|---|---|
| $r_1$ | 51.293 | $d_1$ | 1.600 | $N_1$ | 1.71300 | $\nu_1$ | 53.95 |
| $r_2$ | 10.940 | $d_2$ | 4.000 | $N_2$ | 1.00000 | | |
| $r_3$ | 11.659 | $d_3$ | 2.600 | $N_3$ | 1.80518 | $\nu_3$ | 25.43 |
| $r_4$ | 13.404 | $d_4$ | 2.800 | $N_4$ | 1.00000 | | |
| $r_5$ | ∞ | $d_5$ | 1.000 | $N_5$ | 1.0000 | | |
| $r_6$ | 12.289 | $d_6$ | 3.200 | $N_6$ | 1.78100 | $\nu_6$ | 44.55 |
| $r_7$ | −27.792 | $d_7$ | 2.000 | $N_7$ | 1.00000 | | |
| $r_8$ | −12.228 | $d_8$ | 3.700 | $N_8$ | 1.75520 | $\nu_8$ | 27.51 |
| $r_9$ | 11.756 | $d_9$ | 1.200 | $N_9$ | 1.00000 | | |
| $r_{10}$ | 24.831 | $d_{10}$ | 3.700 | $N_{10}$ | 1.77250 | $\nu_{10}$ | 49.77 |
| $r_{11}$ | −15.078 | $d_{11}$ | 8.575 | $N_{11}$ | 1.00000 | | |
| $r_{12}$ | ∞ | $d_{12}$ | 15.168 | $N_{12}$ | 1.51680 | $\nu_{12}$ | 64.12 |
| $r_{13}$ | ∞ | | | | | | |

Variable Distance

| | $d_4$ | $d_{11}$ |
|---|---|---|
| TELE | 2.800 | 8.575 |
| MIDDLE | 12.855 | 2.607 |
| WIDE | 21.246 | 0.010 |

TABLE 3

[Embodiment 3]
$f = 13.3 \sim 17.0 \sim 25.5$   $F = 2.86 \sim 3.16 \sim 3.83$
$\phi_I = -0.0364$   $\phi_{II} = 0.05281$

| Radius of | | | | Refractive | | Abbe | |

TABLE 3-continued

[Embodiment 3]

$f = 13.3 \sim 17.0 \sim 25.5$  $F = 2.86 \sim 3.16 \sim 3.83$
$\phi_I = -0.0364$  $\phi_{II} = 0.05281$

| Curvature | | Distance | | Index | | Number | |
|---|---|---|---|---|---|---|---|
| $r_1$ | 53.287 | $d_1$ | 1.600 | $N_1$ | 1.71300 | $\nu_1$ | 53.93 |
| $r_2$ | 10.547 | $d_2$ | 2.700 | $N_2$ | 1.00000 | | |
| $r_3$ | 11.314 | $d_3$ | 2.800 | $N_3$ | 1.80518 | $\nu_3$ | 25.43 |
| $r_4$ | 13.803 | $d_4$ | 3.100 | $N_4$ | 1.00000 | | |
| $r_5$ | ∞ | $d_5$ | 1.000 | $N_5$ | 1.00000 | | |
| $r_6$ | 13.351 | $d_6$ | 3.300 | $N_6$ | 1.78100 | $\nu_6$ | 44.55 |
| $r_7$ | −26.964 | $d_7$ | 2.000 | $N_7$ | 1.00000 | | |
| $r_8$ | −12.045 | $d_8$ | 3.500 | $N_8$ | 1.75520 | $\nu_8$ | 27.51 |
| $r_9$ | 12.971 | $d_9$ | 1.200 | $N_9$ | 1.00000 | | |
| $r_{10}$ | 28.513 | $d_{10}$ | 3.700 | $N_{10}$ | 1.77250 | $\nu_{10}$ | 49.77 |
| $r_{11}$ | −13.749 | $d_{11}$ | 8.419 | $N_{11}$ | 1.00000 | | |
| $r_{12}$ | ∞ | $d_{12}$ | 15.168 | $N_{12}$ | 1.51680 | $\nu_{12}$ | 64.12 |
| $r_{13}$ | ∞ | | | | | | |

Variable Distance

| | $d_4$ | $d_{11}$ |
|---|---|---|
| TELE | 3.100 | 8.419 |
| MIDDLE | 13.301 | 2.560 |
| WIDE | 21.814 | 0.010 |

TABLE 4

[Embodiment 4]

$f = 15.3 \sim 19.0 \sim 29.6$  $F = 2.86 \sim 3.15 \sim 3.97$
$\phi_I = -0.0352$  $\phi_{II} = 0.04934$

| Radius of Curvature | | Distance | | Refractive Index | | Abbe Number | |
|---|---|---|---|---|---|---|---|
| $r_1$ | 53.829 | $d_1$ | 1.600 | $N_1$ | 1.77250 | $\nu_1$ | 49.77 |
| $r_2$ | 10.915 | $d_2$ | 2.700 | $N_2$ | 1.00000 | | |
| $r_3$ | 11.998 | $d_3$ | 2.800 | $N_3$ | 1.80518 | $\nu_3$ | 25.43 |
| $r_4$ | 15.886 | $d_4$ | 3.100 | $N_4$ | 1.00000 | | |
| $r_5$ | ∞ | $d_5$ | 1.000 | $N_5$ | 1.0000 | | |
| $r_6$ | 13.465 | $d_6$ | 3.400 | $N_6$ | 1.78100 | $\nu_6$ | 44.55 |
| $r_7$ | −29.214 | $d_7$ | 1.900 | $N_7$ | 1.00000 | | |
| $r_8$ | −13.565 | $d_8$ | 3.300 | $N_8$ | 1.75520 | $\nu_8$ | 27.51 |
| $r_9$ | 13.249 | $d_9$ | 1.300 | $N_9$ | 1.00000 | | |
| $r_{10}$ | 30.897 | $d_{10}$ | 3.600 | $N_{10}$ | 1.77250 | $\nu_{10}$ | 49.77 |
| $r_{11}$ | −16.004 | $d_{11}$ | 10.213 | $N_{11}$ | 1.00000 | | |
| $r_{12}$ | ∞ | $d_{12}$ | 15.168 | $N_{12}$ | 1.51680 | $\nu_{12}$ | 64.12 |
| $r_{13}$ | ∞ | | | | | | |

Variable Distance

| | $d_4$ | $d_{11}$ |
|---|---|---|
| TELE | 3.100 | 10.213 |
| MIDDLE | 13.953 | 2.650 |
| WIDE | 21.282 | 0.010 |

TABLE 5

[Embodiment 5]

$f = 13.3 \sim 17.0 \sim 25.5$  $F = 2.86 \sim 3.18 \sim 3.92$
$\phi_I = -0.0372$  $\phi_{II} = 0.05257$

| Radius of Curvature | | Distance | | Refractive Index | | Abbe Number | |
|---|---|---|---|---|---|---|---|
| $r_1$ | 48.752 | $d_1$ | 1.600 | $N_1$ | 1.71300 | $\nu_1$ | 53.93 |
| $r_2$ | 10.551 | $d_2$ | 2.700 | $N_2$ | 1.00000 | | |
| $r_3$ | 11.175 | $d_3$ | 2.800 | $N_3$ | 1.80518 | $\nu_3$ | 25.43 |
| $r_4$ | 13.124 | $d_4$ | 2.600 | $N_4$ | 1.00000 | | |
| $r_5$ | 12.695 | $d_5$ | 3.000 | $N_5$ | 1.77250 | $\nu_5$ | 49.77 |
| $r_6$ | −32.583 | $d_6$ | 1.200 | $N_6$ | 1.00000 | | |
| $r_7$ | ∞ | $d_7$ | 2.300 | $N_7$ | 1.00000 | | |
| $r_8$ | −9.351 | $d_8$ | 3.000 | $N_8$ | 1.74000 | $\nu_8$ | 28.26 |
| $r_9$ | 11.386 | $d_9$ | 1.200 | $N_9$ | 1.00000 | | |
| $r_{10}$ | 24.481 | $d_{10}$ | 3.900 | $N_{10}$ | 1.77250 | $\nu_{10}$ | 49.77 |
| $r_{11}$ | −10.830 | $d_{11}$ | 8.643 | $N_{11}$ | 1.00000 | | |
| $r_{12}$ | ∞ | $d_{12}$ | 15.168 | $N_{12}$ | 1.51680 | $\nu_{12}$ | 64.12 |
| $r_{13}$ | ∞ | | | | | | |

Variable Distance

| | $d_4$ | $d_{11}$ |
|---|---|---|
| TELE | 2.600 | 8.643 |
| MIDDLE | 12.627 | 2.628 |
| WIDE | 20.995 | 0.010 |

TABLE 6

[Embodiment 6]

$f = 13.2 \sim 17.0 \sim 25.7$  $F = 2.86 \sim 3.20 \sim 3.98$
$\phi_I = -0.0365$  $\phi_{II} = 0.05863$

| Radius of Curvative | | Distance | | Refractive Index | | Abbe Number | |
|---|---|---|---|---|---|---|---|
| $r_1$ | 75.425 | $d_1$ | 1.400 | $N_1$ | 1.71300 | $\nu_1$ | 53.93 |
| $r_2$ | 11.596 | $d_2$ | 2.500 | $N_2$ | 1.00000 | | |
| $r_3$ | 12.059 | $D_3$ | 3.000 | $N_3$ | 1.80518 | $\nu_3$ | 25.43 |
| $r_4$ | 14.575 | $d_4$ | 1.700 | $N_4$ | 1.00000 | | |
| $r_5$ | 11.785 | $d_5$ | 2.900 | $N_5$ | 1.78831 | $\nu_5$ | 47.32 |
| $r_6$ | −34.242 | $d_6$ | 1.500 | $N_6$ | 1.00000 | | |
| $r_7$ | −12.257 | $d_7$ | 2.200 | $N_7$ | 1.74000 | $\nu_7$ | 28.26 |
| $r_8$ | 12.172 | $d_8$ | 1.100 | $N_8$ | 1.00000 | | |
| $r_9$ | 33.407 | $d_9$ | 2.700 | $N_9$ | 1.78831 | $\nu_9$ | 47.32 |
| $r_{10}$ | −12.467 | $d_{10}$ | 1.000 | $N_{10}$ | 1.00000 | | |
| $r_{11}$ | ∞ | $d_{11}$ | 8.282 | $N_{11}$ | 1.00000 | | |
| $r_{12}$ | ∞ | $d_{12}$ | 15.168 | $N_{12}$ | 1.51680 | $\nu_{12}$ | 64.12 |
| $r_{13}$ | ∞ | | | | | | |

Variable Distance

| | $d_4$ | $d_{11}$ |
|---|---|---|
| TELE | 1.700 | 8.282 |
| MIDDLE | 11.006 | 2.866 |
| WIDE | 18.919 | 0.500 |

TABLE 7

[Embodiment 7]

$f = 9.2 \sim 13.5 \sim 22.0$  $F = 3.0 \sim 3.4 \sim 4.4$
$\phi_I = -0.049$  $\phi_{II} = 0.05282$

| Radius of Curvature | | Distance | | Refractive Index | | Abbe Number | |
|---|---|---|---|---|---|---|---|
| $r_1$ | 25.534 | $d_1$ | 1.300 | $N_1$ | 1.71300 | $\nu_1$ | 53.93 |
| $r_2$ | 9.432 | $d_2$ | 3.100 | $N_2$ | 1.00000 | | |
| $r_3$ | −53.092 | $d_3$ | 1.300 | $N_3$ | 1.71300 | $\nu_2$ | 53.93 |
| $r_4$ | 15.904 | $d_4$ | 1.000 | $N_4$ | 1.00000 | | |
| $r_5$ | 14.189 | $d_5$ | 3.100 | $N_5$ | 1.60565 | $\nu_3$ | 37.81 |
| $r_6$ | −86.284 | $d_6$ | 1.300 | $N_6$ | 1.00000 | | |
| $r_7$ | 9.987 | $d_7$ | 3.700 | $N_7$ | 1.64050 | $\nu_4$ | 60.08 |
| $r_8$ | −26.567 | $d_8$ | 1.300 | $N_8$ | 1.00000 | | |
| $r_9$ | ∞ | $d_9$ | 1.800 | $N_9$ | 1.00000 | | |
| $r_{10}$ | −8.128 | $d_{10}$ | 3.200 | $N_{10}$ | 1.75690 | $\nu_5$ | 29.69 |
| $r_{11}$ | 9.899 | $d_{11}$ | 0.900 | $N_{11}$ | 1.00000 | | |
| $r_{12}$ | 17.197 | $d_{12}$ | 3.300 | $N_{12}$ | 1.78850 | $\nu_6$ | 45.68 |
| $r_{13}$ | −10.527 | $d_{13}$ | 11.884 | $N_{13}$ | 1.0000 | | |
| $r_{14}$ | ∞ | $d_{14}$ | 15.168 | $N_{14}$ | 1.51600 | $\nu_7$ | 64.12 |
| $r_{15}$ | ∞ | | | | | | |

Variable Distance

| | $d_6$ | $d_{13}$ |
|---|---|---|
| TELE | 1.300 | 11.884 |
| MIDDLE | 12.358 | 3.999 |
| WIDE | 25.734 | 0.010 |

TABLE 8

[Embodiment 8]

$f = 12.3 \sim 17.0 \sim 29.4$  $F = 3.0 \sim 3.4 \sim 4.5$
$\phi_I = 0.039$  $\phi_{II} = 0.0420$

| Radius of Curvature | | Distance | | Refractive Index | | Abbe Number | |
|---|---|---|---|---|---|---|---|
| $r_1$ | 31.879 | $d_1$ | 1.600 | $N_1$ | 1.71300 | $\nu_1$ | 53.93 |
| $r_2$ | 12.033 | $d_2$ | 4.000 | $N_2$ | 1.00000 | | |
| $r_3$ | −82.430 | $d_3$ | 1.600 | $N_3$ | 1.71300 | $\nu_2$ | 53.93 |
| $r_4$ | 19.433 | $d_4$ | 1.200 | $N_4$ | 1.00000 | | |
| $r_5$ | 18.200 | $d_5$ | 3.600 | $N_5$ | 1.68300 | $\nu_3$ | 31.52 |
| $r_6$ | −654.97 | $d_6$ | 1.600 | $N_6$ | 1.00000 | | |
| $r_7$ | 14.417 | $d_7$ | 4.300 | $N_7$ | 1.69100 | $\nu_4$ | 54.75 |
| $r_8$ | −35.141 | $d_8$ | 1.600 | $N_8$ | 1.00000 | | |
| $r_9$ | ∞ | $d_9$ | 2.400 | $N_9$ | 1.00000 | | |
| $r_{10}$ | −11.064 | $d_{10}$ | 3.900 | $N_{10}$ | 1.75520 | $\nu_5$ | 27.51 |
| $r_{11}$ | 14.203 | $d_{11}$ | 1.200 | $N_{11}$ | 1.0000 | | |
| $r_{12}$ | 26.618 | $d_{12}$ | 4.100 | $N_{12}$ | 1.78850 | $\nu_6$ | 45.68 |
| $r_{13}$ | −13.586 | $d_{13}$ | 15.890 | $N_{13}$ | 1.0000 | | |
| $r_{14}$ | ∞ | $d_{14}$ | 15.168 | $N_{14}$ | 1.51680 | $\nu_7$ | 64.12 |
| $r_{15}$ | ∞ | | | | | | |

Variable Distance

TABLE 8-continued

[Embodiment 8]

$f = 12.3 \sim 17.0 \sim 29.4$  $F = 3.0 \sim 3.4 \sim 4.5$
$\phi_I = 0.039$  $\phi_{II} = 0.0420$

| | $d_6$ | $d_{13}$ |
|---|---|---|
| TELE | 1.600 | 15.890 |
| MIDDLE | 16.748 | 4.375 |
| WIDE | 30.471 | 0.010 |

TABLE 9

[Embodiment 9]

$f = 12.3 \sim 17.0 \sim 29.4$  $F = 3.0 \sim 3.4 \sim 4.4$
$\phi_I = -0.037$  $\phi_{II} = 0.0426$

| Radius of Curvature | | Distance | | Refractive Index | | Abbe Number |
|---|---|---|---|---|---|---|
| $r_1$ | 30.864 | $d_1$ | 1.600 | $N_1$ | 1.71300 | $\nu_1$ 53.93 |
| $r_2$ | 12.249 | $d_2$ | 4.000 | $N_2$ | 1.00000 | |
| $r_3$ | −96.640 | $d_3$ | 1.600 | $N_3$ | 1.71300 | $\nu_2$ 53.93 |
| $r_4$ | 20.111 | $d_4$ | 1.200 | $N_4$ | 1.00000 | |
| $r_5$ | 18.159 | $d_5$ | 3.600 | $N_5$ | 1.68300 | $\nu_3$ 31.52 |
| $r_6$ | 781.164 | $d_6$ | 1.500 | $N_6$ | 1.00000 | |
| $r_7$ | 13.035 | $d_7$ | 4.000 | $N_7$ | 1.69100 | $\nu_4$ 54.75 |
| $r_8$ | −46.363 | $d_8$ | 1.600 | $N_8$ | 1.00000 | |
| $r_9$ | ∞ | $d_9$ | 2.400 | $N_9$ | 1.00000 | |
| $r_{10}$ | −11.800 | $d_{10}$ | 3.900 | $N_{10}$ | 1.75520 | $\nu_5$ 27.51 |
| $r_{11}$ | 11.714 | $d_{11}$ | 1.200 | $N_{11}$ | 1.0000 | |
| $r_{12}$ | 20.092 | $d_{12}$ | 4.100 | $N_{12}$ | 1.78100 | $\nu_6$ 44.55 |
| $r_{13}$ | −14.125 | $d_{13}$ | 14.864 | $N_{13}$ | 1.0000 | |
| $r_{14}$ | ∞ | $d_{14}$ | 15.168 | $N_{14}$ | 1.51680 | $\nu_7$ 64.12 |
| $r_{15}$ | ∞ | | | | | |

Variable Distance

| | $d_6$ | $d_{13}$ |
|---|---|---|
| TELE | 1.500 | 14.864 |
| MIDDLE | 17.243 | 4.093 |
| WIDE | 31.505 | 0.010 |

TABLE 10

[Embodiment 10]

$f = 9.25 \sim 14.0 \sim 22.0$  $F = 3.0 \sim 3.5 \sim 4.3$
$\phi_I = -0.047$  $\phi_{II} = 0.0544$

| Radius of Curvature | | Distance | | Refractive Index | | Abbe Number |
|---|---|---|---|---|---|---|
| $r_1$ | 27.781 | $d_1$ | 1.400 | $N_1$ | 1.71300 | $\nu_1$ 53.93 |
| $r_2$ | 10.941 | $d_2$ | 3.300 | $N_2$ | 1.00000 | |
| $r_3$ | −987.996 | $d_3$ | 1.300 | $N_3$ | 1.71300 | $\nu_2$ 53.93 |
| $r_4$ | 16.026 | $d_4$ | 1.200 | $N_4$ | 1.00000 | |
| $r_5$ | 14.563 | $d_5$ | 3.200 | $N_5$ | 1.70055 | $\nu_3$ 30.11 |
| $r_6$ | 52.461 | $d_6$ | 2.200 | $N_6$ | 1.00000 | |
| $r_7$ | ∞ | $d_7$ | 1.300 | $N_7$ | 1.0000 | |
| $r_8$ | 11.046 | $d_8$ | 3.200 | $N_8$ | 1.72000 | $\nu_4$ 50.31 |
| $r_9$ | −27.865 | $d_9$ | 1.700 | $N_9$ | 1.00000 | |
| $r_{10}$ | −11.594 | $d_{10}$ | 2.800 | $N_{10}$ | 1.75520 | $\nu_5$ 27.51 |
| $r_{11}$ | 10.875 | $d_{11}$ | 1.200 | $N_{11}$ | 1.0000 | |
| $r_{12}$ | 25.086 | $d_{12}$ | 3.500 | $N_{12}$ | 1.78100 | $\nu_6$ 44.55 |
| $r_{13}$ | −12.771 | $d_{13}$ | 11.026 | $N_{13}$ | 1.0000 | |
| $r_{14}$ | ∞ | $d_{14}$ | 7.600 | $N_{14}$ | 1.51680 | $\nu_7$ 64.12 |
| $r_{15}$ | ∞ | | | | | |

Variable Distance

| | $d_6$ | $d_{13}$ |
|---|---|---|
| TELE | 2.200 | 11.026 |
| MIDDLE | 12.359 | 4.114 |
| WIDE | 26.706 | 0.010 |

TABLE 11

[Embodiment 11]

$f = 12.3 \sim 17.0 \sim 29.4$  $F = 3.0 \sim 3.4 \sim 4.4$
$\phi_I = -0.037$  $\phi_{II} = 0.04464$

| Radius of Curvature | | Distance | | Refractive Index | | Abbe Number |
|---|---|---|---|---|---|---|
| $r_1$ | 30.507 | $d_1$ | 1.600 | $N_1$ | 1.71300 | $\nu_1$ 53.93 |
| $r_2$ | 12.425 | $d_2$ | 4.000 | $N_2$ | 1.00000 | |
| $r_3$ | −135.711 | $d_3$ | 1.600 | $N_3$ | 1.71300 | $\nu_2$ 53.93 |
| $r_4$ | 20.515 | $d_4$ | 1.200 | $N_4$ | 1.00000 | |

TABLE 11-continued

[Embodiment 11]

$f = 12.3 \sim 17.0 \sim 29.4$  $F = 3.0 \sim 3.4 \sim 4.4$
$\phi_I = -0.037$  $\phi_{II} = 0.04464$

| Radius of Curvature | | Distance | | Refractive Index | | Abbe Number |
|---|---|---|---|---|---|---|
| $r_5$ | 18.087 | $d_5$ | 3.400 | $N_5$ | 1.70055 | $\nu_3$ 30.11 |
| $r_6$ | 137.785 | $d_6$ | 1.900 | $N_6$ | 1.00000 | |
| $r_7$ | ∞ | $d_7$ | 1.000 | $N_7$ | 1.0000 | |
| $r_8$ | 13.383 | $d_8$ | 3.300 | $N_8$ | 1.72000 | $\nu_4$ 50.31 |
| $r_9$ | −41.020 | $d_9$ | 2.000 | $N_9$ | 1.00000 | |
| $r_{10}$ | −16.304 | $d_{10}$ | 3.800 | $N_{10}$ | 1.75520 | $\nu_5$ 27.51 |
| $r_{11}$ | 12.922 | $d_{11}$ | 1.200 | $N_{11}$ | 1.0000 | |
| $r_{12}$ | 26.506 | $d_{12}$ | 3.900 | $N_{12}$ | 1.78100 | $\nu_6$ 44.55 |
| $r_{13}$ | −17.226 | $d_{13}$ | 14.184 | $N_{13}$ | 1.0000 | |
| $r_{14}$ | ∞ | $d_{14}$ | 15.168 | $N_{14}$ | 1.51680 | $\nu_7$ 64.12 |
| $r_{15}$ | ∞ | | | | | |

Variable Distance

| | $d_6$ | $d_{13}$ |
|---|---|---|
| TELE | 1.900 | 14.184 |
| MIDDLE | 16.921 | 3.906 |
| WIDE | 30.531 | 0.010 |

TABLE 12

[Embodiment 12]

$f = 12.3 \sim 17.0 \sim 29.4$  $F = 3.0 \sim 3.3 \sim 4.3$
$\phi_I = -0.037$  $\phi_{II} = 0.04623$

| Radius of Curvature | | Distance | | Refractive Index | | Abbe Number |
|---|---|---|---|---|---|---|
| $r_1$ | 26.161 | $d_1$ | 1.600 | $N_1$ | 1.71300 | $\nu_1$ 53.93 |
| $r_2$ | 12.021 | $d_2$ | 4.000 | $N_2$ | 1.00000 | |
| $r_3$ | 417.183 | $d_3$ | 1.600 | $N_3$ | 1.71300 | $\nu_2$ 53.93 |
| $r_4$ | 16.776 | $d_4$ | 1.200 | $N_4$ | 1.00000 | |
| $r_5$ | 15.461 | $d_5$ | 3.400 | $N_5$ | 1.70055 | $\nu_3$ 30.11 |
| $r_6$ | 56.353 | $d_6$ | 1.900 | $N_6$ | 1.00000 | |
| $r_7$ | ∞ | $d_7$ | 1.000 | $N_7$ | 1.00000 | |
| $r_8$ | 12.651 | $d_8$ | 3.300 | $N_8$ | 1.72000 | $\nu_4$ 50.31 |
| $r_9$ | −31.755 | $d_9$ | 2.000 | $N_9$ | 1.00000 | |
| $r_{10}$ | −14.065 | $d_{10}$ | 3.800 | $N_{10}$ | 1.75520 | $\nu_5$ 27.51 |
| $r_{11}$ | 12.675 | $d_{11}$ | 1.200 | $N_{11}$ | 1.0000 | |
| $r_{12}$ | 28.273 | $d_{12}$ | 3.900 | $N_{12}$ | 1.78100 | $\nu_6$ 44.55 |
| $r_{13}$ | −16.394 | $d_{13}$ | 13.696 | $N_{13}$ | 1.0000 | |
| $r_{14}$ | ∞ | $d_{14}$ | 15.168 | $N_{14}$ | 1.51680 | $\nu_7$ 64.12 |
| $r_{15}$ | ∞ | | | | | |

Variable Distance

| | $d_6$ | $d_{13}$ |
|---|---|---|
| TELE | 1.900 | 13.696 |
| MIDDLE | 16.405 | 3.772 |
| WIDE | 29.546 | 0.010 |

TABLE 13

[Embodiment 13]

$f = 12.2 \sim 17.0 \sim 29.7$  $F = 2.8 \sim 3.3 \sim 4.5$

| Radius of Curvature | | Distance | | Refractive Index | | Abbe Number |
|---|---|---|---|---|---|---|
| $r_1$ | 27.577 | $d_1$ | 1.600 | $N_1$ | 1.71300 | $\nu_1$ 53.93 |
| $r_2$ | 12.957 | $d_2$ | 4.100 | $N_2$ | 1.00000 | |
| $r_3$ | 510.921 | $d_3$ | 1.600 | $N_3$ | 1.71300 | $\nu_2$ 53.93 |
| $r_4$ | 20.693 | $d_4$ | 1.300 | $N_4$ | 1.00000 | |
| $r_5$ | 17.231 | $d_5$ | 3.500 | $N_5$ | 1.68300 | $\nu_3$ 31.52 |
| $r_6$ | 42.614 | $d_6$ | 1.500 | $N_6$ | 1.00000 | |
| $r_7$ | 12.103 | $d_7$ | 4.100 | $N_7$ | 1.69570 | $\nu_4$ 48.34 |
| $r_8$ | −38.773 | $d_8$ | 1.900 | $N_8$ | 1.00000 | |
| $r_9$ | −14.096 | $d_9$ | 3.100 | $N_9$ | 1.75690 | $\nu_5$ 29.69 |
| $r_{10}$ | 11.953 | $d_{10}$ | 1.100 | $N_{10}$ | 1.0000 | |
| $r_{11}$ | 23.615 | $d_{11}$ | 3.600 | $N_{11}$ | 1.77250 | $\nu_6$ 49.77 |
| $r_{12}$ | −14.777 | $d_{12}$ | 0.900 | $N_{12}$ | 1.000 | |
| $r_{13}$ | ∞ | $d_{13}$ | 13.540 | $N_{13}$ | 1.0000 | |
| $r_{14}$ | ∞ | $d_{14}$ | 15.168 | $N_{14}$ | 1.51680 | $\nu_7$ 64.12 |
| $r_{15}$ | ∞ | | | | | |

Variable Distance

| | $d_6$ | $d_{13}$ |
|---|---|---|

TABLE 13-continued

[Embodiment 13]

f = 12.2~17.0~29.7    F = 2.8~3.3~4.5

| Radius of Curvature | Distance | Refractive Index | Abbe Number |
|---|---|---|---|
| TELE | 1.500 | 13.540 | |
| MIDDLE | 15.705 | 3.721 | |
| WIDE | 28.776 | 0.010 | |

TABLE 14

[Embodiment 14]

f = 10.23~14.5~24.5    F = 2.8~3.2~4.1

| Radius of Curvature | Distance | Refractive Index | Abbe Number |
|---|---|---|---|
| $r_1$ 17.758 | $d_1$ 1.200 | $N_1$ 1.71300 | $\nu_1$ 53.93 |
| $r_2$ 8.825 | $d_2$ 3.100 | $N_2$ 1.00000 | |
| $r_3$ 60.676 | $d_3$ 1.200 | $N_3$ 1.71300 | $\nu_2$ 53.93 |
| $r_4$ 14.500 | $d_4$ 1.000 | $N_4$ 1.00000 | |
| $r_5$ 11.292 | $d_5$ 2.400 | $N_5$ 1.75520 | $\nu_3$ 27.51 |
| $r_6$ 19.099 | $d_6$ 1.900 | $N_6$ 1.00000 | |
| $r_7$ ∞ | $d_7$ 1.200 | $N_7$ 1.0000 | |
| $r_8$ 11.120 | $d_8$ 3.000 | $N_8$ 1.78831 | $\nu_4$ 47.32 |
| $r_9$ −32.933 | $d_9$ 1.600 | $N_9$ 1.00000 | |
| $r_{10}$ −12.604 | $d_{10}$ 2.700 | $N_{10}$ 1.75520 | $\nu_5$ 27.51 |
| $r_{11}$ 10.414 | $d_{11}$ 1.200 | $N_{11}$ 1.0000 | |
| $r_{12}$ 23.174 | $d_{12}$ 2.900 | $N_{12}$ 1.78100 | $\nu_6$ 44.55 |
| $r_{13}$ −13.628 | $d_{13}$ 11.699 | $N_{13}$ 1.0000 | |
| $r_{14}$ ∞ | $d_{14}$ 7.600 | $N_{14}$ 1.51680 | $\nu_7$ 64.12 |
| $r_{15}$ ∞ | | | |

Variable Distance

| | $d_6$ | $d_{13}$ |
|---|---|---|
| TELE | 1.900 | 11.699 |
| MIDDLE | 12.076 | 3.508 |
| WIDE | 22.483 | 0.011 |

TABLE 15

[Embodiment 15]

f = 13.6~16.4~22.8    F = 3.5~3.8~4.5

| Radius of Curvature | Distance | Refractive Index | Abbe Number |
|---|---|---|---|
| $r_1$ ∞ | $d_1$ 1.500 | $N_1$ 1.67000 | $\nu_1$ 57.07 |
| $r_2$ 18.611 | $d_2$ 1.200 | $N_2$ 1.00000 | |
| $r_3$ 8.291 | $d_3$ 2.800 | $N_3$ 1.74950 | $\nu_3$ 35.17 |
| $r_4$ −56.714 | $d_4$ 2.000 | $N_4$ 1.00000 | |
| $r_5$ −8.940 | $d_5$ 1.500 | $N_5$ 1.80518 | $\nu_5$ 25.43 |
| $r_6$ 7.768 | $d_6$ 1.100 | $N_6$ 1.00000 | |
| $r_7$ 15.592 | $d_7$ 2.500 | $N_7$ 1.77000 | $\nu_7$ 48.92 |
| $r_8$ −8.712 | $d_8$ 1.000 | $N_8$ 1.00000 | |
| $r_9$ ∞ | $d_9$ 7.030 | $N_9$ 1.00000 | |
| $r_{10}$ ∞ | $d_{10}$ 8.000 | $N_{10}$ 1.51680 | $\nu_{10}$ 64.12 |
| $r_{11}$ ∞ | | | |

Variable Distance

| | $d_2$ | $d_9$ |
|---|---|---|
| TELE | 1.200 | 7.030 |
| MIDDLE | 8.421 | 3.531 |
| WIDE | 13.716 | 2.000 |

TABLE 16

[Embodiment 16]

f = 14.3~17.0~23.0    F = 3.5~3.8~4.4

| Radius of Curvature | Distance | Refractive Index | Abbe Number |
|---|---|---|---|
| $r_1$ 45.450 | $d_1$ 1.600 | $N_1$ 1.60311 | $\nu_1$ 60.74 |
| $r_2$ 12.329 | $d_2$ 2.800 | $N_2$ 1.00000 | |
| $r_3$ ∞ | $d_3$ 1.100 | $N_3$ 1.0000 | |
| $r_4$ 10.531 | $d_4$ 2.900 | $N_4$ 1.78560 | $\nu_4$ 42.81 |
| $r_5$ −33.841 | $d_5$ 2.500 | $N_5$ 1.00000 | |
| $r_6$ −9.041 | $d_6$ 2.300 | $N_6$ 1.75520 | $\nu_6$ 27.51 |
| $r_7$ 11.399 | $d_7$ 0.900 | $N_7$ 1.00000 | |
| $r_8$ 35.151 | $d_8$ 3.200 | $N_8$ 1.77250 | $\nu_8$ 49.77 |
| $r_9$ −9.490 | $d_9$ 5.024 | $N_9$ 1.00000 | |

TABLE 16-continued

[Embodiment 16]

f = 14.3~17.0~23.0    F = 3.5~3.8~4.4

| Radius of Curvature | Distance | Refractive Index | Abbe Number |
|---|---|---|---|
| $r_{10}$ ∞ | $d_{10}$ 8.000 | $N_{10}$ 1.51680 | $\nu_{10}$ 64.12 |
| $r_{11}$ ∞ | | | |

Variable Distance

| | $d_2$ | $d_9$ |
|---|---|---|
| TELE | 2.800 | 5.024 |
| MIDDLE | 10.020 | 1.566 |
| WIDE | 15.246 | 0.010 |

TABLE 17

[Embodiment 17]

f = 14.3~17.0~23.0    F = 3.5~3.8~4.3

| Radius of Curvature | Distance | Refractive Index | Abbe Number |
|---|---|---|---|
| $r_1$ 54.228 | $d_1$ 1.600 | $N_1$ 1.58913 | $\nu_1$ 61.11 |
| $r_2$ 12.705 | $d_2$ 3.000 | $N_2$ 1.00000 | |
| $r_3$ ∞ | $d_3$ 1.100 | $N_3$ 1.000 | |
| $r_4$ 11.002 | $d_4$ 2.700 | $N_4$ 1.83400 | $\nu_4$ 37.05 |
| $r_5$ −28.808 | $d_5$ 2.000 | $N_5$ 1.00000 | |
| $r_6$ −9.393 | $d_6$ 2.400 | $N_6$ 1.80518 | $\nu_6$ 25.43 |
| $r_7$ 11.790 | $d_7$ 1.100 | $N_7$ 1.00000 | |
| $r_8$ 49.261 | $d_8$ 3.000 | $N_8$ 1.75450 | $\nu_8$ 51.57 |
| $r_9$ −9.078 | $d_9$ 5.053 | $N_9$ 1.00000 | |
| $r_{10}$ ∞ | $d_{10}$ 8.000 | $N_{10}$ 1.51680 | $\nu_{10}$ 64.12 |
| $r_{11}$ ∞ | | | |

Variable Distance

| | $d_2$ | $d_9$ |
|---|---|---|
| TELE | 3.000 | 5.053 |
| MIDDLE | 10.261 | 1.575 |
| WIDE | 15.516 | 0.010 |

TABLE 18

[Embodiment 18]

f = 14.3~17.0~23.0    F = 3.5~3.7~4.5

| Radius of Curvature | Distance | Refractive Index | Abbe Number |
|---|---|---|---|
| $r_1$ 53.446 | $d_1$ 1.600 | $N_1$ 1.58913 | $\nu_1$ 61.11 |
| $r_2$ 12.659 | $d_2$ 3.000 | $N_2$ 1.00000 | |
| $r_3$ ∞ | $d_3$ 1.100 | $N_3$ 1.0000 | |
| $r_4$ 11.616 | $d_4$ 2.700 | $N_4$ 1.85026 | $\nu_2$ 32.15 |
| $r_5$ −29.135 | $d_5$ 2.000 | $N_5$ 1.00000 | |
| $r_6$ −9.636 | $d_6$ 2.400 | $N_6$ 1.84666 | $\nu_3$ 23.80 |
| $r_7$ 11.625 | $d_7$ 1.100 | $N_7$ 1.00000 | |
| $r_8$ 39.921 | $d_8$ 3.000 | $N_8$ 1.75450 | $\nu_4$ 51.57 |
| $r_9$ −8.746 | $d_9$ 5.122 | $N_9$ 1.00000 | |
| $r_{10}$ ∞ | $d_{10}$ 8.000 | $N_{10}$ 1.51680 | $\nu_5$ 64.12 |
| $r_{11}$ ∞ | | | |

Power Data

| $\phi_I$ | −0.0350000 |
|---|---|
| $\phi_{II}$ | 0.0595670 |

Variable Distance

| | $d_2$ | $d_3$ | $d_9$ |
|---|---|---|---|
| TELE | 3.000 | 1.100 | 5.122 |
| MIDDLE | 6.835 | 4.625 | 1.596 |
| WIDE | 10.576 | 6.212 | 0.010 |

TABLE 19

[Embodiment 19]

f = 15.3~19.0~29.6    F = 2.86~3.16~4.49

| Radius of Curvature | Distance | Refractive Index | Abbe Number |
|---|---|---|---|
| $r_1$ 47.867 | $d_1$ 1.600 | $N_1$ 1.77250 | $\nu_1$ 49.77 |
| $r_2$ 10.473 | $d_2$ 2.600 | $N_2$ 1.00000 | |
| $r_3$ 11.618 | $d_3$ 2.800 | $N_3$ 1.80518 | $\nu_2$ 25.43 |
| $r_4$ 15.479 | $d_4$ 2.300 | $N_4$ 1.00000 | |

TABLE 19-continued

[Embodiment 19]

f = 15.3~19.0~29.6    F = 2.86~3.16~4.49

| Radius of Curvature | Distance | Refractive Index | Abbe Number |
|---|---|---|---|
| $r_5$ ∞ | $d_5$ 1.300 | $N_5$ 1.00000 | |
| $r_6$ 13.060 | $d_6$ 3.500 | $N_6$ 1.78100 | $v_3$ 44.55 |
| $r_7$ −27.744 | $d_7$ 1.900 | $N_7$ 1.00000 | |
| $r_8$ −12.825 | $d_8$ 2.800 | $N_8$ 1.75520 | $v_4$ 27.51 |
| $r_9$ 13.053 | $d_9$ 1.400 | $N_9$ 1.00000 | |
| $r_{10}$ 32.512 | $d_{10}$ 3.100 | $N_{10}$ 1.77250 | $v_5$ 49.77 |
| $r_{11}$ −15.311 | $d_{11}$ 9.944 | $N_{11}$ 1.0000 | |
| $r_{12}$ ∞ | $d_{12}$ 15.168 | $N_{12}$ 1.51680 | $v_6$ 64.12 |
| $r_{13}$ ∞ | | | |

Power Data

| | |
|---|---|
| $\phi_I$ | −0.0352000 |
| $\phi_{II}$ | 0.0506688 |

Variable Distance

| | $d_4$ | $d_5$ | $d_{11}$ |
|---|---|---|---|
| TELE | 2.300 | 1.300 | 9.944 |
| MIDDLE | 5.504 | 8.664 | 2.580 |
| WIDE | 10.070 | 11.234 | 0.010 |

TABLE 20

[Embodiment 20]

f = 14.2~17.0~23.4    F = 3.5~3.8~4.4

| Radius of Curvature | Distance | Refractive Index | Abbe Number |
|---|---|---|---|
| $r_1$ ∞ | $d_1$ 1.500 | $N_1$ 1.58913 | $v_1$ 61.11 |
| $r_2$ 16.832 | $d_2$ 1.400 | $N_2$ 1.00000 | |
| $r_3$ 10.265 | $d_3$ 2.700 | $N_3$ 1.80750 | $v_3$ 35.43 |
| $r_4$ −35.205 | $d_4$ 2.000 | $N_4$ 1.00000 | |
| $r_5$ −8.666 | $d_5$ 1.700 | $N_5$ 1.80518 | $v_5$ 25.43 |
| $r_6$ 10.138 | $d_6$ 1.100 | $N_6$ 1.00000 | |
| $r_7$ 26.379 | $d_7$ 2.600 | $N_7$ 1.75450 | $v_7$ 51.57 |
| $r_8$ −8.268 | $d_8$ 6.076 | $N_8$ 1.00000 | |
| $r_9$ ∞ | $d_9$ 2.000 | $N_9$ 1.00000 | |
| $r_{10}$ ∞ | $d_{10}$ 8.000 | $N_{10}$ 1.51680 | $v_{10}$ 64.12 |
| $r_{11}$ ∞ | | | |

Power Data

| | |
|---|---|
| $\phi_I$ | −0.0350000 |
| $\phi_{II}$ | 0.0634384 |

Variable Distance

| | $d_2$ | $d_8$ |
|---|---|---|
| TELE | 1.400 | 6.076 |
| MIDDLE | 8.646 | 2.545 |
| WIDE | 13.870 | 1.000 |

TABLE 21

[Embodiment 21]

f = 13.2~17.0~25.7    F = 2.8~3.1~3.8

| Radius of Curvature | Distance | Refractive Index | Abbe Number |
|---|---|---|---|
| $r_1$ 49.395 | $d_1$ 1.500 | $N_1$ 1.71300 | $v_1$ 53.93 |
| $r_2$ 10.609 | $d_2$ 2.400 | $N_2$ 1.00000 | |
| $r_3$ 10.670 | $d_3$ 3.100 | $N_3$ 1.80518 | $v_3$ 25.43 |
| $r_4$ 12.427 | $d_4$ 1.300 | $N_4$ 1.00000 | |
| $r_5$ 10.743 | $d_5$ 2.900 | $N_5$ 1.78831 | $v_5$ 47.32 |
| $r_6$ −37.274 | $d_6$ 1.600 | $N_6$ 1.00000 | |
| $r_7$ −10.945 | $d_7$ 1.700 | $N_7$ 1.74000 | $v_7$ 28.26 |
| $r_8$ 11.462 | $d_8$ 1.200 | $N_8$ 1.00000 | |
| $r_9$ 40.006 | $d_9$ 2.600 | $N_9$ 1.78831 | $v_9$ 47.32 |
| $r_{10}$ −10.924 | $d_{10}$ 9.058 | $N_{10}$ 1.0000 | |
| $r_{11}$ ∞ | $d_{11}$ 2.000 | $N_{11}$ 1.0000 | |
| $r_{12}$ ∞ | $d_{12}$ 15.168 | $N_{12}$ 1.51680 | $v_{12}$ 64.12 |
| $r_{13}$ ∞ | | | |

Power Data

| | |
|---|---|
| $\phi_I$ | −0.0365000 |
| $\phi_{II}$ | 0.0603634 |

Variable Distance

| | $d_4$ | $d_{10}$ |
|---|---|---|
| TELE | 1.300 | 9.058 |

TABLE 21-continued

[Embodiment 21]

f = 13.2~17.0~25.7    F = 2.8~3.1~3.8

| Radius of Curvature | Distance | Refractive Index | Abbe Number |
|---|---|---|---|
| MIDDLE | 10.338 | 3.798 | |
| WIDE | 18.024 | 1.500 | |

Although the present invention has been fully described by way of example with reference to the accompanying drawings, it is to be noted here that various changes and modifications will be apparent to those skilled ion the art. Therefore, unless otherwise such changes and modifications depart from the scope of the present invention, they should be construed as being included therein.

What is claimed is:

1. A compact two-unit zoom lens system providing a long back focal length, comprises from object side to image side:

a front lens unit of a negative refractive power including at least two lens elements having relatively strong refractive powers facing each other to assist in correcting aberrations during zooming; and a rear lens unit of a positive refractive power with a variable air space formed between the front and rear lens units, said rear lens unit consisting of a first biconvex lens element, a second biconcave lens element and a third biconvex lens element, wherein the variable air space between the front and rear lens units changes during a zooming operation, the refractive powers of the front and rear lens units are chosen to permit correction of field curvature, and spherical, coma, and chromatic aberrations, with only three lens elements in the rear lens unit.

2. A zoom lens system as claimed in claim 1, wherein the front lens unit consists of, from the object side to the image side, a negative lens element whose image side surface has a stronger refractive power than its object side surface and a positive meniscus lens element having an object side surface convex to the object side.

3. A zoom lens system as claimed in claim 2, wherein the lens system fulfills the following conditions:

$$0.55 < |\phi_I| \cdot f_M < 0.9 \quad (f_M = \sqrt{f_W \cdot f_T}, \phi_I < 0)$$

$$0.44 < |\phi_I|/\phi_{II} < 1.0$$

wherein, $\phi_I$ and $\phi_{II}$ respectively represent the refractive powers of the front and rear lens units, $f_w$ and $f_r$ respectively represent the shortest and longest focal lengths of the whole lens system.

4. A zoom lens system as claimed in claim 3, wherein the zoom lens system fulfills the following conditions:

$$0.75 < R_{1R}/R_{2P} < 1.1$$

$$0.3 < |R_{5R}|/R_{5P} < 0.75 | 0(R_{5R} < 0)$$

$$0.75 < R_{4R}/|R_{4P}| < 1.35 | 0(R_{4P} < 0)$$

wherein, R represents the radius of curvature, wherein the first subscript thereof represents the lens number counted from the object side, and the second subscript thereof, that is, P represents the object side surface and R represents the image side surface.

5. A zoom lens system as claimed in claim 4, wherein the zoom lens system fulfills the following conditions:

$$\Delta v_I > 22$$

$$n_I > 1.70$$

$$n_{II} > 1.71$$

wherein, $\Delta \phi_I$ represents the difference between the Abbe numbers of two lens elements of the front lens unit, $n_I$ and $n_{II}$ respectively represent the averages of the refractive indexes of lens elements composing the front and rear lens units.

6. A zoom lens system as claimed in claim 5, wherein the zoom lens system has an aperture diaphragm arranged at the object side of the rear lens unit, said aperture diaphragm being shiftable with the rear lens unit along the optical axis of the lens system in the zooming operation.

7. A zoom lens system as claimed in claim 5, wherein the zoom lens system has an aperture diaphragm arranged between the first biconvex and second biconcave lens elements of the rear lens unit, said aperture diaphragm optical axis of the lens system in the zooming operation.

8. A zoom lens system as claimed in claim 5, wherein the zoom lens system has an aperture diaphragm arranged at the image side of the rear lens unit, said aperture diaphragm being shiftable with the rear lens unit along the optical axis of the lens system in the zooming operation.

9. A zoom lens system as claimed in claim 1, wherein the front lens unit consists of, from the object side to the image side, a negative meniscus lens element having an object side surface convex to the object side, a negative lens element whose image side surface has a stronger refractive power than its object side surface and a positive lens element whose object side surface has a stronger refractive power than its image side surface.

10. A zoom lens system as claimed in claim 9, wherein the zone lens system fulfills the following conditions:

$$0.38 < |\phi_I| \cdot f_W < 0.58 \; (\phi_I < 0)$$

$$0.28 < \frac{|\phi_I|}{\phi_{II} Z} < 0.48$$

wherein, Z represents the zoom ratio of the lens system.

11. A zoom lens system as claimed in claim 10, wherein the zoom lens system fulfills the following conditions:

$$0.4 < |R_{6R}|/R_{6P} < 0.8 \, | \, 0(R_{6R} < 0)$$

$$0.7 < R_{5R}/|R_{5P}| < 1.4 \, | \, 0(R_{5P} < 0)$$

12. A zoom lens system as claimed in claim 11, wherein the zoom lens system fulfills the following conditions:

$$0.7 < R_{3P}/R_{2R} < 1.0$$

$$n_6 > 1.73$$

$$v_5 < 32$$

wherein, n represents the refractive index, $v$ represents the Abbe number, wherein the subscript thereof represents the lens number counted from the object side.

13. A zoom lens system as claimed in claim 12, wherein the zoom lens system has an aperture diaphragm arranged at the object side if the rear lens unit, said aperture diaphragm being shiftable with the rear lens unit along the optical axis of the lens system in the zooming operation.

14. A zoom lens system as claimed in claim 12, wherein the zoom lens system has an aperture diaphragm arranged between the first biconvex and second biconvex lens elements of the rear lens unit, said aperture diaphragm being shiftable with the rear lens unit along the optical axis of the lens system in the zooming operation.

15. A zoom lens system as claimed in claim 12, wherein the zoom lens system has an aperture diaphragm arranged at the image side of the rear lens unit, said aperture diaphragm being shiftable with the rear lens unit along the optical axis of the lens system in the zooming operation.

16. A zoom lens system as claimed in claim 1, wherein the front lens unit consists of a negative lens element whose image side surface has a stronger refractive power than its object side surface.

17. A zoom lens system as claimed in claim 16, wherein the zoom lens system fulfills the following conditions:

$$0.43 < |\phi_I| \cdot f_w < 0.60 \, | \, 0(\phi_I < 0)$$

$$0.46 < |\phi_I|/\phi_{II} < 0.70$$

18. A zoom lens system as claimed in claim 17, wherein the zoom lens system fulfills the following conditions:

$$0.8 < \phi_{IR}/\phi_I < 1.7 \left( \phi_{IR} = \frac{1 - n_1}{R_{1R}} < 0 \right)$$

$$0 < |R_{4R}|/R_{4P} < 0.7 \; (R_{4R} < 0)$$

19. A zoom lens system as claimed in claim 18, wherein the zoom lens system has an aperture diaphragm arranged at the object side of the rear lens unit, said aperture diaphragm being shiftable with the rear lens unit along the optical axis of the lens system in the zooming operation.

20. A zoom lens system as claimed in claim 18, wherein the zoom lens system has an aperture diaphragm arranged at the image side of the rear lens unit, said aperture diaphragm being shiftable with the rear lens unit along the optical axis of the lens system in the zooming operation.

21. A zoom lens system as claimed in claim 1, wherein the zoom lens system has an aperture diaphragm arranged between the front and rear lens units, said aperture diaphragm being stationary on the optical axis of the lens system in the zooming operation.

22. A zoom lens system as claimed in claim 21, wherein the zoom lens system fulfills the following condition:

$$0.4 < |\phi_I|/\phi_{II} < 0.65 \, | \, 0(\phi_I < 0)$$

23. A zoom lens system as claimed in claim 22, wherein the front lens unit consists of a negative lens element whose image side surface has a stronger refractive power than its object side surface.

24. A zoom lens system as claimed in claim 22, wherein the front lens unit consists of, from the object side to the image side, a negative lens element whose image side surface has a stronger refractive power than its object side surface and a positive meniscus lens element having an object side surface convex to the object side.

25. A zoom lens system as claimed in claim 1, wherein the zoom lens system has an aperture diaphragm arranged at the image side next to the rear lens unit, said aperture diaphragm being stationary on the optical axis of the lens system in the zooming operation.

26. A zoom lens system as claimed in claim 25, wherein the zoom lens system fulfills the following conditions:

$$0 < \Delta d_I / \Delta d_{II} < 2.0$$

$$0.47 < |\phi_I|/\phi_{II} < 0.7 | 0 \ (\phi_I < 0)$$

wherein, $\Delta d_I$ and $\Delta d_{II}$ respectively represent the shifting amounts of the front and rear lens units from the longest focal length to the shortest focal length. (if the front lens unit moves toward the object side, $\Delta d_I$ is positive and if the rear lens unit moves toward the image side. $\Delta d_{II}$ is positive)

27. A zoom lens system as claimed in claim 26, wherein the front lens unit consists of a negative lens element whose image side surface has a stronger refractive power than its object side surface.

28. A zoom lens system as claimed in claim 26, wherein the front lens unit consists of, from the object side to the image side, a negative lens element whose image side surface has a stronger refractive power than its object side surface and a positive meniscus lens element having an object side surface convex to the object side.

29. A compact two-unit zoom lens system providing a long back focal length comprising, from object side to image side:

a front lens unit of a negative refractive power, said front lens unit consisting of at most three lens elements and including at least two lens elements having relatively strong refractive powers forcing each other to assist in correcting aberrations during zooming; and a rear lens unit of a positive refractive power with a variable air space formed between the front and rear lens units, said rear lens unit consisting of a first biconvex lens element, a second biconcave lens element and a third biconvex lens element, wherein the variable air space between the front and rear lens units changes in the zooming operation, and the refractive powers of the front and rear lens units are chosen to permit correction of field curvature and spherical, coma, and chromatic aberrations, with only three lens elements in the rear lens unit.

* * * * *